(12) United States Patent
Washio et al.

(10) Patent No.: US 11,241,866 B2
(45) Date of Patent: Feb. 8, 2022

(54) DOOR BODY

(71) Applicant: RIKEN TECHNOS CORPORATION, Tokyo (JP)

(72) Inventors: Nozomu Washio, Tokyo (JP); Taketo Hashimoto, Tokyo (JP); Shoko Nakajima, Tokyo (JP); Hitomi Inomata, Tokyo (JP)

(73) Assignee: RIKEN TECHNOS CORPORATION

( * ) Notice: Subject to any disclaimer, the term of this patent is extended or adjusted under 35 U.S.C. 154(b) by 3 days.

(21) Appl. No.: 15/779,483

(22) PCT Filed: Nov. 24, 2016

(86) PCT No.: PCT/JP2016/084794
§ 371 (c)(1),
(2) Date: May 25, 2018

(87) PCT Pub. No.: WO2017/090679
PCT Pub. Date: Jun. 1, 2017

(65) Prior Publication Data
US 2018/0257347 A1    Sep. 13, 2018

(30) Foreign Application Priority Data

Nov. 25, 2015 (JP) .............................. JP2015-229330
Feb. 19, 2016 (JP) ................................. 2016-029583
Mar. 10, 2016 (JP) ................................. 2016-046959

(51) Int. Cl.
  *B32B 27/06* (2006.01)
  *C09D 7/40* (2018.01)
  (Continued)

(52) U.S. Cl.
  CPC .............. *B32B 27/065* (2013.01); *B32B 5/20* (2013.01); *B32B 7/12* (2013.01); *B32B 27/30* (2013.01);
  (Continued)

(58) Field of Classification Search
  CPC ..... B32B 27/065; B32B 27/30; B32B 27/365; B32B 27/36; B32B 27/308; B32B 7/12;
  (Continued)

(56) References Cited

U.S. PATENT DOCUMENTS 3,496,143 A    2/1970   Siggel et al.
6,055,823 A *  5/2000   Baker ................... F25D 17/065
                                                  62/265

(Continued)

FOREIGN PATENT DOCUMENTS

CN    1649733 A      8/2005
CN    102686642 A    9/2012
(Continued)

OTHER PUBLICATIONS

Machine Translation of WO 2008/029766 A1. (Year: 2008).*
(Continued)

*Primary Examiner* — Brian Handville
(74) *Attorney, Agent, or Firm* — Bracewell LLP; Brad Y. Chin

(57) ABSTRACT

Embodiments provide a door body which opens and closes a front part of an article body, and which has a front panel that constitutes the front of the door body, a frame that supports at least a part of the outside edge of the front panel, and a back panel that constitutes the back of the door body. According to at least one embodiment, the front panel includes a hard coat laminated sheet; the hard coat laminated sheet has a first hard coat, a second hard coat, and a transparent resin sheet layer in that order from the surface on the front side. The first hard coat is formed from a coating material which contains (A) 100 parts by mass of a polyfunctional(meth)acrylate, (B) 0.01-7 parts by mass of a water repellant and (C) 0.01-10 parts by mass of a silane coupling agent and which does not contain inorganic par- (Continued)

ticles, and the second hard coat is formed from a coating material which contains (A) 100 parts by mass of the polyfunctional (meth)acrylate and (D) 50-300 parts by mass of inorganic fine particles having an average particle diameter of 1-300 nm. This door body may have a display on at least a part of the front thereof.

17 Claims, 6 Drawing Sheets

(51) Int. Cl.
| | |
|---|---|
| C09D 5/00 | (2006.01) |
| B32B 27/30 | (2006.01) |
| E06B 5/00 | (2006.01) |
| F25D 23/00 | (2006.01) |
| C09D 7/65 | (2018.01) |
| C09D 7/61 | (2018.01) |
| C09D 7/47 | (2018.01) |
| C09D 7/63 | (2018.01) |
| B32B 5/20 | (2006.01) |
| B32B 7/12 | (2006.01) |
| B32B 27/36 | (2006.01) |
| C09D 4/00 | (2006.01) |
| E06B 3/72 | (2006.01) |
| F25D 23/02 | (2006.01) |
| E06B 3/82 | (2006.01) |
| E06B 3/78 | (2006.01) |
| E06B 3/70 | (2006.01) |

(52) U.S. Cl.
 CPC ............ *B32B 27/308* (2013.01); *B32B 27/36* (2013.01); *B32B 27/365* (2013.01); *C09D 4/00* (2013.01); *C09D 5/00* (2013.01); *C09D 7/40* (2018.01); *C09D 7/47* (2018.01); *C09D 7/61* (2018.01); *C09D 7/63* (2018.01); *C09D 7/65* (2018.01); *E06B 3/72* (2013.01); *E06B 5/00* (2013.01); *E06B 5/006* (2013.01); *F25D 23/00* (2013.01); *F25D 23/02* (2013.01); *B32B 2255/10* (2013.01); *B32B 2255/26* (2013.01); *B32B 2255/28* (2013.01); *B32B 2266/0214* (2013.01); *B32B 2307/412* (2013.01); *B32B 2509/10* (2013.01); *E06B 3/7015* (2013.01); *E06B 3/78* (2013.01); *E06B 3/822* (2013.01); *E06B 2003/7023* (2013.01)

(58) Field of Classification Search
 CPC .................. B32B 5/20; B32B 2509/10; B32B 2509/2307; B32B 2509/412; B32B 2266/0214; B32B 2255/28; B32B 2255/26; B32B 2255/10; B32B 2255/24; B32B 27/16; F25D 23/00; F25D 23/02; E06B 5/006; E06B 5/00; E06B 3/72; E06B 3/78; E06B 3/822; E06B 2003/7023; E06B 3/7015; C09D 4/00; C09D 7/63; C09D 7/47; C09D 7/61; C09D 7/65; C09D 7/40; C09D 5/00; C09D 4/06; C09J 133/00; C09J 11/06
 See application file for complete search history.

(56) References Cited

U.S. PATENT DOCUMENTS

| | | | |
|---|---|---|---|
| 6,489,015 | B1 | 12/2002 | Tsuchiya et al. |
| 10,596,739 | B2 | 3/2020 | Washio et al. |
| 2003/0022984 | A1 | 1/2003 | Kawase et al. |
| 2003/0022987 | A1 | 1/2003 | Kawase et al. |
| 2005/0249942 | A1 | 11/2005 | Coggio et al. |
| 2006/0134400 | A1 | 6/2006 | Takada et al. |
| 2006/0210727 | A1 | 9/2006 | Ibuki et al. |
| 2007/0231566 | A1* | 10/2007 | Yoneyama ............ G02B 1/105 428/331 |
| 2007/0291363 | A1 | 12/2007 | Asakura et al. |
| 2008/0280086 | A1* | 11/2008 | Sheridan ................ B32B 38/10 428/40.7 |
| 2010/0147191 | A1 | 6/2010 | Sakano et al. |
| 2010/0210812 | A1 | 8/2010 | Urakawa et al. |
| 2012/0114892 | A1* | 5/2012 | Jung ...................... B44C 1/105 428/41.6 |
| 2013/0059158 | A1 | 3/2013 | Oguro et al. |
| 2013/0084458 | A1 | 4/2013 | Yamada et al. |
| 2013/0216801 | A1 | 8/2013 | Kadoki et al. |
| 2013/0222906 | A1 | 8/2013 | Tsunekawa et al. |
| 2014/0044891 | A1 | 2/2014 | Shibata et al. |
| 2014/0208657 | A1* | 7/2014 | Kim ........................ F25D 23/02 49/460 |
| 2014/0227482 | A1 | 8/2014 | Shibata et al. |
| 2014/0360975 | A1 | 12/2014 | Hustad et al. |
| 2015/0197662 | A1 | 7/2015 | Kang et al. |
| 2015/0203711 | A1 | 7/2015 | Kang et al. |
| 2016/0122525 | A1 | 5/2016 | Carloff et al. |
| 2016/0122573 | A1 | 5/2016 | Uprety et al. |
| 2016/0214294 | A1 | 7/2016 | Tsujimura et al. |
| 2016/0229159 | A1 | 8/2016 | Nakashima et al. |
| 2017/0095993 | A1 | 4/2017 | Tomomatsu et al. |
| 2017/0183543 | A1 | 6/2017 | Nagata et al. |
| 2017/0198164 | A1 | 7/2017 | Itagaki et al. |
| 2018/0072029 | A1 | 3/2018 | Nakashima et al. |

FOREIGN PATENT DOCUMENTS

| | | |
|---|---|---|
| CN | 103492913 A | 1/2014 |
| CN | 104422239 A | 3/2015 |
| CN | 105404094 A | 3/2016 |
| EP | 2873692 A1 | 5/2015 |
| JP | S633011 A | 1/1988 |
| JP | H0211665 A | 1/1990 |
| JP | H0419142 A | 1/1992 |
| JP | H0794061 A | 4/1995 |
| JP | 2000052472 A | 2/2000 |
| JP | 2000190430 A | 7/2000 |
| JP | 2000214791 A | 8/2000 |
| JP | 2000517455 A | 12/2000 |
| JP | 2002062405 A | 2/2002 |
| JP | 2004109966 A | 4/2004 |
| JP | 2005148444 A | 6/2005 |
| JP | 2005181940 A | 7/2005 |
| JP | 2006030983 A | 2/2006 |
| JP | 2006058574 A | 3/2006 |
| JP | 2006154758 A | 6/2006 |
| JP | 2006215488 A | 8/2006 |
| JP | 2007025040 A | 2/2007 |
| JP | 2007108449 A | 4/2007 |
| JP | 2007537059 A | 12/2007 |
| JP | 2008026883 A | 2/2008 |
| JP | 2008095064 A | 4/2008 |
| JP | 2008201864 A | 9/2008 |
| JP | 2008538195 A | 10/2008 |
| JP | 2009036818 A | 2/2009 |
| JP | 2009114248 A | 5/2009 |
| JP | 2009196125 A | 9/2009 |
| JP | 2009255544 A | 11/2009 |
| JP | 2009279806 A | 12/2009 |
| JP | 2010064332 A | 2/2010 |
| JP | 2010054861 A | 3/2010 |
| JP | 2010060190 A | 3/2010 |
| JP | 2010064332 A | 3/2010 |
| JP | 2010078642 A | 4/2010 |
| JP | 2010511206 A | 4/2010 |
| JP | 2010107823 A | 5/2010 |
| JP | 2010131771 A | 6/2010 |
| JP | 2010208035 A | 9/2010 |
| JP | 2010211150 A | 9/2010 |
| JP | 2010224150 A | 10/2010 |
| JP | 2010241019 A | 10/2010 |

(56) References Cited

FOREIGN PATENT DOCUMENTS

| | | |
|---|---|---|
| JP | 2010271400 A | 12/2010 |
| JP | 2010275385 A | 12/2010 |
| JP | 2011032350 A | 2/2011 |
| JP | 2011037927 A | 2/2011 |
| JP | 2011512422 A | 4/2011 |
| JP | 2011128439 A | 6/2011 |
| JP | 2011133862 A | 7/2011 |
| JP | 2011175040 A | 9/2011 |
| JP | 2011201087 A | 10/2011 |
| JP | 2011213989 A | 10/2011 |
| JP | 2012062385 A | 3/2012 |
| JP | 2012111943 A | 6/2012 |
| JP | 2012234163 A | 11/2012 |
| JP | 2012250438 A | 12/2012 |
| JP | 2013075466 A | 4/2013 |
| JP | 2013076029 A | 4/2013 |
| JP | 2013142113 A | 7/2013 |
| JP | 2013173871 A | 9/2013 |
| JP | 201431397 A | 2/2014 |
| JP | 2014024332 A | 2/2014 |
| JP | 2014025061 A | 2/2014 |
| JP | 2014040017 A | 3/2014 |
| JP | 2014043101 A | 3/2014 |
| JP | 2014062709 A | 4/2014 |
| JP | 2014080536 A | 5/2014 |
| JP | 2014117904 A | 6/2014 |
| JP | 2014143831 A | 8/2014 |
| JP | 2014152237 A | 8/2014 |
| JP | 2014152281 A | 8/2014 |
| JP | 2014201681 A | 10/2014 |
| JP | 2014238614 A | 12/2014 |
| JP | 2014240955 A | 12/2014 |
| JP | 2015013472 A | 1/2015 |
| JP | 2015013473 A | 1/2015 |
| JP | 2015016683 A | 1/2015 |
| JP | 2015033851 A | 2/2015 |
| JP | 2015034285 A | 2/2015 |
| JP | 2015034286 A | 2/2015 |
| JP | 2015083370 A | 4/2015 |
| JP | 2015151420 A | 8/2015 |
| JP | 2015182272 A | 10/2015 |
| JP | 2015182273 A | 10/2015 |
| JP | 2015184639 A | 10/2015 |
| JP | 2015203770 A | 11/2015 |
| JP | 2016006160 A | 1/2016 |
| JP | 2016011365 A | 1/2016 |
| JP | 5870222 B1 | 2/2016 |
| JP | 5878255 A | 3/2016 |
| JP | 2016050285 A | 4/2016 |
| JP | 2016060839 A | 4/2016 |
| JP | 2016172423 A | 9/2016 |
| JP | 2016172424 A | 9/2016 |
| JP | 2016177260 A | 10/2016 |
| JP | WO2015098495 A1 | 3/2017 |
| JP | 2017200042 A | 11/2017 |
| KR | 1020040094153 A | 11/2001 |
| KR | 20060067404 A | 6/2006 |
| KR | 20100129512 A | 12/2010 |
| KR | 20140056399 A | 5/2014 |
| KR | 10-2013-0058565 A | 12/2014 |
| TW | 200609110 A | 3/2006 |
| TW | 201300236 A | 1/2013 |
| TW | 201406895 A | 2/2014 |
| TW | 201420652 A | 6/2014 |
| TW | 201437304 A | 10/2014 |
| TW | 201504320 A | 2/2015 |
| TW | 201602268 A | 1/2016 |
| TW | 201638250 A | 11/2016 |
| WO | 2005113690 A2 | 12/2005 |
| WO | 2006102383 A1 | 9/2006 |
| WO | WO-2008029766 A1 * | 3/2008 ............ C09J 175/14 |
| WO | 2008067262 A1 | 6/2008 |
| WO | 2009113537 A1 | 9/2009 |
| WO | 2010079653 A1 | 7/2010 |
| WO | 2011033976 A1 | 3/2011 |
| WO | 2011034847 A1 | 3/2011 |
| WO | 2011145630 A1 | 11/2011 |
| WO | 2012026446 A1 | 3/2012 |
| WO | 2012144508 A1 | 10/2012 |
| WO | 2012144510 A1 | 10/2012 |
| WO | 2013129531 A1 | 9/2013 |
| WO | 2014030848 A1 | 2/2014 |
| WO | 2014203792 A1 | 12/2014 |
| WO | 2015001948 A1 | 1/2015 |
| WO | 2015005049 A | 1/2015 |
| WO | 2015005049 A1 | 1/2015 |
| WO | 2015033754 A1 | 3/2015 |
| WO | 2015045823 A1 | 4/2015 |
| WO | 2015098495 A1 | 7/2015 |
| WO | 2015146565 A | 10/2015 |
| WO | 2015171340 A1 | 11/2015 |
| WO | 2015182253 A1 | 12/2015 |
| WO | 2016147424 A1 | 9/2016 |
| WO | 2016147733 A1 | 9/2016 |
| WO | 2016147734 A1 | 9/2016 |
| WO | 2016147739 A1 | 9/2016 |
| WO | 2016147776 A1 | 9/2016 |
| WO | 2017200042 A | 11/2017 |

OTHER PUBLICATIONS

PCT/JP2016/056222 Notification Concerning Transmittal of International Preliminary Report on Patentability; 24 pgs.
CN201680015908.7 Office Action dated Feb. 2, 2019; 12 pgs.
JP2016-17863 Office Action dated Oct. 8, 2019; 11 pgs.
TW105104050 Office Action dated Aug. 20, 2019; 12 pgs.
KR10-2017-7026048 Korean Office Action dated Nov. 1, 2018; 14 pgs.
CN201680015902.X Second Office Action dated Jul. 17, 2019; 16 pgs.
PCT/JP2017/040099 International Search Report dated Feb. 13, 2018; 4 pgs.
EP16890589.1 Extended European Search Report dated Oct. 15, 2019, 8 pgs.
EP16764570.4 Search Report dated May 28, 2018; 8 pgs.
CN201810254960.9 Office Action dated Oct. 11, 2019, 13 pgs.
CN201580003516.4 Office Action dated Jan. 17, 2018; 20 pgs.
Lai, et al., Synthetic Process and Application of Silicone Products, 2nd Edition, Nov. 2009, 4 pgs.
JP6144330 Opposition Paper dated Dec. 5, 2017; 45 Pgs.
Yamamoto, et al.; Application of Chemically Absorbed Fluorocarbon Film with Highly Durability as a Mold Release Agent; Seikei-Kakou vol. 22 No. 2, 2010; pp. 104-114.
KR10-2016-7017502 Office Action dated Oct. 27, 2017; 18pgs.
PCT/JP2016/052927 International Search Report dated Apr. 19, 2016; 2 pgs.
PCT/JP2016/053357 International Search Report dated May 17, 2016; 2 pgs.
PCT/JP2016/053355 International Search Report dated May 17, 2016; 2 pgs.
PCT/JP2016/053556 International Search Report dated May 17, 2016; 2 pgs.
PCT/JP2016/054363 International Search Report dated May 17, 2016; 2 pgs.
CN201580003516.4 Office Action dated Jun. 28, 2017; 22 pgs.
JP2015-054439 Office Action dated Aug. 24, 2016; 31 pgs.
TW104122442 Office Action dated Jul. 13, 2016; 24 pgs.
PCT/JP2016/052950 International Search Report dated Apr. 19, 2016; 2 pgs.
CN201680068951.X Office Action dated Sep. 29, 2019; 21 pgs.
EP16872835.0 Extended European Search Report dated Jul. 8, 2019; 6 pgs.
JP2017069555 Office Action dated Nov. 27, 2018; 8 pgs.
CN201680015984.8 Office Action dated Nov. 5, 2018; 13 pgs.
JP2017-094366 Office Action dated Nov. 18, 2019, 11 pgs.
TW105106732 Office Action dated Aug. 30, 2019, 11 pgs.
EP16868622.8 Extended European Search Report dated May 20, 2019; 8 pgs.
CN201680015900.0 Office Action dated Sep. 10, 2019, 13 pgs.

(56) References Cited

OTHER PUBLICATIONS

PCT/JP2017/027297 International Search Report dated Aug. 29, 2017; 2 pgs.
JP2017-152119 Office Action dated Aug. 7, 2018; 10 pgs.
EP16764550.6 Extended European Search Report dated Oct. 18, 2018; 8 pgs.
PCT/JP2016/056222 International Search Report dated Jun. 7, 2016; 2 pgs.
EP15885519.7 Extended European Search Report dated Oct. 18, 2018; 8pgs.
CN201680015902.X Office Action dated Feb. 3, 2019; 15 pgs.
CN201680015900.0 Office Action dated Nov. 5, 2018; 12 pgs.
EP16764564.7 Extended European Search Report dated Oct. 18, 2018; 8 pgs.
TW105104907 Office Action dated Oct. 18, 2019; 10 pages.
EP16764607.4 Search Report dated May 28, 2018; 8 pgs.
Chinese Patent Application No. 201680015900.0 dated Jun. 4, 2019; 8 pgs.
Chinese Patent Application No. 201680015984.8 dated Jun. 4, 2019; 8 pgs.
CN201680015850.6 Office Action dated Jan. 24, 2019; 10 pgs.
TW105104029 Office Action dated Mar. 7, 2019; 12 pgs.
TW105104027 Office Action dated Jun. 25, 2019; 21 pages.
PCT/JP2016/084794 International Search Report dated Jan. 25, 2017; 2 pgs.
KR10-2016-7017502 Decision of Rejection dated May 10, 2018; 8 pgs.
PCT/JP2016/084981 International Preliminary Report on Patentability dated Jun. 21, 2018; 13 pgs.
CN201680015901.5 Office Action dated Jan. 28, 2019; 12 pgs.
TW105104026 Office Action dated Oct. 5, 2019; 10 pgs.
TW105104240 Office Action dated Oct. 17, 2019, 10 pgs.
KR10-2019-7001505 Office Action dated Feb. 20, 2019; 12 pgs.
PCT/JP2016/084981 International Search Report dated Jan. 25, 2017; 2 pgs.
Artham, et al., Biodegradation of Aliphatic and Aromatic Polycarbonates, Macromol. Biosci, 2008, 8, 14-24. (Year: 2008).
EP16764565.4 Extended European Search Report dated Oct. 18, 2018; 8 pgs.
CN201680015984.8 Office Action dated Sep. 10, 2019, 13 pgs.
JP2016-29588 Office Action dated Dec. 24, 2019, 7 pgs.
CN201811070889.5 Office Action dated Jan. 10, 2020, 15 pgs.
CN201680015902.X Office Action dated Jan. 2, 2020, 16 pgs.
EP15885519.7 Third Party Observations dated Jan. 8, 2020, 85 pgs.
CN201810254960.9 Third Office Action dated Dec. 30, 2020, 16 pgs.
CN201910756415.4 First Office Action dated Dec. 31, 2020, 9 pgs.
EP17874537.8 Supplementary Search Report dated May 14, 2020, 12 pgs.
CN201811070889.5 Second Office Action dated Aug. 3, 2020, 16 pgs.
KR10-2017-7026047 Third Party Observation dated Jan. 11, 2021, 21 pgs.
JP6599789B Notice for Reasons for Revocation dated Sep. 29, 2020, 32 pgs.
EP20150371.1 Extended European Search Report dated Apr. 7, 2020, 8 pgs.
JP2016-24288 Opposition Against JP6599789 dated Jun. 24, 2020, 64 pgs.
Website of Fluorolink@PFPE (including a flurorine-containing water repellent agent "Fluorolink AD 1700"), https://www.solvay.jp/ja/markets-and-products/featured-products/Fluorolink.html, Jan. 7, 2020, 2pgs.
CN201780069802.X Second Office Action dated Nov. 25, 2020, 23 pgs.
EP20150365.3 Extended European Search Report dated Apr. 9, 2020, 8 pgs.
TW105106732 Decision of Rejection dated Oct. 30, 2020, 8 pgs.
EP20202998.9 Extended European Search Report dated Feb. 1, 2021, 8 pgs.
TW106125432 First Office Action dated Dec. 28, 2020, 14 pgs.
EP17850559.0 Supplementary Search Report dated Mar. 18, 2020, 10 pgs.
JP2017-094366 Office Action dated Jan. 26, 2021, 18 pgs.
CN201910746657.5 First Office Action dated Oct. 27, 2020, 18 pgs.
CN201780055888.0 First Office Action dated Jul. 2, 2020, 11 pgs.
EP20150373.7 Extended European Search Report dated Apr. 7, 2020, 9 pgs.
CN201810254960.9 Second Office Action dated Jun. 9, 2020, 11 pgs.
JP2017-094366 Office Action dated May 19, 2020, 15 pgs.
CN201680082051.0 Second Office Action dated Jan. 7, 2021, 15 pgs.
CN201680082051.0 First Office Action dated May 6, 2020, 15 pgs.
JP2017-552695 Second Office Action dated Dec. 2, 2020, 5 pgs.
TW105136889 Second Office Action dated Jan. 7, 2021, 9 pgs.
CN201780069802.X First Office Action dated Jul. 31, 2020, 23 pgs.
JP2020-55297 Office Action dated May 20, 2021, 7 pgs.
CN201810254960.9 Decision of Rejection dated Jun. 30, 2021, 8 pgs.
CN201910746657.5 Second Office Action dated Jun. 4, 2021, 15 pgs.
CN201910756415.4 Second Office Action dated Aug. 3, 2021, 7 pgs.
KR10-2019-7010129 First Office Action dated Jun. 25, 2021, 10 pgs.
TW106125432 Decision of Rejection dated Apr. 29, 2021, 11 pgs.
CN202010731996.9 First Office Action dated Sep. 16, 2021, 12 pages.
JP2017-211513 Office Action dated Oct. 6, 2021, 9 pgs.

* cited by examiner

DOOR BODY

CROSS REFERENCE TO RELATED APPLICATIONS

This application claims the benefit of and priority to PCT/JP2016/084794, filed on Nov. 24, 2016, entitled (translation). "DOOR BODY," which claims the benefit of and priority to Japanese Patent Application Nos. 2015-229330, filed on Nov. 25, 2015, 2016-029583, filed on Feb. 19, 2016, and 2016-046959, filed on Mar. 10, 2016, each of which is hereby incorporated by reference in their entirety into this application.

BACKGROUND

Field

Embodiments relate to a door body.

Background Art

In recent years, glass has drawn attention as a member constituting a front panel of a door body for opening and closing a front part of a body of an article such as a refrigerator, a washing machine, a cupboard, or a costume shelf, or a flat panel of a lid body for opening and closing a flat part of the body due to a sense of design with transparency of glass. Meanwhile, glass has problems such as low impact resistance and consequent fragility; low processability: difficulty in handling; a high specific gravity and a consequent heavy weight; and difficulty in meeting demand for making an article curved or flexible. Therefore, as a front panel of a door body, it has been proposed to use a laminated sheet obtained by bonding a resin sheet (decorative sheet) provided with a design to a back side of a transparent resin sheet instead of glass (for example, see WO-A-2015/033754). Also, there have been many proposals for improving abrasion resistance of a transparent resin sheet (for example, see JP-A-2014-043101 and JP-A-2014-040017). However, the abrasion resistance is still insufficient. A door body capable of maintaining initial characteristics even when being repeatedly wiped with a cloth or the like is required.

In a case of using a laminated sheet obtained by bonding a decorative sheet to a back side of a transparent resin sheet as a front panel, in order to bond the decorative sheet to the transparent resin sheet, a pressure-sensitive adhesive can be used advantageously from a viewpoint of preventing thermal discoloration of a printed pattern applied to the decorative sheet and thermal deformation of a wrinkled pattern. However, a conventional pressure-sensitive adhesive has a disadvantage that peeling occurs due to outgas generated from a resin sheet particularly in an environment of high temperature and high humidity (sometimes hereinafter abbreviated as "problem of peeling under moisture and heat"); a disadvantage that when a decorative sheet is knocked from a back side in a process of producing a door body or the like, the pushed part is observed as a knocking flaw also from a front side of the door body or the like to deteriorate designability (sometimes hereinafter abbreviated as "problem of knocking flaw occurrence"); and a disadvantage that a transparent resin sheet is separated from a decorative sheet in a step of filling a foam insulation material in a process of producing a door body of a refrigerator (sometimes hereinafter abbreviated as "problem of peeling during filling step"). In the step of filling a foam insulation material, generally, the foam insulation material is foamed and filled under heating while closely adhering or bonding to a back of a decorative sheet, and subsequently heat shrinkage occurs when cooling is performed. A sink mark (cavity) may be sometimes generated at the time of cooling. However, when adhesion strength between a decorative sheet and a transparent resin sheet, particularly heat resistant adhesion strength is small, it is impossible to counter a peeling force acting at the time of cooling the foam insulation material, and peeling occurs. This is a typical "problem of peeling during filling step". In order to use a pressure-sensitive adhesive for bonding a transparent resin sheet to a decorative sheet, it is required to solve these disadvantages.

As a technique for solving the problem of peeling under moisture and heat, for example, "an acrylic pressure-sensitive adhesive composition including an acrylic copolymer (A) obtained by copolymerizing a (meth)acrylate and a monomer mixture (a) including a carboxyl group-containing monomer copolymerizable with the (meth)acrylate and a hydroxyl group-containing monomer and having a weight average molecular weight of 500,000 to 2,000,000, and a crosslinking agent (B), in which 0.05 to 1.6 parts by mass of a metal chelate-based crosslinking agent and 0.05 to 0.2 parts by mass of a crosslinking agent having an epoxy group are blended as the crosslinking agent (B) relative to 100 parts by mass of the acrylic copolymer (A)" has been proposed (see JP-A-2011-032350). However, as a result of testing by the present inventors, it was impossible to solve the problem of peeling during filling step and the problem of knocking flaw occurrence.

SUMMARY

Embodiments provide a door body using a resin sheet instead of glass, having a sense of design with transparency like glass, and having excellent abrasion resistance. Further, embodiments provide a door body using a resin sheet instead of glass and solving the problem of peeling under moisture and heat, the problem of knocking flaw occurrence, and the problem of peeling during filling step.

Accordingly, embodiments provide a door body.

According to at least one embodiment, there is provided a door body for opening and closing a front part of an article body, including a front panel constituting a front of the door body; a frame supporting at least a part of an outside edge of the front panel; and a back panel constituting a back of the door body, in which the front panel includes a hard coat laminated sheet, the hard coat laminated sheet including a first hard coat, a second hard coat, and a transparent resin sheet layer in order from a surface layer side on a front side, wherein the first hard coat is formed of a coating material including (A) 100 parts by mass of a polyfunctional (meth)acrylate; (B) 0.01 to 7 parts by mass of a water repellant; and (C) 0.01 to 10 parts by mass of a silane coupling agent, and containing no inorganic particles, and wherein the second hard coat is formed of a coating material including (A) 100 parts by mass of a polyfunctional (meth)acrylate; and (D) 50 to 300 parts by mass of inorganic fine particles having an average particle size of 1 to 300 nm.

According to at least one embodiment, the door body further includes a display in at least a part of the front of the door body.

According to at least one embodiment, the (C) silane coupling agent includes one or more selected from the group consisting of a silane coupling agent having an amino group and a silane coupling agent having a mercapto group.

According to at least one embodiment, the (B) water repellant includes a (meth)acryloyl group-containing fluoropolyether water repellant.

According to at least one embodiment, the second hard coat forming coating material further includes (E) 0.01 to 1 part by mass of a leveling agent.

According to another embodiment, there is provided a door body for opening and closing a front part of an article body, including a front panel constituting a front of the door body; a frame supporting at least a part of an outside edge of the front panel; and a back panel constituting a back of the door body, in which the front panel includes a hard coat laminated sheet, the hard coat laminated sheet includes a first hard coat, a second hard coat, and a transparent resin sheet layer in order from a surface layer side on a front side, wherein the first hard coat is formed of a coating material containing no inorganic particles, wherein the second hard coat is formed of a coating material containing inorganic particles, and wherein the hard coat laminated sheet satisfies that: (i) total light transmittance is 80% or more; (ii) haze is 5% or less; and (iii) yellowness index is 3 or less.

According to at least one embodiment, the hard coat laminated sheet further satisfies that: (iv) a water contact angle of a surface of the first hard coat is 100° or more; and (v) a water contact angle of the surface of the first hard coat after 20,000 reciprocating wipes with a cotton is 100° or more.

According to at least one embodiment, the front panel includes a transparent pressure-sensitive adhesive layer and a decorative sheet layer in this order in at least a part of a back side of the transparent resin sheet layer, and the transparent pressure-sensitive adhesive includes (P) 100 parts by mass of an acrylic polymer having a glass transition temperature of −50 to −25° C.; (Q) 0.01 to 3 parts by mass of a silane coupling agent having an epoxy group; (R) 0.01 to 0.9 parts by mass of a compound having two or more epoxy groups in one molecule; and (S) 0.01 to 0.5 parts by mass of an organic polyvalent metal compound.

According to at least one embodiment, an insulation material is filled in the door body formed by the front panel, the frame, and the back panel.

A refrigerator including the door body described above.

The door body according to various embodiments uses a resin sheet instead of glass, has a sense of design with transparency like glass, and has excellent abrasion resistance. The door body according to at least one embodiment uses a resin sheet instead of glass and solves the problem of peeling under moisture and heat, the problem of knocking flaw occurrence, and the problem of peeling during filling step. Therefore, the door body according to various embodiments can be suitably used as a door body for a home appliance such as a refrigerator.

DETAILED DESCRIPTION

The term "sheet" referred to herein is used as a term including a film and a plate here. The term "resin" is used as a term including a resin mixture including two or more resins and a resin composition including a component other than a resin. The term "front panel" is used in such a manner that the front panel is mutually exchangeable or replaceable with any one of a flat panel, a back panel, a side panel, and a bottom panel. The term "door body" is used in such a manner that the door body is mutually exchangeable or replaceable with a lid body. The term "front of an article" is not intended to be bound by this definition, but generally means a face of an article to which a user opposes in a case where the article is applied to an application for which the article is normally scheduled, and is not limited to one face. The term "back of an article" generally refers to a face opposite to the "front of an article" in this sense. In addition, the term "front side" generally refers to a direction from the "back of an article" toward the "front of an article" (or a position closer to the "front of an article").

According to at least one embodiment, there is provided a door body for opening and closing a front part of an article body, which includes a front panel constituting a front of the door body, a frame supporting at least a part of an outside edge of the front panel, and a back panel constituting a back of the door body.

Figure 1:
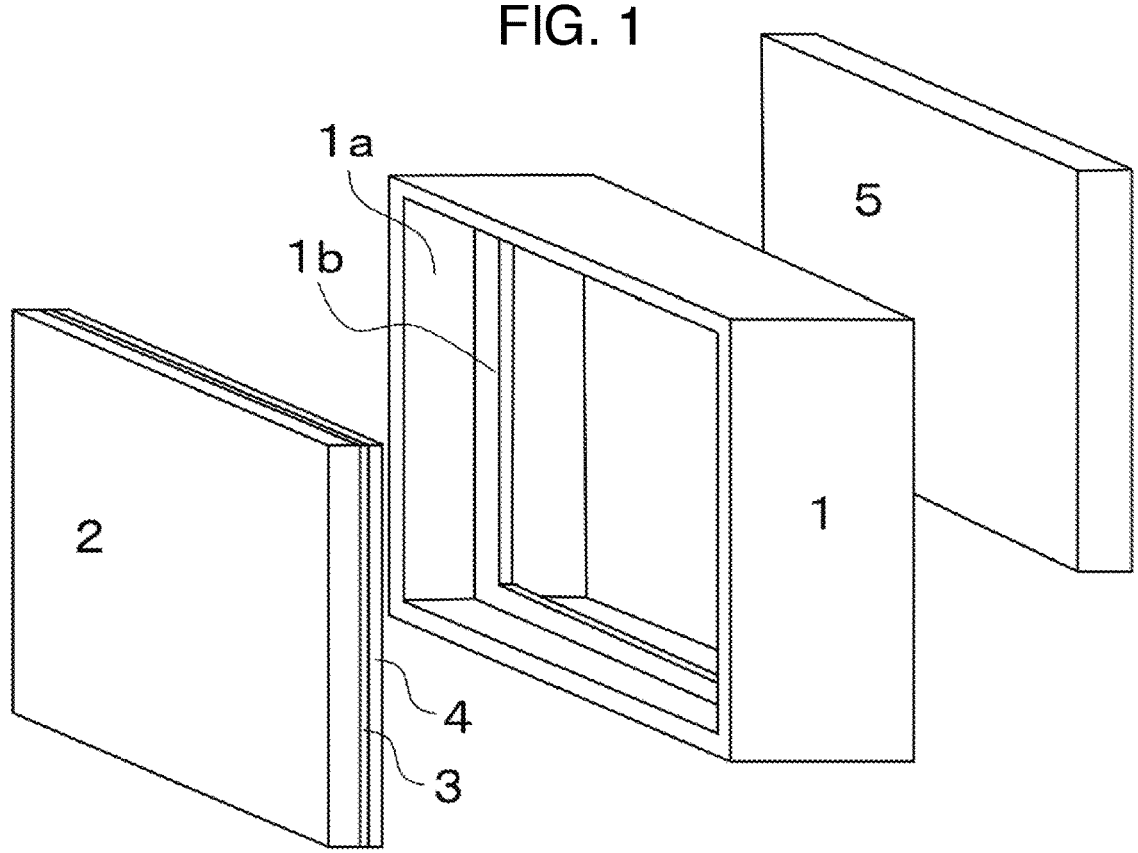
FIG. 1 is an exploded perspective view illustrating an example of a front panel, a frame, and a back panel of a door body according to an embodiment.
Figure 2:
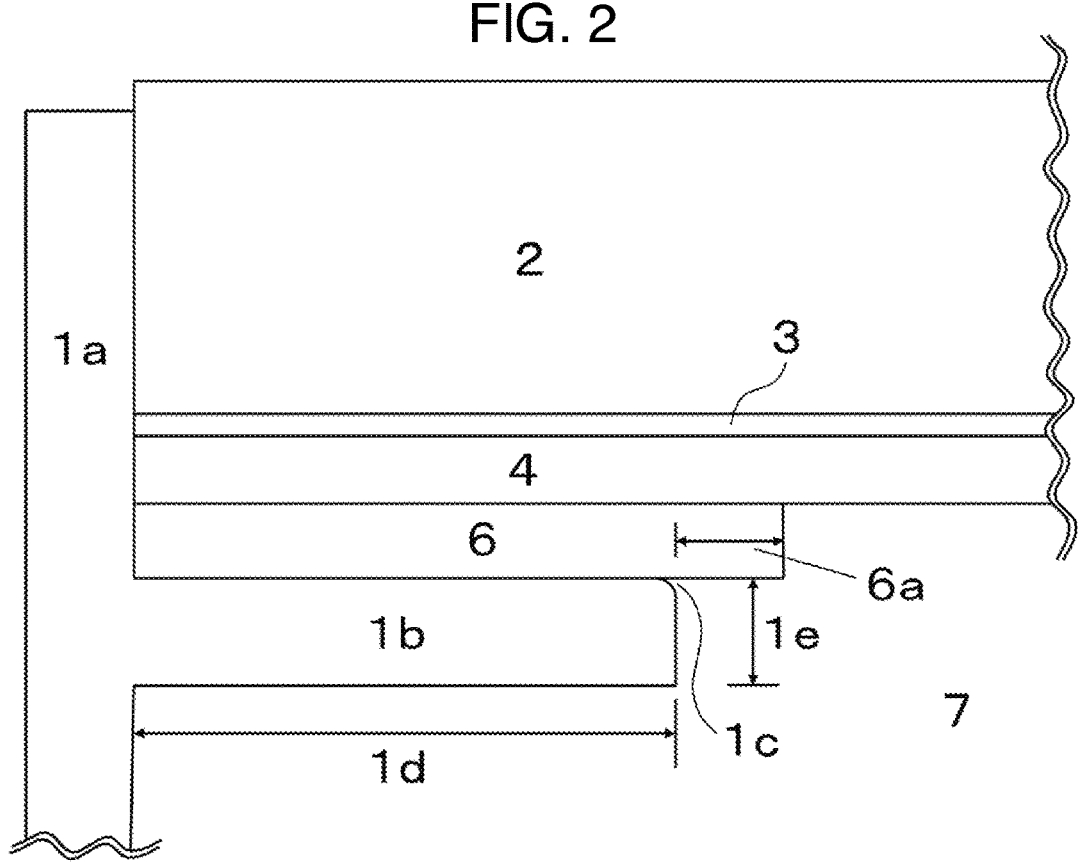
FIG. 2 is a partial enlarged view of a cross section of the door body illustrated in FIG. 1.
Figure 3:
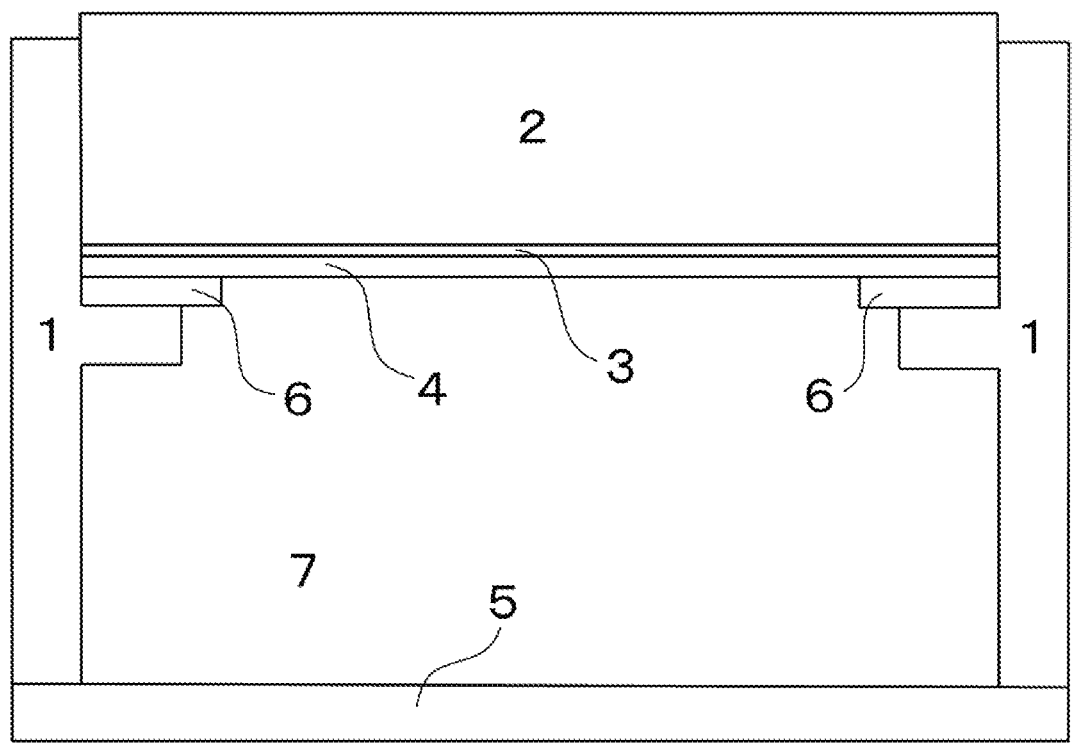
FIG. 3 is a cross-sectional view of the door body illustrated in FIG. 1.

A non-limiting embodiment of the door body will be described with reference to the drawings. FIG. 1 is an exploded perspective view illustrating an example of the front panel, the frame, and the back panel of the door body according to an embodiment. FIG. 2 is a partial enlarged view of a cross section of the door body illustrated in FIG. 1, and illustrates a periphery of a support plate 1b of a frame 1. FIG. 3 is a cross-sectional view of the door body illustrated in FIG. 1.

According at least one embodiment, the door body, as illustrated in FIGS. 1 to 3, includes a front panel constituting a front of the door body is formed of a laminate including a hard coat laminated sheet 2, a transparent pressure-sensitive adhesive layer 3, and a decorative sheet 4 in order from a surface layer on a front side. So-called chamfering such as R-face processing or C-face processing may be performed on a front side corner of an outside edge of the front panel. The frame 1 has an outer peripheral plate 1a and the support plate 1b extending from the outer peripheral plate 1a to an inside of an article in a substantially vertical direction (here, "vertical" means being vertical to a flat surface formed by a front side edge of the outer peripheral plate 1a). The outside edge of the front panel is supported and fixed by the outer peripheral plate 1a of the frame 1. The front panel is bonded to the support plate 1b with a pressure-sensitive adhesive film 6 (not illustrated in FIG. 1), and a back side of the outside edge is thereby supported and fixed. At this time, the decorative sheet 4 is directly bonded to the support plate 1b with the pressure-sensitive adhesive film 6. An insulation material 7 (not illustrated in FIG. 1) is usually filled in the door body formed by the front panel, the frame 1, and the back panel 5.

According to at least one embodiment, the door body for opening and closing a front part of an article body, includes a front panel constituting a front of the door body, a frame supporting at least a part of an outside edge of the front panel, and a back panel constituting a back of the door body, and includes a display in at least a part of the front of the door body.

Figure 4:
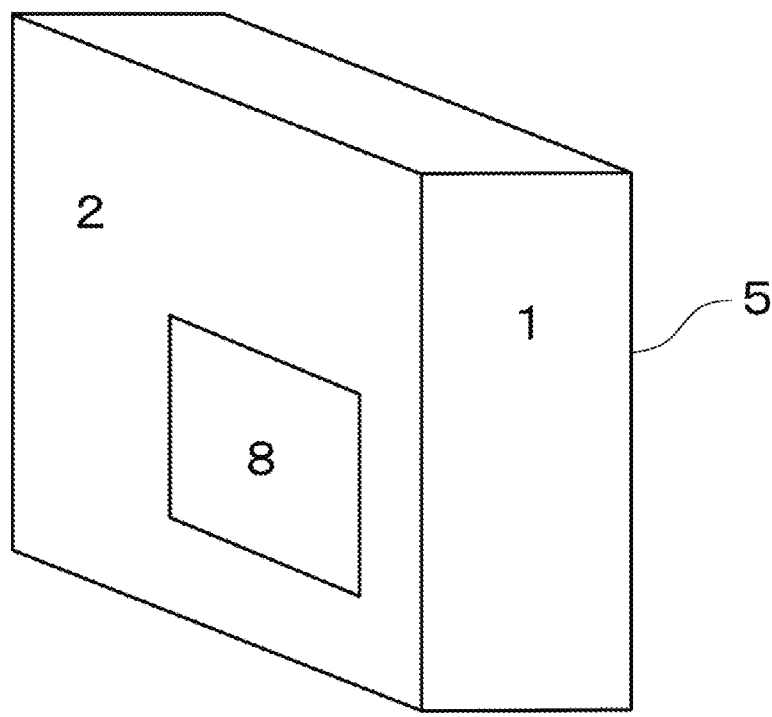
FIG. 4 is a perspective view illustrating an example of a door body according to an embodiment having a display on a part of a front thereof.
Figure 5:
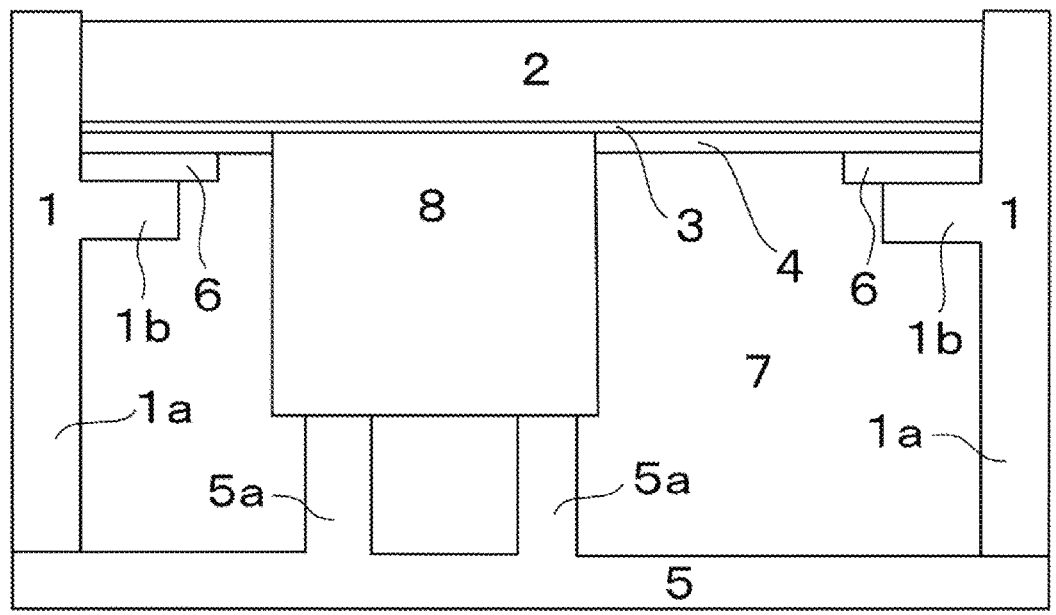
FIG. 5 is a cross-sectional view of the door body illustrated in FIG. 4.
Figure 6:
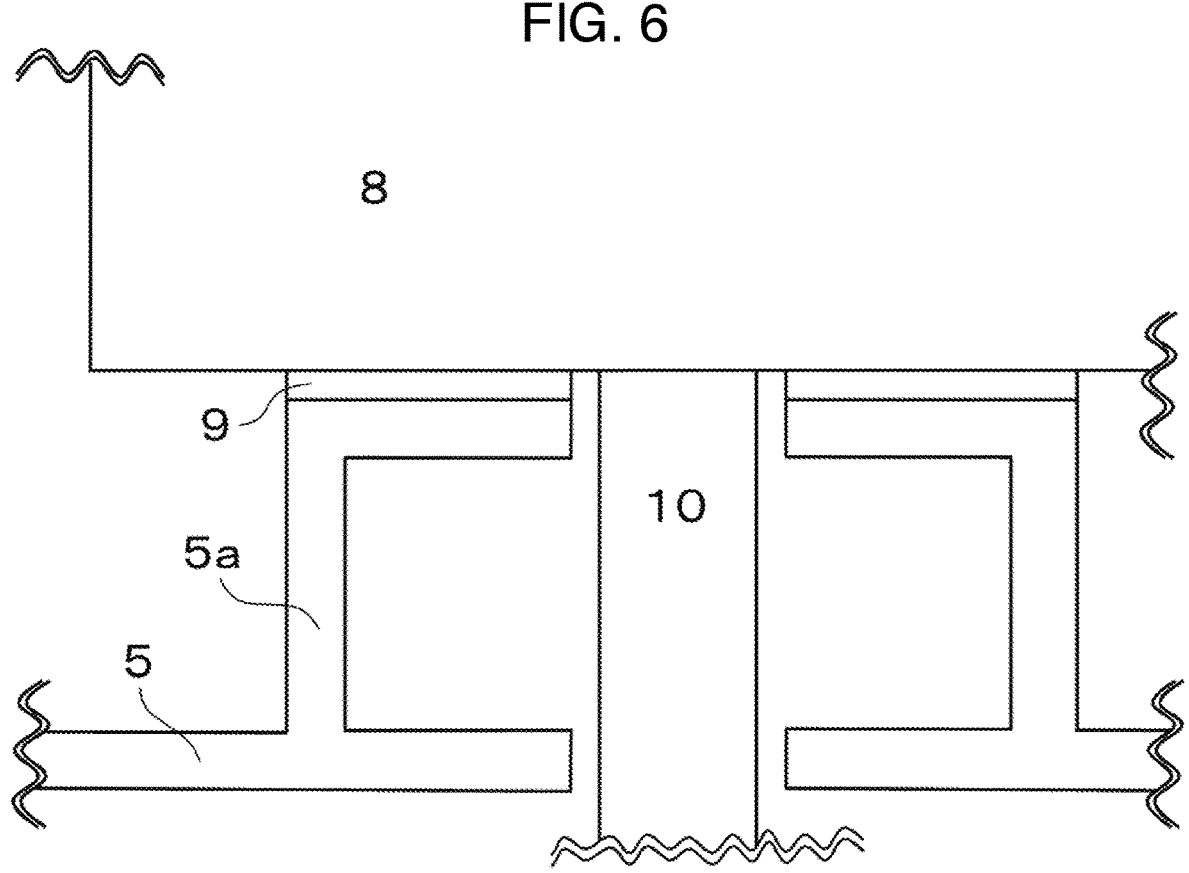
FIG. 6 is a partial enlarged view of a cross section of the door body illustrated in FIG. 4.

According to at least one embodiment, a display in at least a part of a front of the door body will be described with reference to the drawings. FIG. 4 is a perspective view illustrating an example of the door body according to an embodiment. FIG. 5 is a cross-sectional view of the door body illustrated in FIG. 4. FIG. 6 is an enlarged cross-sectional view of a periphery of a suspension base 5a of the door body illustrated in FIG. 4. Incidentally, also in this aspect, the enlarged cross-sectional view of a periphery of the support plate 1b of the frame 1 is similar to FIG. 2 in the above-described aspect.

According to at least one embodiment, as illustrated in FIGS. 4 to 6, a front panel constituting a front of the door body is formed of a laminate including the hard coat laminated sheet 2, the transparent pressure-sensitive adhesive layer 3, and the decorative sheet 4 in order from a surface layer on a front side in a portion without a display unit 8. In the portion of the display unit 8, the hard coat laminated sheet 2 also serves as a display face plate of the display unit 8 or a protective sheet of the display face plate. The hard coat laminated sheet 2 and the display unit 8 are bonded and fixed to each other by the transparent pressure-sensitive adhesive layer 3. So-called chamfering such as R-face processing or C-face processing may be performed on a front side corner of an outside edge of the front panel. The frame 1 has the outer peripheral plate 1a and the support plate 1b extending from the outer peripheral plate 1a to an inside of the door body in a substantially vertical direction. The outside edge of the front panel is supported and fixed by the outer peripheral plate 1a of the frame 1. The front panel is bonded to the support plate 1b with the pressure-sensitive adhesive film 6 (not illustrated in FIGS. 4 and 6), and a back side of the outside edge is thereby supported and fixed. At this time, the decorative sheet 4 is directly bonded to the support plate 1b with the pressure-sensitive adhesive film 6. The back panel 5 has a suspension base 5a of the display unit extending to an inside of the door body in a substantially vertical direction. The display unit 8 is supported and fixed to a tip of the suspension base 5a such that image display can be visually recognized from a front side of the door body. The suspension base 5a has a hollow structure. A cable 10 connected from an outside to the display unit 8 passes through an inside of the suspension base 5a. The display unit 8 is bonded and fixed to the tip of the suspension base 5a by a double-sided pressure-sensitive adhesive film 9. It should be noted that the fixing operation may be performed using a hinge, a screw, or the like, and is not limited. The insulation material 7 (not illustrated in FIGS. 4 and 6) is usually filled in the door body formed by the front panel, the frame 1, and the back panel 5.

The display unit 8 is not particularly limited, and any display unit can be used. The display unit 8 may have a touch panel function, and does not need to have a touch panel function. The display unit 8 does not need to have a display face plate of the unit itself. In this case, the hard coat laminated sheet 2 functions as a display face plate of the display unit 8. Incidentally, in a case where the display unit 8 has a display face plate of the unit itself, the hard coat laminated sheet 2 functions as a protective sheet of the display face plate.

Hereinafter, a portion common to the embodiment illustrated in FIGS. 1 to 3 and the embodiment illustrated in FIGS. 4 to 6 will be described.

Figure 7:
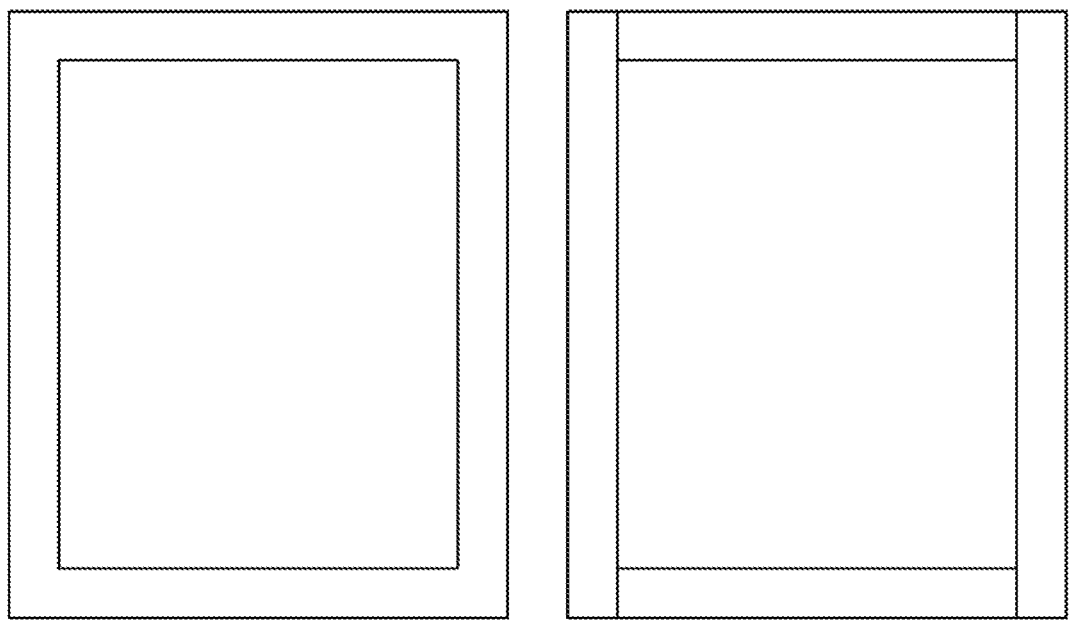
FIG. 7 is a front view illustrating an example of a shape of a pressure-sensitive adhesive film.

A double-sided pressure-sensitive adhesive film 6 may be formed by punching out a film in a hollow square shape (left side in FIG. 7), or may be formed by combining elongated tape-like films (right side in FIG. 7), and is not limited. The double-sided pressure-sensitive adhesive film 6 is bonded so as to cover at least a part, preferably the whole of a bonding surface of the support plate 1b with the decorative sheet 4. By bonding the double-sided pressure-sensitive adhesive film 6 so as to cover the whole, it is possible to prevent a durability trouble such as peeling after a long period of elapse.

In a step of filling a foam insulation material, the double-sided pressure-sensitive adhesive film 6 desirably acts to prevent a disadvantage that a leading edge of the support plate 1b of the frame 1 supporting the front panel from the back side is strongly pressed against the decorative sheet 4 and the pressed part is observed as a pressed mark also from a front side (hereinafter, also abbreviated as "pressed mark problem"). In order to prevent such a disadvantage, the double-sided pressure-sensitive adhesive film 6 preferably extends from a leading edge of the support plate 1b to an inside of the door body along a back of the decorative sheet 4. In the step of filling an insulation material, even if the support plate 1b is strongly pressed by the insulation material, it is preferable that the leading edge of the support plate 1b is not in direct contact with the decorative sheet 4. Incidentally, in order to prevent the leading edge of the support plate 1b from being in direct contact with the decorative sheet 4, the leading edge of the support plate 1b may be aligned with the leading edge of the double-sided pressure-sensitive adhesive film 6 on an inner side of an article. The double-sided pressure-sensitive adhesive film 6 more preferably extends as described above from a viewpoint of workability during producing a door body. An extension length 6a may be preferably 1 mm or more and more preferably 3 mm or more. An upper limit of the extension length 6a is not particularly limited, but may be preferably 15 mm or less and more preferably 10 mm or less from a viewpoint of cost.

According to at least one embodiment, the thickness of the double-sided pressure-sensitive adhesive film 6 may be usually 200 μm or more, preferably 400 μm or more, more preferably 700 μm or more, still more preferably 900 μm or more, and most preferably 1500 μm or more from a viewpoint of exhibiting a cushioning function by being interposed between the leading edge of the support plate 1b and the decorative sheet 4. An upper limit of the thickness is not particularly limited, but may be preferably 3000 μm or less and more preferably 2000 μm or less from a viewpoint of cost. It should be noted that the thickness of the double-sided pressure-sensitive adhesive film 6 preferably can be determined in consideration of bending resistance and stretch resistance of a printed pattern layer of the decorative sheet 4. For example, the printed pattern layer formed by vapor deposition of a metal, a metal oxide, or the like has low bending resistance and stretch resistance. Therefore, the double-sided pressure-sensitive adhesive film 6 is preferably as thick as possible.

As the double-sided pressure-sensitive adhesive film 6, any pressure-sensitive adhesive film can be used as long as being able to bond the support plate 1b to the decorative sheet 4 with sufficient strength, preferably being able to bond the support plate 1b to the decorative sheet 4 with sufficient strength and being able to exhibit a good cushioning function. The double-sided pressure-sensitive adhesive film 6 may be a film obtained by forming a pressure-sensitive adhesive layer on each side of any film base material or a film formed only with a pressure-sensitive adhesive layer (film not having a film base material).

According to at least one embodiment, a material used for the frame 1 is not particularly limited as long as being able to maintain strength and rigidity required for a frame of a door body. Preferable examples of the material used for the frame 1 include a so-called hard plastic material such as an acrylonitrile/butadiene/styrene copolymer resin (ABS resin) or a rubber modified polystyrene (HIPS) from a viewpoint of retaining strength and rigidity required for a frame of a door body, meeting a demand for reducing the weight of the door body, and enhancing insulating performance. Examples of a method for producing the frame 1 include a method for molding the above-described resin using an injection molding machine. The frame 1 may be integrally molded, or may be arbitrarily molded with divided parts (for example, divided parts of a flat surface, a bottom surface, a right side surface, and a left side surface; or divided parts of the outer peripheral plate 1a and the support plate 1b), and assembled using any method (for example, fitting, bonding, or thermal fusing).

A length 1d of the support plate 1b of the frame 1 extending from the outer peripheral plate 1a of the frame 1 to an inside of an article in a substantially vertical direction may be usually 10 mm or more and preferably 20 mm or more from a viewpoint of reliably supporting and fixing an outside edge of a back of the front panel via the decorative sheet 4. An upper limit of the length 1d is not particularly limited, but may be preferably 100 mm or less and more preferably 50 mm or less because a higher level of mechanical strength is required when the support plate 1b is long.

A thickness 1e of the support plate 1b of the frame 1 may be usually 1 mm or more, preferably 1.5 mm or more, and more preferably 2 mm or more from a viewpoint of enduring pressing of an insulation material applied to the support plate 1b in the step of filling an insulation material. The upper limit of the thickness 1e is not particularly limited, but may be preferably 10 mm or less and more preferably 5 mm or less from a viewpoint of meeting a demand for reducing the thickness of the door body.

A front side corner c of a leading edge of the support plate 1b of the frame 1 may have a radius of curvature of usually 0.1 mm or more, preferably 0.2 mm or more from a viewpoint of preventing generation of a pressed mark even if the support plate 1b is pressed strongly by an insulation material in the step of filling the insulation material and the leading edge of the support plate 1b strongly presses the decorative sheet 4 via the pressure-sensitive adhesive film 6. Meanwhile, the radius of curvature may be usually 10 mm or less, preferably 5 mm or less, and more preferably 2 mm or less from a viewpoint of preventing generation of a void without filling of the insulation material around the corner 1c.

Figure 8:
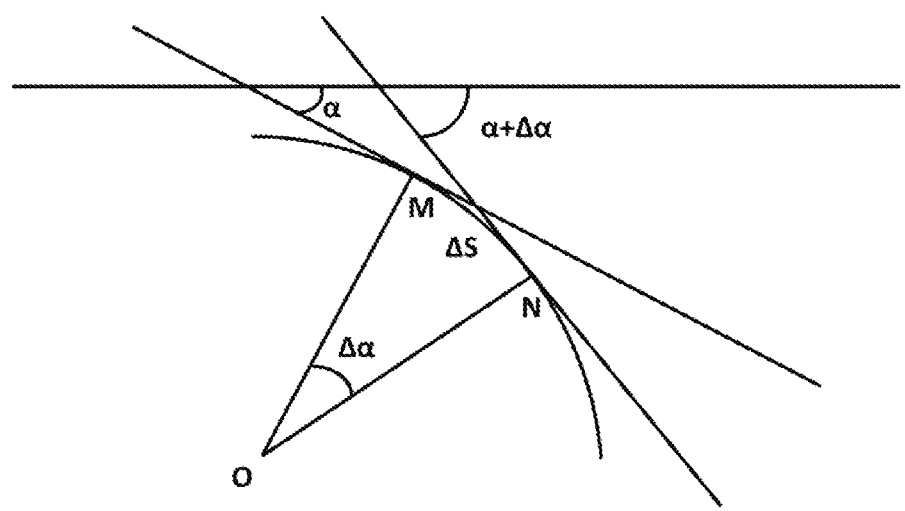
FIG. 8 is a diagram for explaining a radius of curvature.

It should be noted that the radius of curvature is defined as follows. As illustrated in FIG. 8, if a length between a point M and a point N on a curve is represented by $\Delta S$, a difference between a slope of a tangent at the point M and a slope of a contact at the point N is represented by $\Delta \alpha$, and an intersection between a straight line perpendicular to the tangent at the point M and intersecting at the point M and a straight line perpendicular to the tangent at the point N and intersecting at the point N is represented by O, when $\Delta S$ is sufficiently small, a curve between the point M and the point N can be approximated to a circular arc. A radius at this time is defined as a radius of curvature. If a radius of curvature is represented by R, $\angle MON = \Delta \alpha$ is satisfied. When $\Delta S$ is sufficiently small, $\Delta \alpha$ is also sufficiently small, and therefore $\Delta S = R \Delta \alpha$ is satisfied, and $R = \Delta S / \Delta \alpha$ is satisfied.

Figure 9:
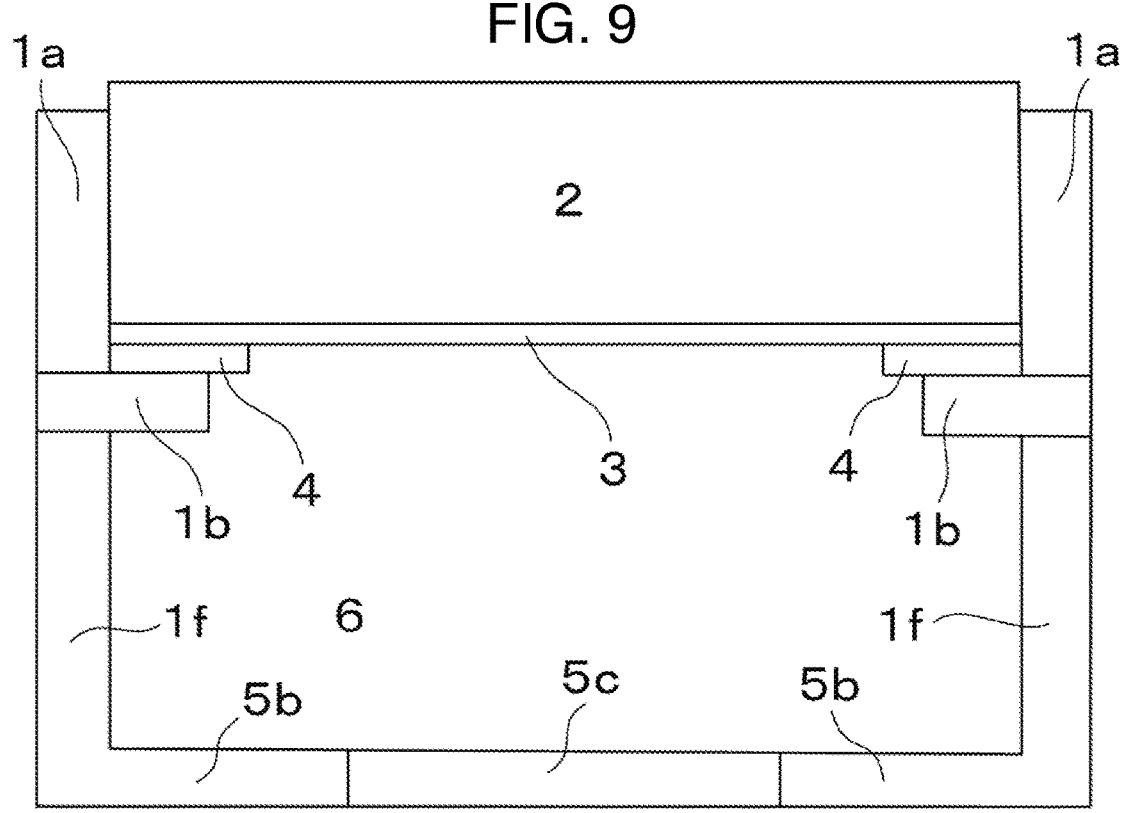
FIG. 9 is a cross-sectional view illustrating another example of the door body according to an embodiment.

A material used for the back panel 5 is not particularly limited and any material may be used, as long as being able to retain strength and rigidity required for a back panel of a door body. Preferable examples of the material used for the back panel 5 include a so-called hard plastic material such as an acrylonitrile/butadiene/styrene copolymer resin (ABS resin) or a rubber modified polystyrene (HIPS) from a viewpoint of retaining strength and rigidity required for a back panel of a door body, meeting a demand for reducing the weight of the door body, and enhancing insulating performance. Examples of a method for producing the back panel 5 include a method for molding the above resin using an injection molding machine. The back panel 5 may be integrally molded, arbitrarily divided, or integrally molded with the frame 1. FIG. 9 is a cross-sectional view illustrating another example of the door body according to an embodiment. The frame 1 and the back panel 5 are formed by molding divided four pieces 1a, 1b, 5c, and 1f (5b) and then assembling the pieces.

The insulation material 7 can be formed by injecting and filling, for example, a stock solution of a foamable resin into the door body formed by the front panel, the frame 1, and the back panel 5 and foaming the resin.

According to at least one embodiment, the foamable resin is not limited, and any foamable resin can be used. Examples of the foamable resin include a resin composition formed of one or a mixture of two or more kinds of resins such as a polyurethane-based resin including a thermosetting polyurethane and a thermoplastic polyurethane; a polyester-based resin including a thermosetting polyester and a thermoplastic polyester, a styrene-based resin including polystyrene, an acrylonitrile-butadiene-styrene copolymer resin (ABS resin), a styrene-ethylene-butadiene-styrene copolymer, a styrene-ethylene-propylene-styrene copolymer, and a styrene-ethylene-ethylene-propylene-styrene copolymer, and a polyolefin-based resin including polyethylene, polypropylene, and polymethylpentene, and one or a mixture of two or more kinds of foaming agents such as an azo compound including azodicarboxylic acid amide; a nitroso compound including N,N'-dinitrosopentamethylenetetramine, a carbonate including sodium bicarbonate and ammonium bicarbonate; an organic acid including citric acid, sodium citrate, and oxalic acid; sodium borohydride; a thermally expandable microcapsule; and water.

According to at least one embodiment, the insulation material 7 is preferably bonded to the front panel (directly, the decorative sheet 4 forming the back of the front panel), the frame 1, and the back panel 5 with sufficient strength from a viewpoint of rigidity of the door body. In order to bond the insulation material 7 with sufficient strength, an anchor coat is preferably formed before a stock solution of the foamable resin is injected into at least a part, preferably all of bonding sites of the decorative sheet 4, the frame 1, and the back panel 5 with the insulation material 7.

In a case where the foamable resin is a polyurethane-based resin or a polyester-based resin, a bonding site of the decorative sheet 4 with the insulation material 7 (backmost surface of the decorative sheet 4) is preferably formed with an amorphous or low crystalline aromatic polyester-based resin sheet. Sufficient bonding strength can be obtained without forming the anchor coat.

In the above-described aspect, the front panel formed of a laminate including the hard coat laminated sheet 2, the transparent pressure-sensitive adhesive layer 3, and the decorative sheet 4 in order from a surface layer on a front side has been explained. However, the front panel of the door body according to an embodiment is not limited thereto. For example, the front panel may be formed of a laminate including the hard coat laminated sheet 2, the transparent pressure-sensitive adhesive layer 3, the decorative sheet 4, and a transparent resin plate in order from a surface layer on a front side, or may be formed of a laminate including the hard coat laminated sheet 2, the transparent pressure-sensitive adhesive layer 3, the decorative sheet 4, and a steel plate in order from a surface layer on a front side.

Hard Coat Laminated Sheet

According to at least one embodiment, the hard coat laminated sheet included in the front panel of the door body will be described. As the hard coat laminated sheet, in order to use it as a material substituted for glass, any hard coat laminated sheet can be used as long as having high transparency and being not colored. The hard coat laminated sheet preferably includes a first hard coat, a second hard coat, and a transparent resin sheet layer in order from a surface layer on a front side from a viewpoint of abrasion resistance. Hereinafter, a preferable hard coat laminated sheet will be described.

First Hard Coat

According to at least one embodiment, the first hard coat usually forms a surface of the door body on a front side. The first hard coat exhibits good abrasion resistance, and maintains surface characteristics such as finger slidability even after being repeatedly wiped with a handkerchief or the like.

In one aspect, the first hard coat is preferably formed of a coating material containing no inorganic particles. In another aspect, the first hard coat is preferably formed of a coating material including (A) 100 parts by mass of a polyfunctional (meth)acrylate; (B) 0.01 to 7 parts by mass of a water repellant; and (C) 0.01 to 10 parts by mass of a silane coupling agent, and containing no inorganic particles.

According to at least one embodiment, the inorganic particles (for example, silica (silicon dioxide); metal oxide particles of aluminum oxide, zirconia, titania, zinc oxide, germanium oxide, indium oxide, tin oxide, indium tin oxide, antimony oxide, cerium oxide, or the like; metal fluoride particles of magnesium fluoride, sodium fluoride, or the like; metal sulfide particles; metal nitride particles; and metal particles) are highly effective in enhancing the hardness of a hard coat. Meanwhile, an interaction between the inorganic particles and a resin component such as the polyfunctional (meth)acrylate of component (A) is weak, resulting in insufficient abrasion resistance. Therefore, embodiments allow the first hard coat usually constituting a surface to contain no inorganic particles for retaining abrasion resistance. Meanwhile, embodiments allow the second hard coat to preferably contain a certain amount of inorganic particles for enhancing the hardness, and has thereby solved this problem.

Here, "containing no" inorganic particles means not containing a significant amount of inorganic particles. In the field of a hard coat forming coating material, the significant amount of inorganic particles is usually about 1 part by mass or more relative to 100 parts by mass of component (A). Therefore, "containing no" inorganic particles can be represented otherwise as follows. That is, the amount of inorganic particles is usually 0 parts by mass or more, usually less than 1 part by mass, preferably 0.1 part by mass or less, and more preferably 0.01 part by mass or less relative to 100 parts by mass of component (A).

(A) Polyfunctional (Meth)Acrylate

According to at least one embodiment, the polyfunctional (meth)acrylate of component (A) is a (meth)acrylate having two or more (meth)acryloyl groups in one molecule. Component (A) has two or more (meth)acryloyl groups in one molecule, and therefore forms a hard coat through polymerization/curing with an active energy ray such as an ultraviolet ray or an electron beam.

Examples of the polyfunctional (meth)acrylate include a (meth)acryloyl group-containing bifunctional reactive monomer such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane, or 2,2'-bis(4-(meth)acryloyloxypolypropyleneoxyphenyl)propane; a (meth)acryloyl group-containing trifunctional reactive monomer such as trimethylolpropane tri(meth)acrylate, trimethylolethane tri(meth)acrylate, or pentaerythritol tri(meth)acrylate; a (meth)acryloyl group-containing tetrafunctional reactive monomer such as pentaerythritol tetra(meth)acrylate; a (meth)acryloyl group-containing hexafunctional reactive monomer such as dipentaerythritol hexaacrylate; a (meth)acryloyl group-containing octafunctional reactive monomer such as tripentaerythritol acrylate; and a polymer (e.g. oligomer and prepolymer) including one or more kinds thereof as constituent monomers. These compounds can be used singly or in a mixture of two or more kinds thereof for the polyfunctional (meth)acrylate of component (A).

It should be noted that the term (meth)acrylate here means an acrylate or a methacrylate.

(B) Water Repellant

According to at least one embodiment, the water repellant of component (B) serves to enhance fingerprint resistance.

Examples of the water repellant include a wax-based water repellant such as a paraffin wax, a polyethylene wax, and an acrylate-ethylene copolymer wax; a silicone-based water repellant such as a silicone oil, a silicone resin, a polydimethylsiloxane, and an alkylalkoxysilane; and a fluorine-containing water repellant such as a fluoropolyether-based water repellant and a fluoropolyalkyl-based water repellant. These compounds can be used singly or in a mixture of two or more kinds thereof as the water repellant of component (B).

Among these compounds, a fluoropolyether-based water repellant is preferable as the water repellant of component (B) from a viewpoint of water repellency. A water repellant including a compound having a (meth)acryloyl group and a fluoropolyether group in a molecule (hereinafter, abbreviated as a (meth)acryloyl group-containing fluoropolyether-based water repellant) is more preferable as component (B) from a viewpoint of preventing a trouble such as bleed-out of component (B) because of a chemical bond or a strong interaction between the polyfunctional (meth)acrylate of component (A) and the water repellant of component (B). An admixture of an acryloyl group-containing fluoropolyether-based water repellant and a methacryloyl group-containing fluoropolyether-based water repellant is still more preferable as the water repellant of component (B) from a viewpoint of appropriately controlling a chemical bond or an interaction between the polyfunctional (meth)acrylate of component (A) and the water repellant of component (B) to exhibit good water repellency while keeping high transparency. It should be noted that the (meth)acryloyl group-containing fluoropolyether-based water repellant is clearly distinguished from component (A) in having a fluoropolyether group in a molecule. Here, a compound having two or more (meth)acryloyl groups and having a fluoropolyether group in one molecule is the (meth)acryloyl group-containing fluoropolyether-based water repellant, which is classified into component (B). That is, a compound having a fluoropolyether group is excluded from the definition of the polyfunctional (meth)acrylate of component (A).

According to at least one embodiment, the blending amount of the water repellant of component the (B) is usually 7 parts by mass or less, preferably 4 parts by mass or less, and more preferably 2 parts by mass or less relative to 100 parts by mass of the polyfunctional (meth)acrylate of component (A) from a viewpoint of preventing a trouble such as bleed-out of component (B). At the same time, the blending amount of the water repellant of component (B) is usually 0.01 part by mass or more, preferably 0.05 parts by mass or more, and more preferably 0.1 part by mass or more from a viewpoint of obtaining an effect of the water repellant of component (B). The blending amount of the water repellant may be usually 0.01 part by mass or more and 7 parts by mass or less, preferably 0.01 part by mass or more and 4 parts by mass or less, or 0.01 part by mass or more and 2 parts by mass or less, preferably 0.05 parts by mass or more and 7 parts by mass or less, 0.05 parts by mass or more and 4 parts by mass or less, or 0.05 parts by mass or more and 2 parts by mass or less, or preferably 0.1 part by mass or more and 7 parts by mass or less, 0.1 part by mass or more and 4 parts by mass or less, or 0.1 part by mass or more and 2 parts by mass or less.

(C) Silane Coupling Agent

According to at least one embodiment, the silane coupling agent of component (C) serves to enhance adhesiveness between the first hard coat and the second hard coat.

According to at least one embodiment, the silane coupling agent is a silane compound having at least two kinds of different reactive groups that are a hydrolyzable group(s) (for example, an alkoxy group such as a methoxy group and an ethoxy group; an acyloxy group such as an acetoxy group; or a halogen group such as a chlorine group) and an organic functional group(s) (for example, an amino group, a mercapto group, a vinyl group, an epoxy group, a methacryloxy group, an acryloxy group, or an isocyanate group). Among these compounds, a silane coupling agent having an amino group (i.e. a silane compound having an amino group and a hydrolyzable group) and a silane coupling agent having a mercapto group (i.e. a silane compound having a mercapto group and a hydrolyzable group) are preferable as the silane coupling agent of component (C) from a viewpoint of adhesiveness. A silane coupling agent having an amino group is more preferable from a viewpoint of adhesiveness and odor.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, and N-(vinylbenzyl)-2-aminoethyl-3-aminopropyltrimethoxysilane.

Examples of the silane coupling agent having a mercapto group include 3-mercaptopropylmethyldimethoxysilane and 3-mercaptopropyltrimethoxysilane.

These compounds can be used singly or in a mixture of two or more kinds thereof as the silane coupling agent of component (C).

The blending amount of the silane coupling agent of component (C) is usually 0.01 part by mass or more, preferably 0.05 parts by mass or more, and more preferably 0.1 part by mass or more relative to 100 parts by mass of the polyfunctional (meth)acrylate of component (A) from a viewpoint of obtaining an adhesiveness-enhancing effect reliably. At the same time, the blending amount of the silane coupling agent of component (C) may be usually 10 parts by mass or less, preferably 5 parts by mass or less, and more preferably 1 part by mass or less from a viewpoint of a pot life of a coating material. The blending amount of the silane coupling agent may be usually 0.01 part by mass or more and 10 parts by mass or less, preferably 0.01 part by mass or more and 5 parts by mass or less, or 0.01 part by mass or more and 1 part by mass or less, or preferably 0.05 parts by mass or more and 10 parts by mass or less, 0.05 parts by mass or more and 5 parts by mass or less, or 0.05 parts by mass or more and 1 part by mass or less, or preferably 0.1 part by mass or more and 10 parts by mass or less, 0.1 part by mass or more and 5 parts by mass or less, or 0.1 part by mass or more and 1 part by mass or less.

It should be noted that the blending amount of the silane coupling agent of component (C) in any usual or preferable range referred to here can be combined with the blending amount of the water repellant of component (B) in any usual or preferable range referred to above.

The first hard coat forming coating material preferably further includes a compound having two or more isocyanate groups (—N═C═O) in one molecule and/or a photopolymerization initiator from a viewpoint of improving curability with an active energy ray.

Examples of the compound having two or more isocyanate groups in one molecule include methylenebis-4-cyclohexylisocyanate; a polyisocyanate such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate, and a biuret form of hexamethylene diisocyanate; and a urethane crosslinking agent such as blocked isocyanates of the polyisocyanates. These compounds can be used singly or in a mixture of two or more kinds thereof as the compound having two or more isocyanate groups in one molecule. In crosslinking, a catalyst such as dibutyltin dilaurate and dibutyltin diethylhexoate may be added as necessary.

Examples of the photopolymerization initiator include a benzophenone-based compound such as benzophenone, methyl-o-benzoyl benzoate, 4-methylbenzophenone, 4,4'-bis(diethylamino) benzophenone, methyl o-benzoylbenzoate, 4-phenylbenzophenone, 4-benzoyl-4'-methyldiphenyl sulfide, 3,3',4,4'-tetra(tert-butylperoxycarbonyl) benzophenone, and 2,4,6-trimethylbenzophenone; a benzoin-based compound such as benzoin, benzoin methyl ether, benzoin ethyl ether, benzoin isopropyl ether, and benzyl methyl ketal; an acetophenone-based compound such as acetophenone, 2,2-dimethoxy-2-phenylacetophenone, and 1-hydroxycyclohexyl phenyl ketone; an anthraquinone-based compound such as methylanthraquinone, 2-ethylanthraquinone, and 2-amylanthraquinone; a thioxanthone-based compound such as thioxanthone, 2,4-diethylthioxanthone, and 2,4-diisopropylthioxanthone; an alkylphenone-based compound such as acetophenone dimethyl ketal; a triazine-based compound; a biimidazole compound; an acylphosphine oxide-based compound; a titanocene-based compound; an oxime ester-based compound; an oxime phenylacetate-based compound; a hydroxyketone-based compound; and an aminobenzoate-based compound. These compounds can be used singly or in a mixture of two or more kinds thereof as the photopolymerization initiator.

The first hard coat forming coating material may include one or more additives such as an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, organic fine particles, and an organic colorant, as desired.

The first hard coat forming coating material may include a solvent as desired for dilution to a concentration which allows easy application. The solvent is not particularly limited as long as the solvent neither reacts with any of components (A) to (C) and other optional components nor catalyzes (promotes) a self-reaction (including a degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. These compounds can be used singly or in a mixture of two or more kinds thereof as the solvent.

The first hard coat forming coating material can be obtained by mixing and stirring these components.

A method for forming the first hard coat using the first hard coat forming coating material is not particularly limited, but any known web applying method can be used. Examples of the method include roll coating, gravure coating, reverse coating, roll brushing, spray coating, air knife coating, dip coating, and die coating.

The thickness of the first hard coat is preferably 0.5 μm or more, and more preferably 1 μm or more from a viewpoint of abrasion resistance and hardness. At the same time, the thickness of the first hard coat is preferably 5 μm or less, more preferably 4 μm or less, and still more preferably 3 μm or less from a viewpoint of hardness and adhesiveness to the second hard coat. The thickness of the first hard coat may be preferably 0.5 μm or more and 5 μm or less, and more preferably 0.5 μm or more and 4 μm or less, 0.5 μm or more and 3 μm or less, 1 μm or more and 5 μm or less, 1 μm or more and 4 μm or less, or 1 μm or more and 3 μm or less.

Second Hard Coat

In one aspect, the second hard coat is preferably formed of a coating material containing inorganic particles. In another embodiment, the second hard coat is preferably formed of a coating material including (A) 100 parts by mass of a polyfunctional (meth)acrylate and (D) 50 to 300 parts by mass of inorganic fine particles having an average particle size of 1 to 300 nm.

As the (A) polyfunctional (meth)acrylate for the second hard coat, the same compounds as those described above for the first hard coat forming coating material can be used. These compounds can be used singly or in a mixture of two or more kinds thereof for the polyfunctional (meth)acrylate of component (A).

(D) Inorganic Fine Particles Having an Average Particle Size of 1 to 300 nm

Component (D) serves to dramatically increase the surface hardness of the hard coat laminated sheet.

Examples of the inorganic fine particles include silica (silicon dioxide); metal oxide fine particles of aluminum oxide, zirconia, titania, zinc oxide, germanium oxide, indium oxide, tin oxide, indium tin oxide, antimony oxide, cerium oxide, or the like; metal fluoride fine particles of magnesium fluoride, sodium fluoride, or the like; metal sulfide fine particles; metal nitride fine particles; and metal fine particles. These compounds can be used singly or in a mixture of two or more kinds thereof.

Among these particles, in order to obtain a hard coat having higher surface hardness, fine particles of silica or aluminum oxide are preferable, and fine particles of silica are more preferable. Examples of commercially available silica fine particles include Snowtex (trade name) available from Nissan Chemical Industries, Ltd. and Quartron (trade name) available from Fuso Chemical Co., Ltd.

In order to enhance dispersibility of inorganic fine particles in a coating material or enhance surface hardness of a hard coat obtained, it is preferable to use inorganic fine particles the surfaces of which have been treated with any one selected from a silane-based coupling agent such as vinylsilane and aminosilane; a titanate-based coupling agent; an aluminate-based coupling agent; an organic compound having a reactive functional group such as an ethylenically unsaturated bond group such as a (meth)acryloyl group, a vinyl group, and an allyl group, and an epoxy group; a surface-treatment agent such as a fatty acid and a fatty acid metal salt; and the like.

These compounds can be used singly or in a mixture of two or more kinds thereof for the inorganic fine particles of component (D).

The average particle size of the inorganic fine particles of component (D) is usually 300 nm or less, preferably 200 nm or less, and more preferably 120 nm or less from a viewpoint of retaining transparency of a hard coat and obtaining a hardness-improving effect reliably. On the other hand, the lower limit of the average particle size is not particularly specified, but the average particle size of inorganic fine particles usually available is about 1 nm at the finest.

The average particle size of the inorganic fine particles referred to herein is a particle size at which a cumulative value from the smallest particle size reaches 50% by mass in a particle size distribution curve measured using a laser diffraction/scattering particle size analyzer "MT 3200 II" (trade name) available from Nikkiso Co., Ltd.

The blending amount of the inorganic fine particles of component (D) is usually 50 parts by mass or more and preferably 80 parts by mass or more relative to 100 parts by mass of the polyfunctional (meth)acrylate of component (A) from a viewpoint of surface hardness. At the same time, the blending amount of the inorganic fine particles is usually 300 parts by mass or less, preferably 200 parts by mass or less, and more preferably 160 parts by mass or less from a viewpoint of transparency. The blending amount of the inorganic fine particles may be usually 50 parts by mass or more and 300 parts by mass or less, preferably 50 parts by mass or more and 200 parts by mass or less, or 50 parts by mass or more and 160 parts by mass or less, or preferably 80 parts by mass or more and 300 parts by mass or less, or 80 parts by mass or more and 200 parts by mass or less, or 80 parts by mass or more and 160 parts by mass or less.

(E) Leveling Agent

The second hard coat forming coating material preferably further includes (E) a leveling agent from a viewpoint of smoothing a surface of the second hard coat to form the first hard coat easily.

Examples of the leveling agent include an acrylic leveling agent, a silicone-based leveling agent, a fluorine-based leveling agent, a silicone-acrylate copolymer-based leveling agent, a fluorine-modified acrylic leveling agent, a fluorine-modified silicone-based leveling agent, and a leveling agent obtained by introducing therein a functional group (for example, an alkoxy group such as a methoxy group and an ethoxy group, an acyloxy group, a halogen group, an amino group, a vinyl group, an epoxy group, a methacryloxy group, an acryloxy group, an isocyanate group, and the like). Among these compounds, a silicone-acrylate copolymer-based leveling agent is preferable as the leveling agent of component (E). These compounds can be used singly or in a mixture of two or more kinds thereof as component (E).

The blending amount of the leveling agent of component (E) is usually 0.01 part by mass or more, preferably 0.1 part by mass or more, and more preferably 0.2 parts by mass or more relative to 100 parts by mass of the polyfunctional (meth)acrylate of component (A) from a viewpoint of smoothing a surface of the second hard coat to form the first hard coat easily. At the same time, the blending amount of the leveling agent of component (E) may be 1 part by mass or less, preferably 0.6 parts by mass or less, and more preferably 0.4 parts by mass or less from a viewpoint of satisfactorily applying the first hard coat forming coating material on the second hard coat without being repelled. The blending amount of the leveling agent may be usually 0.01 part by mass or more and 1 part by mass or less, preferably 0.01 part by mass or more and 0.6 parts by mass or less, or 0.01 part by mass or more and 0.4 parts by mass or less, preferably 0.1 part by mass or more and 1 part by mass or less, 0.1 part by mass or more and 0.6 parts by mass or less, or 0.1 part by mass or more and 0.4 parts by mass or less, or preferably 0.2 parts by mass or more and 1 part by mass or less, 0.2 parts by mass or more and 0.6 parts by mass or less, or 0.2 parts by mass or more and 0.4 parts by mass or less.

It should be noted that the blending amount of the leveling agent of component (E) in any usual or preferable range referred to here can be combined with the blending amount of the inorganic fine particles of component (D) in any usual or preferable range referred to above.

The second hard coat forming coating material preferably further includes a compound having two or more isocyanate groups (—N═C═O) in one molecule and/or a photopolymerization initiator from a viewpoint of improving curability with an active energy ray.

As the compound having two or more isocyanate groups in one molecule for the second hard coat, the same compounds as those described above for the first hard coat forming coating material can be used. These compounds can be used singly or in a mixture of two or more kinds thereof as the compound having two or more isocyanate groups in one molecule.

As the photopolymerization initiator for the second hard coat, the same compounds as those described above for the first hard coat forming coating material can be used. These compounds can be used singly or in a mixture of two or more kinds thereof as the photopolymerization initiator.

The second hard coat forming coating material may include one or more additives such as an antistatic agent, a surfactant, a thixotropy-imparting agent, an anti-fouling agent, a printability improver, an antioxidant, a weather resistance stabilizer, a light resistance stabilizer, an ultraviolet absorber, a heat stabilizer, a colorant, and organic fine particles, as desired.

The second hard coat forming coating material may include a solvent as desired for dilution to a concentration which allows easy application. The solvent is not particularly limited as long as the solvent neither reacts with any of components (A) and (D) and other optional components nor catalyzes (promotes) a self-reaction (including a degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. Among these compounds, 1-methoxy-2-propanol is preferable. These compounds can be used singly or in a mixture of two or more kinds thereof as the solvent.

The second hard coat forming coating material can be obtained by mixing and stirring these components.

A method for forming the second hard coat using the second hard coat forming coating material is not particularly limited, but any known web applying method can be used. Examples of the method include roll coating, gravure coating, reverse coating, roll brushing, spray coating, air knife coating, dip coating, and die coating.

The thickness of the second hard coat is preferably 10 μm or more, more preferably 15 μm or more, and still more preferably 18 μm or more from a viewpoint of surface hardness. At the same time, the thickness of the second hard coat is preferably 30 μm or less, more preferably 27 μm or less, and still more preferably 25 μm or less from a viewpoint of impact resistance. The thickness of the second hard coat may be preferably 10 μm or more and 30 μm or less, and more preferably 10 μm or more and 27 μm or less, 10 μm or more and 25 μm or less, 15 μm or more and 30 μm or less, 15 μm or more and 27 μm or less, 15 μm or more and 25 rpm or less, 18 μm or more and 30 μm or less, 18 μm or more and 27 μm or less, or 18 μm or more and 25 μm or less.

The thickness of the second hard coat in any preferable range referred to here can be combined with the thickness of the first hard coat in any preferable range referred to above.

Transparent Resin Sheet

In a preferable aspect, the hard coat laminated sheet includes the second hard coat on at least one surface of a transparent resin sheet and further includes the first hard coat thereon. It should be noted that the second hard coat may be formed directly, via an anchor coat, or via any transparent layer such as another transparent resin film layer on at least one surface of the transparent resin sheet. As the transparent resin sheet, in order to use the hard coat laminated sheet as a material substituted for glass, any transparent resin sheet can be used as long as having high transparency and being not colored The total light transmittance (measured according to JIS K7361-1:1997 using a turbidimeter "NDH2000" (trade name) available from Nippon Denshoku Industries Co., Ltd.) of the transparent resin sheet is preferably 80% or more, more preferably 85% or more, still more preferably 88% or more, further still more preferably 89% or more, and most preferably 90% or more. The total light transmittance of the transparent resin sheet of 80% or more can easily make the total light transmittance of a hard coat laminated sheet formed including the transparent resin sheet 80% or more. A higher total light transmittance is more preferable.

The transparent resin sheet has a haze (measured according to JIS K7136:2000 using a turbidimeter "NDH2000" (trade name) available from Nippon Denshoku Industries Co., Ltd.) of preferably 5% or less, more preferably 3% or less, still more preferably 2% or less. The haze of the transparent resin sheet of 5% or less can easily make the haze of a hard coat laminated sheet formed including the transparent resin sheet 5% or less. A lower haze is more preferable.

The transparent resin sheet has an yellowness index (measured according to JIS K7105:1981 using a chromaticity meter "SolidSpec-3700" (trade name) available from Shimadzu Corporation) of preferably 3 or less, more preferably 2 or less, and still more preferably 1 or less. The yellowness index of the transparent resin sheet of 3 or less can easily make the yellowness index of a hard coat laminated sheet formed including the transparent resin sheet 3 or less. A lower yellowness index is more preferable.

The thickness of the transparent resin sheet is usually 0.2 mm or more, preferably 0.5 mm or more, more preferably 0.8 mm or more, and still more preferably 1 mm or more from a viewpoint of retaining strength and rigidity required as a member substituted for glass and from a viewpoint of imparting a deep design with a glass tone. At the same time, the thickness of the transparent resin sheet may be usually 10 mm or less, preferably 6 mm or less, and more preferably 3 mm or less from a viewpoint of meeting a demand for weight reduction of an article.

The thickness of the transparent resin sheet may be preferably 0.2 mm or more and 10 mm or less, and more preferably 0.2 mm or more and 6 mm or less, 0.2 mm or more and 3 mm or less, 0.5 mm or more and 10 mm or less, 0.5 mm or more and 6 mm or less, 0.5 mm or more and 3 mm or less, 0.8 mm or more and 10 mm or less, 0.8 mm or more and 6 mm or less, 0.8 mm or more and 3 mm or less, 1 mm or more and 10 mm or less, 1 mm or more and 6 mm or less, or 1 mm or more and 3 mm or less. It should be noted that the thickness of the transparent resin sheet in any preferable range referred to here can be combined with the thickness(es) of the first hard coat and/or the second hard coat in any preferable range referred to above.

The tensile elastic modulus of the transparent resin sheet is preferably 1,500 MPa or more, and more preferably 1,800 MPa or more from a viewpoint of retaining strength and rigidity required as a member substituted for glass. The upper limit of the tensile elastic modulus is not particularly specified, but the tensile elastic modulus is about 10000 MPa at most within a usually available range because of a resin sheet. The tensile elastic modulus was measured under conditions of a test piece type 1B and a pulling rate of 50 mm/min, according to JIS K7127:1999.

The glass transition temperature of a resin constituting the transparent resin sheet is usually 80° C. or higher, preferably 90° C. or higher, more preferably 100° C. or higher, and still more preferably 110° C. or higher from a viewpoint of retaining heat resistance (including both heat resistance required at the time of producing an article and heat resistance required at the time of using the article). Incidentally, in a case where the transparent resin sheet contains two or more kinds of resins as constituent resins, a resin having the lowest glass transition temperature among these resins preferably satisfies the above range.

The glass transition temperature of a resin constituting the transparent resin sheet is usually 170° C. or lower, preferably 160° C. or lower, more preferably 155° C. or lower from a viewpoint of processability at the time of producing an article. Incidentally, in a case where the transparent resin sheet contains two or more kinds of resins as constituent resins, a resin having the highest glass transition temperature among these resins preferably satisfies the above range.

Here, the glass transition temperature is an intermediate point glass transition temperature calculated by drawing a graph in accordance with FIG. 2 of ASTM D3418 for glass transition appearing in a curve measured in the last temperature rising process in a temperature program in which the temperature of a sample is raised to 200° C. at a temperature rising rate of 50° C./min., is held at 200° C. for 10 minutes, is then cooled to 50° C. at a temperature falling rate of 20° C./min., is held at 50° C. for 10 minutes, and is then raised to 200° C. at a temperature rising rate of 20° C./min. using a Diamond DSC type differential scanning calorimeter available from Perkin Elmer Japan Co., Ltd.

A resin of the transparent resin sheet is not limited, but examples thereof include a polyester-based resin such as aromatic polyester and aliphatic polyester; an acrylic resin; a polycarbonate-based resin; a polyolefin-based resin such as polyethylene, polypropylene, and polymethylpentene; a cellulose-based resin such as cellophane, triacetylcellulose, diacetylcellulose, and acetylcellulose butyrate; a styrene-based resin such as polystyrene, an acrylonitrile-butadiene-styrene copolymer resin (ABS resin), a styrene-ethylene-butadiene-styrene copolymer, a styrene-ethylene-propylene-styrene copolymer, and a styrene-ethylene-ethylene-propylene-styrene copolymer, a polyvinyl chloride-based resin; a polyvinylidene chloride-based resin; a fluorine-containing resin such as polyvinylidene fluoride; polyvinyl alcohol, ethylene vinyl alcohol, polyether ether ketone, nylon, polyamide, polyimide, polyurethane, polyetherimide, polysulfone, polyethersulfone, etc. These transparent resin sheets include an unstretched sheet, a uniaxially stretched sheet, and a biaxially stretched sheet. These transparent resin sheets also include a laminated sheet obtained by laminating two or more layers of one or more of these sheets.

When the transparent resin sheet is a laminated sheet, a lamination method is not limited, but it can be laminated by any method. Examples thereof include a method including obtaining each resin sheet by any method and then subjecting the resin sheets to dry lamination or heat lamination; a method including melting each constituent material with an extruder and forming a laminated sheet by T-die co-extrusion using a feed block process, a multi-manifold process, or a stack plate process; an extrusion lamination method including forming at least one resin sheet by any method and then melting and extruding another resin sheet onto the resin sheet; a method including forming a resin sheet by melt extrusion onto any film substrate or by applying and drying a coating material including a constituent material and a solvent thereonto, peeling the formed resin sheet from the film substrate, and transferring the resin sheet onto another resin sheet; and a method including two or more of these methods in any combination.

When the transparent resin sheet is a laminated sheet, embossing may be applied between any layers, as desired, in order to enhance the sense of design.

When the transparent resin sheet is a laminated sheet, a printed layer may be provided between any layers, as desired, in order to enhance the sense of design. The printed layer can be formed by printing any pattern using an any ink and any printing machine. At this time, printing is preferably performed partially or using a transparent ink from a viewpoint of imparting a deep design with a glass tone. The number of the printed layer is not limited to one, but may be two or more.

Among these sheets, as the transparent resin sheet, the following examples are preferable from viewpoints of mechanical properties, transparency, and non-coloration:

(a1) an acrylic resin sheet;

(a2) an aromatic polycarbonate-based resin sheet;

(a3) a polyester-based resin sheet (excluding a resin sheet formed of an acrylic resin or an aromatic polycarbonate-based resin); and (a4) a laminated sheet formed of any one or more kinds of the transparent resin sheets (a1) to (a3).

The (a1) acrylic resin sheet is a sheet formed of a resin mainly including an acrylic resin such as polymethyl methacrylate or polyethyl methacrylate (usually 50% by mass or more, preferably 60% by mass or more, more preferably 70% by mass or more).

Examples of the acrylic resin include a (meth)acrylate (co)polymer, a copolymer of comonomers including a (meth)acrylate, and a modified product thereof. It should be noted that the term (meth)acrylic means acrylic or methacrylic. The term (co)polymer means a polymer or a copolymer.

Examples of the (meth)acrylate (co)polymer include polymethyl (meth)acrylate, polyethyl (meth)acrylate, polypropyl (meth)acrylate, polybutyl (meth)acrylate, a methyl (meth)acrylate-butyl (meth)acrylate copolymer, and an ethyl (meth)acrylate-butyl (meth)acrylate copolymer.

Examples of the copolymer of comonomers including a (meth)acrylate include an ethylene-methyl (meth)acrylate copolymer, a styrene-methyl (meth)acrylate copolymer, a vinylcyclohexane-methyl (meth)acrylate copolymer, a maleic anhydride-methyl (meth)acrylate copolymer, and an N-substituted maleimide-methyl (meth)acrylate copolymer.

Examples of the modified product include a polymer into which a lactone ring structure is introduced by an intramolecular cyclization reaction; a polymer into which glutaric anhydride is introduced by an intramolecular cyclization reaction; and a polymer into which an imide structure is introduced by a reaction with an imitating agent (for example, methyl amine, cyclohexyl amine, or ammonia).

These compounds can be used singly or in a mixture of two or more kinds thereof for the acrylic resin.

Preferable examples of an optional component(s) which can be contained in the acrylic resin include a core-shell rubber. When the total amount of the acrylic resin and the core-shell rubber is 100 parts by mass, by using 0 to 40 parts by mass of the core-shell rubber (100 to 60 parts by mass of the acrylic resin), preferably 0 to 30 parts by mass of the core-shell rubber (100 to 70 parts by mass of the acrylic resin), cutting processability and impact resistance of the (a1) acrylic resin sheet can be enhanced.

Examples of the core-shell rubber include a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. These compounds can be used singly or in a mixture of two or more kinds thereof for the core-shell rubber.

Other optional components which can be contained in the acrylic resin include a thermoplastic resin other than the acrylic resin or the core-shell rubber; a pigment, an inorganic filler, an organic filler, and a resin filler; and an additive such as a lubricant, an antioxidant, a weather resistance stabilizer, a heat stabilizer, a release agent, an antistatic agent, a nucleating agent, or a surfactant. The blending amount of the optional component(s) may be usually 25 parts by mass or less, and preferably about from 0.01 to 10 parts by mass when the total amount of the acrylic resin and the core-shell rubber is 100 parts by mass.

The (a2) aromatic polycarbonate-based resin sheet is a sheet formed of a resin mainly including an aromatic polycarbonate-based resin (usually 50% by mass or more, preferably 70% by mass or more, more preferably 90% by mass or more).

Examples of the aromatic polycarbonate-based resin include a polymer obtained by an interfacial polymerization method for an aromatic dihydroxy compound such as bisphenol A, dimethyl bisphenol A, and 1,1-bis(4-hydroxyphenyl)-3,3,5-trimethylcyclohexane and phosgene; and a polymer obtained by a transesterification reaction between an aromatic dihydroxy compound such as bisphenol A, dimethyl bisphenol A, and 1,1-bis(4-hydroxyphenyl)-3,3,5-trimethylcyclohexane and a carbonate diester such as diphenyl carbonate. These compounds can be used singly or in a mixture of two or more kinds thereof for the aromatic polycarbonate-based resin.

Preferable examples of optional components which can be contained in the aromatic polycarbonate-based resin include a core-shell rubber. When the total amount of the aromatic polycarbonate-based resin and the core-shell rubber is 100 parts by mass, by using 0 to 30 parts by mass of the core-shell rubber (100 to 70 parts by mass of the aromatic polycarbonate-based resin), preferably 0 to 10 parts by mass of the core-shell rubber (100 to 90 parts by mass of the aromatic polycarbonate-based resin), cutting processability and impact resistance of the (a2) aromatic polycarbonate-based resin can be enhanced.

Examples of the core-shell rubber include a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. These compounds can be used singly or in a mixture of two or more kinds thereof for the core-shell rubber.

The aromatic polycarbonate-based resin may further include, as desired, a thermoplastic resin other than an aromatic polycarbonate-based resin or a core-shell rubber; a pigment, an inorganic filler, an organic filler, and a resin filler; and an additive such as a lubricant, an antioxidant, a weather resistance stabilizer, a heat stabilizer, a release agent, an antistatic agent, and a surfactant within a range not contradictory to an object of the various embodiments. The blending amount of the optional component(s) may be usually about from 0.01 to 10 parts by mass when the total amount of the aromatic polycarbonate-based resin and the core-shell rubber is 100 parts by mass.

The (a3) polyester-based resin sheet is a sheet formed of a resin mainly including a polyester-based resin such as polyethylene terephthalate (usually 50% by mass or more, preferably 80% by mass or more, more preferably 90% by mass or more) (excluding the (a1) acrylic resin sheet or the (a2) aromatic polycarbonate-based resin sheet). The polyester-based resin sheet includes an unstretched sheet, a uniaxially stretched sheet, and a biaxially stretched sheet. The polyester resin sheet also includes a laminated sheet obtained by laminating one or more kinds of these sheets.

The (a3) polyester-based resin sheet is preferably a sheet formed of a resin mainly including an amorphous or low crystalline aromatic polyester-based resin (usually 50% by mass or more, preferably 80% by mass or more, more preferably 90% by mass or more).

Examples of the amorphous or low crystalline aromatic polyester-based resin include a polyester-based copolymer formed of an aromatic polycarboxylic acid component such as terephthalic acid, isophthalic acid, orthophthalic acid, and naphthalene dicarboxylic acid and a polyhydric alcohol component such as ethylene glycol, diethylene glycol, neopentyl glycol, 1,2-butanediol, 1,3-butanediol, 1,4-butanediol, 1,5-pentanediol, 3-methyl-1,5-pentanediol, 2-methyl-1,3-propanediol, and 1,4-cyclohexanedimethanol.

Examples of the amorphous or low crystalline aromatic polyester-based resin include a single kind or a mixture of two or more kinds of a glycol-modified polyethylene terephthalate (PETG) including 45 to 50 mol % of terephthalic acid, 30 to 40 mol % of ethylene glycol, and 10 to 20 mol % of 1,4-cyclohexanedimethanol; a glycol-modified polycyclohexylenedimethylene terephthalate (PCTG) including 45 to 50 mol % of terephthalic acid, 16 to 21 mol % of ethylene glycol, and 29 to 34 mol % of 1,4-cyclohexanedimethanol; an acid-modified polycyclohexylenedimethylene terephthalate (PCTA) including 25 to 49.5 mol % of terephthalic acid, 0.5 to 25 mol % of isophthalic acid, and 50 mol % of 1,4-cyclohexanedimethanol; an acid-modified and glycol-modified polyethylene terephthalate including 30 to 45 mol % of terephthalic acid, 5 to 20 mol % of isophthalic acid, 35 to 48 mol % of ethylene glycol, 2 to 15 mol % of neopentyl glycol, less than 1 mol % of diethylene glycol, and less than 1 mol % of bisphenol A; and an acid-modified and glycol-modified polyethylene terephthalate including 45 to 50 mol % of terephthalic acid, 5 to 0 mol % of isophthalic acid, 25 to 45 mol % of 1,4-cyclohexanedimethanol, and 25 to 5 mol % of 2,2,4,4,-tetramethyl-1,3-cyclobutanediol, when the total amount of monomers is 100 mol %.

Here, in a second melting curve (i.e. a melting curve measured in the last temperature rising process) measured by a temperature program in which the temperature of a sample is held at 320° C. for five minutes, is then cooled to −50° C. at a temperature falling rate of 20° C./min., is held at −50° C. for five minutes, and is then raised to 320° C. at a temperature rising rate of 20° C./min. using a Diamond DSC type differential scanning calorimeter available from Perkin Elmer Japan Co., Ltd, a polyester having a heat of fusion of 10 J/g or less was defined as an amorphous resin, and a polyester having a heat of fusion of more than 10 J/g and 60 J/g or less was defined as a low crystalline resin.

The polyester-based resin may include another component, as desired, within a range not contradictory to an object of the various embodiments. Examples of the optional component which can be contained in the polyester-based resin include a thermoplastic resin other than the polyester-based resin; a pigment, an inorganic filler, an organic filler, and a resin filler, and an additive such as a lubricant, an antioxidant, a weather resistance stabilizer, a heat stabilizer, a release agent, an antistatic agent, and a surfactant. The blending amount of the optional component may be usually 25 parts by mass or less, and preferably about from 0.01 to 10 parts by mass when the amount of the polyester-based resin is 100 parts by mass.

Preferable examples of an optional component which can be contained in the polyester-based resin include a core-shell rubber. By using the core-shell rubber, impact resistance of the (a3) polyester-based resin sheet can be improved.

Examples of the core-shell rubber include a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. These compounds can be used singly or in a mixture of two or more kinds thereof for the core-shell rubber.

When the amount of the polyester-based resin is 100 parts by mass, the blending amount of the core-shell rubber is preferably 0.5 parts by mass or more in order to improve impact resistance. At the same time, the blending amount of the core-shell rubber is preferably 5 parts by mass or less, and more preferably 3 parts by mass or less in order to retain transparency.

For example, the (a4) laminated sheet formed of any one or more kinds of the transparent resin sheets (a1) to (a3) can be obtained by co-extrusion film formation so as to obtain a desired layer structure using any co-extrusion apparatus such as a feed block process type, a multi-manifold process type, and a stack plate process type; or by obtaining any one or more kinds of the transparent resin sheets (a1) to (a3) using any film-forming apparatus and then subjecting the obtained sheets to heat lamination or dry lamination so as to obtain a desired layer structure; or by obtaining any one kind of the transparent resin sheets (a1) to (a3) using any film-forming apparatus and then performing extrusion lamination so as to obtain a desired layer structure using the obtained sheet as a substrate.

For the transparent resin sheet, a printed layer may be provided on a second hard coat forming surface or on a surface opposite to the second hard coat forming surface, as desired, in order to enhance the sense of design. The printed layer can be provided in order to impart high designability to an article produced using the transparent resin laminate according to an embodiment. The printed layer can be formed by printing any pattern using an any ink and any printing machine. A detailed method for forming the printed layer will be described later. Incidentally, when the printed layer is provided on the second hard coat forming surface, printing is preferably performed partially or using a transparent ink from a viewpoint of imparting a deep design with a glass tone.

The hard coat laminated sheet may include the first hard coat, the second hard coat, the transparent resin sheet layer, and a third hard coat in order from a surface layer on a front side. By forming the third hard coat, it is easy to impart suitable characteristics as a back surface.

In forming the hard coat, a hard coat forming surface or both surfaces of the transparent resin sheet functioning as a substrate may be subjected to an adhesion-facilitating treatment such as a corona discharge treatment or anchor coat formation in advance in order to enhance bonding strength to the hard coat.

As an anchor coating agent for forming the anchor coat, a known agent such as a polyester, an acrylate, a polyurethane, an acrylic urethane, or a polyester urethane can be used, for example.

A method for forming the anchor coat using the anchor coating agent is not particularly limited, but a known web applying method can be used. Specific examples thereof include roll coating, gravure coating, reverse coating, roll brushing, spray coating, air knife coating, dip coating, and die coating.

The thickness of the anchor coat is usually about from 0.1 to 5 μm, and preferably from 0.5 to 2 μm.

The total light transmittance (measured according to JIS K7361-1:1997 using a turbidimeter "NDH2000" (trade name) available from Nippon Denshoku Industries Co., Ltd.) of the hard coat laminated sheet is preferably 80% or more, more preferably 85% or more, still more preferably 88% or more, further still more preferably 89% or more, and most preferably 90% or more. A higher total light transmittance is more preferable.

The hard coat laminated sheet has a haze (measured according to JIS K7136:2000 using a turbidimeter "NDH2000 (trade name)" available from Nippon Denshoku Industries Co., Ltd.) of preferably 5% or less, more preferably 3% or less, still more preferably 2% or less. A lower haze is more preferable.

The hard coat laminated sheet has an yellowness index (measured according to JIS K7105:1981 using a chromaticity meter "SolidSpec-3700 (trade name)" available from Shimadzu Corporation) of preferably 3 or less, more preferably 2 or less, and still more preferably 1 or less. A lower yellowness index is more preferable.

The hard coat laminated sheet according to an embodiment preferably has a total light transmittance of 80% or more, a haze of 5% or less, and an yellowness index of 3 or less.

Furthermore, the hard coat laminated sheet according to an embodiment preferably has a total light transmittance of 80% or more and a haze of 3% or less, a total light transmittance of 80% or more and a haze of 2% or less, a total light transmittance of 85% or more and a haze of 5% or less, a total light transmittance of 85% or more and a haze of 3% or less, a total light transmittance of 85% or more and a haze of 2% or less, a total light transmittance of 88% or more and a haze of 5% or less, a total light transmittance of 88% or more and a haze of 3% or less, a total light transmittance of 88% or more and a haze of 2% or less, a total light transmittance of 89% or more and a haze of 5% or less, a total light transmittance of 89% or more and a haze of 3% or less, a total light transmittance of 89% or more and a haze of 2% or less, a total light transmittance of 90% or more and a haze of 5% or less, a total light transmittance of 90% or more and a haze of 3% or less, or a total light transmittance of 90% or more and a haze of 2% or less. In addition, the transparent resin laminate according to an embodiment preferably has an yellowness index of 3 or less, 2 or less, or 1 or less with respect to each combination group for these preferable ranges of the total light transmittance and the haze. Each combination group for these preferable ranges of the total light transmittance, the haze and the yellowness index can be applied to any one of the first hard coat, the second hard coat, and the transparent resin sheet exemplified above.

For the hard coat laminated sheet, the first hard coat surface has a water contact angle of preferably 1000 or more, and more preferably 1050 or more. The first hard coat usually forms a surface of the door body according to an embodiment on a front side. The water contact angle of the first hard coat surface of 1000 or more causes the hard coat laminated sheet to have good fingerprint resistance (difficulty in deposition of a fouling or stain such as a fingerprint and easiness of wiping off a fouling or stain such as a fingerprint). A higher water contact angle is more preferable, and there is no particular upper limit for the water contact angle. However, it is usually suffice that the water contact angle is about 1200 from a viewpoint of fingerprint resistance. Here, the water contact angle is a value measured according to the following test (iv).

For the hard coat laminated sheet, the water contact angle of the first hard coat surface after 20,000 reciprocating wipes with a cotton is preferably 100° or more. The water contact angle after 25,000 reciprocating wipes with a cotton is more preferably 1000 or more. The water contact angle after 20,000 reciprocating wipes with a cotton of 100° or more makes it possible to maintain surface characteristics of the hard coat laminated sheet such as fingerprint resistance even after being repeatedly wiped with a handkerchief or the like. For the number of wipes with a cotton during which a water contact angle of 100° or more can be maintained, a larger number is more preferable. Here, the water contact angle after wipes with a cotton is a value measured according to the following test (v).

For the hard coat laminated sheet, preferably, the water contact angle of the first hard coat surface is 100° or more and the water contact angle of the first hard coat surface after 20,000 reciprocating wipes with a cotton is 100° or more. Furthermore, for the hard coat laminated sheet according to an embodiment, preferably, the water contact angle at the first hard coat surface is 105° or more and the water contact angle at the first hard coat surface after 20,000 reciprocating wipes with a cottons is 1000 or more, the water contact angle at the first hard coat surface is 100° or more and the water contact angle at the first hard coat surface after 25,000 reciprocating wipes with a cotton is 100° or more, or the water contact angle at the first hard coat surface is 105° or more and the water contact angle at the first hard coat surface after 25,000 reciprocating wipes with a cotton is 100° or more.

It should be noted that the total light transmittance and/or the haze and/or the yellowness index of the hard coat laminated sheet in any preferable range referred to above can be combined with the water contact angle at the first hard coat surface in any preferable range referred to here, and/or can be combined with the water contact angle at the first hard coat surface after 20,000 or 25,000 reciprocating wipes with a cotton in any preferable range referred to here.

For the hard coat laminated sheet, the first hard coat surface has a pencil hardness (measured with a pencil "UNI (trade name)" available from Mitsubishi Pencil Co., Ltd. under a condition of a load of 750 g in accordance with JIS K5600-5-4) of preferably 5H or more, more preferably 6H or more, and still more preferably 7H or more. The pencil hardness of 5H or more causes the hard coat laminated sheet to have particularly good scratch resistance. A higher pencil hardness is more preferable.

Production Method

A method for producing the hard coat laminated sheet is not particularly limited, but the hard coat laminated sheet can be produced by any method.

From a viewpoint of adhesiveness between the first hard coat and the second hard coat, preferable examples of the production method include a method including:

(1) a step of forming a wet coat of the second hard coat forming coating material on the transparent resin sheet;

(2) a step of irradiating the wet coat of the second hard coat forming coating material with an active energy ray at an integrated amount of light of 1 to 230 mJ/cm$^2$, preferably 5 to 200 mJ/cm$^2$, more preferably 10 to 160 mJ/cm$^2$, still more preferably 20 to 120 mJ/cm$^2$, most preferably 30 to 100 mJ/cm$^2$ to form the wet coat of the second hard coat forming coating material into a coat in a set-to-touch state;

(3) a step of forming a wet coat of the first hard coat forming coating material on the coat of the second hard coat forming coating material in a set-to-touch state; and (4) a step of preheating the wet coat of the first hard coat forming coating material to a temperature of 30 to 100° C. preferably 40 to 85° C., more preferably 50 to 75° C., and irradiating the wet coat with an active energy ray at an integrated amount of light of 240 to 10000 mJ/cm$^2$, preferably 320 to 5000 mJ/cm$^2$, more preferably 360 to 2000 mJ/cm$^2$.

In the step (1), a method for forming the wet coat of the second hard coat forming coating material is not particularly limited, but a known web applying method can be used. Examples of the method include roll coating, gravure coating, reverse coating, roll brushing, spray coating, air knife coating, dip coating, and die coating.

The wet coat of the second hard coat forming coating material formed in the step (1) is made a set-to-touch state or in a state with no tackiness in the step (2), causing no problem in handling such as sticking even in direct contact with a web apparatus. Therefore, in the subsequent step (3), a wet coat of the first hard coat forming coating material can be formed on he coat of the second hard coat forming coating material in a set-to-touch state.

The clause "a coat is in a set-to-touch state (in a state with no tackiness)" referred to herein means that a coat is in a state in which no problem in handling occurs even when the coat is in direct contact with a web apparatus.

Irradiation with an active energy ray in the step (2) is performed such that the integrated amount of light is usually 1 mJ/cm$^2$ or more, preferably 5 mJ/cm$^2$ or more, more preferably 10 mJ/cm$^2$ or more, still more preferably 20 mJ/cm$^2$ or more, and most preferably 30 mJ/cm$^2$ or more from a viewpoint of converting the coat into a coat in a set-to-touch state reliably, although depending on characteristics of a coating material used for the second hard coat forming coating material. At the same time, irradiation with an active energy ray is performed such that the integrated amount of light is usually 230 mJ/cm$^2$ or less, preferably 200 mJ/cm$^2$ or less, more preferably 160 mJ/cm$^2$ or less, still more preferably 120 mJ/cm$^2$ or less, and most preferably 100 mJ/cm$^2$ or less from a viewpoint of adhesiveness between the first hard coat and the second hard coat.

The wet coat of the second hard coat forming coating material is preferably predried before irradiation with an active energy ray in the step (2). Predrying described above can be performed by causing a web to pass through a drying furnace set at a temperature of about 23 to 150° C., preferably 50 to 120° C., at a line speed such that the time required to pass from the inlet to the outlet is about 0.5 to 10 minutes and preferably 1 to 5 minutes, for example.

When irradiation with an active energy ray is performed in the step (2), the wet coat of the second hard coat forming coating material may be preheated to a temperature of 40 to 120° C., preferably 70 to 100° C. This can convert the coat into a coat in a set-to-touch state reliably. A method for preheating the coat described above is not particularly limited, but preheating can be performed by any method. Specific examples of the method will be described later in the description of the step (4).

In the step (3), a method for forming the wet coat of the first hard coat forming coating material is not particularly limited, but a known web applying method can be used. Examples of the method include roll coating, gravure coating, reverse coating, roll brushing, spray coating, air knife coating, dip coating, and die coating.

The wet coat of the first hard coat forming coating material formed in the step (3) is completely cured in the step (4). At the same time, the coat of the second hard coat forming coating material is also completely cured.

The above method can enhance adhesiveness between the first hard coat and the second hard coat, and without wishing to be bound by any theory it is presumed that the reason is that complete curing is simultaneously achieved for both the hard coats by limiting the integrated amount of light in irradiation with an active energy ray to an amount adequate to convert the coat into a coat in a set-to-touch state but inadequate to completely cure the coat in the step (2) and setting the integrated amount of light to an amount adequate to completely cure the coats in the step (4) for the first time.

Irradiation with an active energy ray in the step (4) is performed such that the integrated amount of light is usually 240 mJ/cm$^2$ or more, preferably 320 mJ/cm$^2$ or more, and more preferably 360 mJ/cm$^2$ or more from a viewpoint of completely curing the coats and adhesiveness between the first hard coat and the second hard coat. At the same time, the irradiation with an active energy ray is performed such that the integrated amount of light is 10,000 mJ/cm$^2$ or less, preferably 5,000 mJ/cm$^2$ or less, and more preferably 2,000 mJ/cm$^2$ or less from a viewpoint of preventing yellowing of a hard coat laminated film obtained and cost.

The wet coat of the first hard coat forming coating material is preferably predried before irradiation with an active energy ray in the step (4). Predrying described above can be performed by causing a web to pass through a drying furnace set at a temperature of about 23 to 150° C., preferably 50 to 120° C., at a line speed such that the time required to pass from the inlet to the outlet is about 0.5 to 10 minutes and preferably 1 to 5 minutes, for example.

Figure 10:
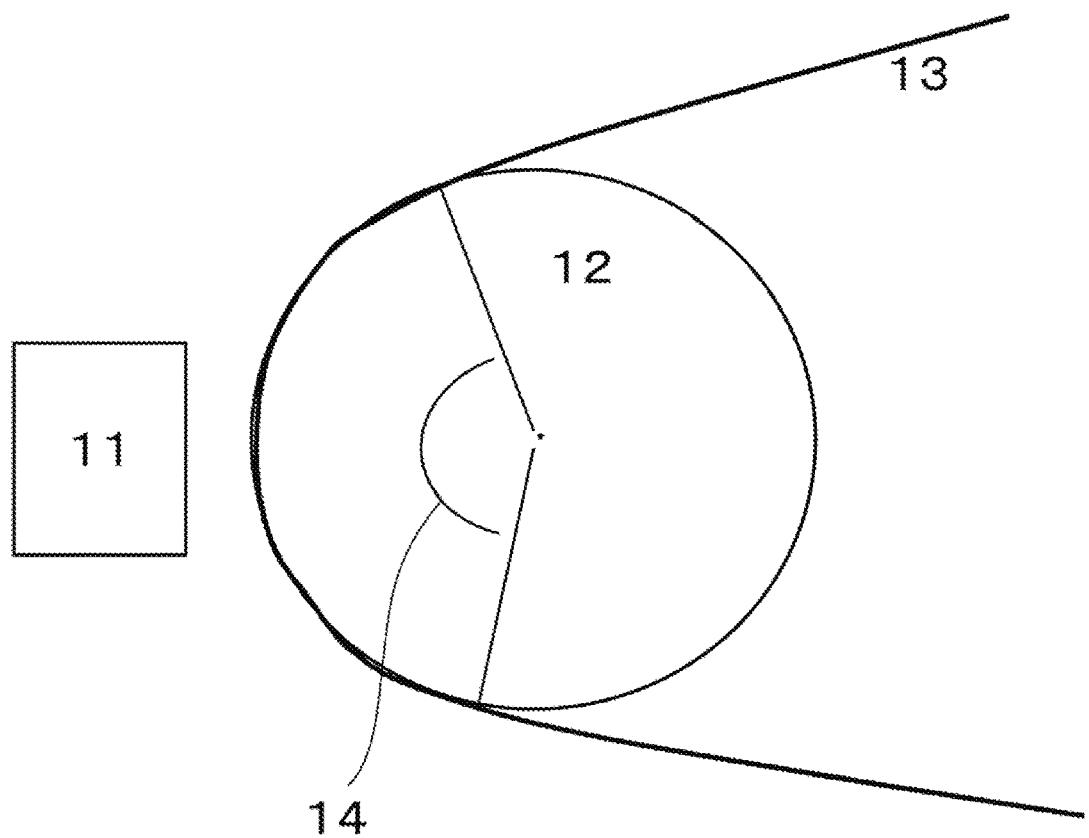
FIG. 10 is a conceptual diagram of an ultraviolet irradiator used for curing a hard coat.

In irradiation with an active energy ray in the step (4), the wet coat of the first hard coat forming coating material is favorably preheated to a temperature of 30 to 100° C., preferably 40 to 85° C., more preferably 50 to 75° C. even when the first hard coat forming coating material and the second hard coat forming coating material are largely different in characteristics from each other from a viewpoint of obtaining a good interlayer adhesion strength. A method for preheating the coat described above is not particularly limited, but preheating can be performed by any method. Examples thereof include a method in which a web 13 is held by a mirror-finished metal roll 12 disposed opposite to an active energy ray (ultraviolet ray) irradiator 11 as illustrated in FIG. 10 and a surface temperature of the mirror-finished metal roll 12 is controlled to a predetermined temperature; a method in which a temperature in an irradiation furnace surrounding an active energy ray irradiator is controlled to a predetermined temperature; and a combination of these methods.

An aging treatment may be performed after the step (4). By the aging treatment, a characteristics of the hard coat laminated sheet can be stabilized.

Transparent Pressure-Sensitive Adhesive Layer

The transparent pressure-sensitive adhesive layer will be described. The transparent pressure-sensitive adhesive layer mainly includes a highly transparent pressure-sensitive adhesive (usually 50% by mass or more, preferably 80% by mass or more, more preferably 90% by mass or more) from a viewpoint of designability. Preferably, the transparent pressure-sensitive adhesive layer is not opaque but transparent even when the door body is used as an article such as a refrigerator as well as at the time of producing the door body.

Here, the "transparent pressure-sensitive adhesive" means a pressure-sensitive adhesive having a visible light transmittance of usually 50% or more, preferably 70% or more, more preferably 80% or more, still more preferably 85% or more, most preferably 90% or more. Here, the visible light transmittance is obtained by measuring a transmission spectrum of a pressure-sensitive adhesive at wavelengths of 380 to 780 nanometers using a spectrophotometer "SolidSpec-3700" (trade name) available from Shimadzu Corporation and a quartz cell having an optical path length of 10 mm, and calculating a ratio of the integrated area of the transmission spectrum of the pressure-sensitive adhesive with respect to the integrated area of the transmission spectrum in a case where it is assumed that the transmittance in the whole range of the wavelengths of 380 to 780 nanometers is 100%. The measurement is usually performed under standard conditions of a temperature of 25° C. and a relative humidity of 50%.

Incidentally, the term "transparent pressure-sensitive adhesive" referred to herein is used as a term including a transparent adhesive. That is, the "transparent pressure-sensitive adhesive" referred to herein includes both a chemical substance exhibiting a sufficient bonding property only by pressing an adherend and a chemical substance exhibiting a sufficient bonding property through a curing/solidifying step in addition to pressing the adherend.

The transparent pressure-sensitive adhesive used for forming the transparent pressure-sensitive adhesive layer is not limited as long as having sufficient adhesive strength and being transparent, and any pressure-sensitive adhesive can be used. Examples of the transparent pressure-sensitive adhesive include an acrylic pressure-sensitive adhesive, a urethane-based pressure-sensitive adhesive, and a silicon-based pressure-sensitive adhesive. These compounds can be used singly or in a mixture of two or more kinds thereof as the transparent pressure-sensitive adhesive.

The transparent pressure-sensitive adhesive may further include an optional component other than the pressure-sensitive adhesive component, if desired, within a range not contradicting an object of the various embodiments. Examples of the optional component include an additive such as a photopolymerization initiator, a compound having two or more isocyanate groups in one molecule, an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, a pigment, and a filler. The blending amount of the optional component is usually about 0.01 to 10 parts by mass relative to 100 parts by mass of the pressure-sensitive adhesive component.

The thickness of the transparent pressure-sensitive adhesive layer is not particularly limited, but may be usually 15 μm or more and preferably 20 μm or more from a viewpoint of adhesive strength. The thickness may be usually 100 μm or less and preferably 60 μm or less from a viewpoint of thickness reduction. The thickness of the transparent pressure-sensitive adhesive layer may be usually 15 μm or more and 100 μm or less, and preferably 15 μm or more and 60 μm or less, 20 μm or more and 100 μm or less, or 20 μm or more and 60 μm or less.

The transparent pressure-sensitive adhesive preferably includes:

(P) 100 parts by mass of an acrylic polymer having a glass transition temperature of −50 to −25° C.;

(Q) 0.01 to 3 parts by mass of a silane coupling agent having an epoxy group;

(R) 0.01 to 0.9 parts by mass of a compound having two or more epoxy groups in one molecule; and (S) 0.01 to 0.5 parts by mass of an organic polyvalent metal compound.

By using such a pressure-sensitive adhesive, it is possible to easily obtain a door body solving the problem of peeling under moisture and heat, the problem of knocking flaw occurrence, and the problem of peeling during filling step.

(P) Acrylic polymer having a glass transition temperature of −50 to −25° C.

The acrylic polymer of component (P) exhibits pressure-sensitive adhesiveness as a main agent of the pressure-sensitive adhesive and also plays a role of containing therein components (Q) to (S) and another optional component.

The glass transition temperature of the acrylic polymer of component (P) is usually −50° C. or higher and preferably −40° C. or higher from a viewpoint of eliminating the above-described disadvantage concerning knocking flaw occurrence. Meanwhile, the glass transition temperature of the acrylic polymer of component (P) is usually −25° C. or lower and preferably −30° C. or lower from a viewpoint of improving tackiness (initial adhesiveness). The glass transition temperature of the acrylic polymer of component (P) may be usually −50° C. or higher and −25° C. or lower, preferably −50° C. or higher and −30° C. or lower, −40° C. or higher and −25° C. or lower, or −40° C. or higher and −30° C. or lower.

Here, the glass transition temperature of the acrylic polymer of component (P) is a calculated value determined by a conventional method, that is, a value determined from the following formula (i.e. formula of Fox):

$$1/(Tg+273) = W_1/(Tg_1+273) + W_2/(Tg_2+273) + W_3/(Tg_3+273) + \ldots + W_n/(Tg_n+273),$$

wherein Tg represents a glass transition temperature (° C.) of a polymer made from n kinds of monomers, each of $W_1$, $W_2$, $W_3$ ..., and W represents % by mass of each monomer in a monomer composition, and each of $Tg_1$, $Tg_2$, $Tg_3$ ... and $Tg_n$ represents a glass transition temperatures (° C.) of a homopolymer of each monomer.

As the Tg of each homopolymer, for example, a numerical value described in a polymer handbook and the like can be used.

The acrylic polymer of component (P) is not limited as long as having a glass transition temperature of −50 to −25° C., and any acrylic polymer can be used. The molecular weight of the acrylic polymer of component (P) is not particularly limited as long as having a glass transition temperature of −50 to −25° C. Examples of the acrylic polymer include a polymer and a copolymer made from, as a monomer, a single kind or a mixture of two or more kinds of an alkyl (meth)acrylate monomer, a carboxyl group-containing monomer, an epoxy group-containing monomer, a hydroxyl group-containing (meth)acrylate monomer, and the like. It should be noted that the term (meth)acrylic acid means acrylic acid or methacrylic acid.

Examples of the alkyl (meth)acrylate monomer include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate, and stearyl (meth)acrylate.

Examples of the carboxyl group-containing monomer include acrylic acid, methacrylic acid, itaconic acid, and β-carboxyethyl (meth)acrylate. This monomer species also includes a compound containing a (meth)acrylic acid backbone in a part of a molecule, such as itaconic acid.

Examples of the epoxy group-containing monomer include glycidyl (meth)acrylate and 4-hydroxybutyl (meth)acrylate glycidyl ether.

Examples of the hydroxyl group-containing (meth)acrylate monomer include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Examples of a commercially available product thereof include "Acrybase LKG-1010" (trade name): glass transition temperature −34° C., "Acrybase LKG-1012" (trade name): glass transition temperature −35° C., "Acrybase LKG-1001" (trade name): glass transition temperature −40° C.; and "Acrybase LKG-1007" (trade name): glass transition temperature −44° C., available from Fujikura Kasei Co., Ltd.

These compounds can be used singly or in a mixture of two or more kinds thereof for the acrylic polymer of component (P). In a case where a mixture is used as component (P), it is only desirable that the glass transition temperature of the mixture fall within the above-described range. In a case where a mixture is used as component (P), it is also preferable that the glass transition temperature of a component having the highest glass transition temperature be −25° C. or lower, and that the glass transition temperature of a component having the lowest glass transition temperature be −50° C. or higher.

(Q) Silane Coupling Agent Having an Epoxy Group

The silane coupling agent is a silane compound having at least two kinds of different reactive groups that are a hydrolyzable group(s) (for example, an alkoxy group such as a methoxy group and an ethoxy group; an acyloxy group such as an acetoxy group; or a halogen group such as a chloro group) and an organic functional group(s) (for example, an amino group, a vinyl group, an epoxy group, a methacryloxy group, an acryloxy group, or an isocyanate group). As the silane coupling agent of component (Q), a silane coupling agent having at least an epoxy group as an organic functional group is used. By having an epoxy group, the silane coupling agent of component (Q) can chemically bond to or strongly interact with component (P) and/or component (R). The silane coupling agent of component (Q) may have an organic functional group other than an epoxy group within a range not inhibiting such chemical bonding or interaction. By an action of an epoxy group, appropriate hardness can be imparted to a pressure-sensitive adhesive, and the problem of knocking flaw occurrence can be solved. In addition, the silane coupling agent of component (Q) has a hydrolyzable group and therefore can solve the problem of peeling during filling step in spite of having sufficient hardness to solve the problem of knocking flaw occurrence. Furthermore, the silane coupling agent of component (Q) has an epoxy group as an organic functional group, and therefore has excellent miscibility with component (R) and component (S).

Examples of the silane coupling agent having an epoxy group include 2-(3,4-epoxycyclohexyl) ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane. These compounds can be used singly or in a mixture of two or more kinds thereof as the silane coupling agent of component (Q).

The blending amount of the silane coupling agent of component (Q) may be usually 0.01 part by mass or more and preferably 0.03 parts by mass or more relative to 100 parts by mass of component (P) from a viewpoint of solving the problem of peeling during filling step and the problem of knocking flaw occurrence. Meanwhile, the blending amount of the silane coupling agent of component (Q) may be usually 3 parts by mass or less and preferably 1.5 parts by mass or less from a viewpoint of improving heat cycle resistance and alkali resistance. The blending amount of the silane coupling agent of component (Q) may be usually 0.01 part by mass or more and 3 parts by mass or less, and preferably 0.01 part by mass or more and 1.5 parts by mass or less, 0.03 parts by mass or more and 3 parts by mass or less, or 0.03 parts by mass or more and 1.5 parts by mass or less relative to 100 parts by mass of component (P).

(R) Compound Having Two or More Epoxy Groups in One Molecule

The epoxy group-containing compound of component (R) has two or more epoxy groups in one molecule and can chemically bond to or strongly interact with component (P) and/or component (Q). As a result, appropriate hardness is imparted to the pressure-sensitive adhesive, and the problem of knocking flaw occurrence can be solved. In addition, the epoxy group-containing compound of component (R) exhibits specific high compatibility with component (S), and can retain adhesive strength and transparency even in an environment of high temperature and high humidity.

It should be noted that the epoxy group-containing compound of component (R) is clearly distinguished from component (Q) in having no hydrolyzable group. Here, the silane compound having two or more epoxy groups in one molecule and having a hydrolyzable group is component (Q). The epoxy group-containing compound of component (R) is not particularly limited as long as having two or more epoxy groups in one molecule and having no hydrolyzable group.

Examples of the epoxy group-containing compound of component (R) include 1,3-bis(N,N'-diglycidylaminomethyl) cyclohexane, N,N,N',N'-tetraglycidyl-m-xylenediamine, diglycidyl aniline, diglycidyl amine, a bisphenol A-epichlorohydrin type epoxy resin, ethylene glycol diglycidyl ether, polyethylene glycol diglycidyl ether, glycerin diglycidyl ether, glycerin triglycidyl ether, 1,6-hexanediol diglycidyl ether, and trimethylolpropane triglycidyl ether. These compounds can be used singly or in a mixture of two or more kinds thereof as the epoxy group-containing compound of component (R).

The blending amount of the epoxy group-containing compound of component (R) may be usually 0.01 part by mass or more, preferably 0.03 parts by mass or more, and more preferably 0.04 parts by mass or more relative to 100 parts by mass of component (P) from a viewpoint of solving the problem of peeling during filling step and the problem of knocking flaw occurrence. At the same time, the blending amount of the epoxy group-containing compound of component (R) may be usually 0.9 parts by mass or less, preferably 0.6 parts by mass or less, and more preferably 0.5 parts by mass or less from a viewpoint of improving adhesiveness under heat. The blending amount of the epoxy group-containing compound of component (R) may be preferably 0.3 parts by mass or less and more preferably 0.2 parts by mass or less from a viewpoint of an anchoring property to an adherend. The amount of the epoxy group-containing compound of component (R) may be preferably 0.3 parts by mass or more and more preferably 0.4 parts by mass or more from a viewpoint of preventing cohesive failure of a pressure-sensitive adhesive layer during heat cycle. In some embodiments, the blending amount of the epoxy group-containing compound of component (R) may be usually 0.01 part by mass or more and 0.9 parts by mass or less, alternatively 0.01 part by mass or less and 0.6 parts by mass or less, 0.01 part by mass or more and 0.5 parts by mass or less, 0.03 parts by mass or more and 0.9 parts by mass or less, 0.03 parts by mass or more and 0.6 parts by mass or less, 0.03 parts by mass or more and 0.5 parts by mass or less, 0.04 parts by mass or more and 0.9 parts by mass or less, 0.04 parts by mass or more and 0.6 parts by mass or less, or 0.04 parts by mass or more and 0.5 parts by mass or less relative to 100 parts by mass of component (P).

(S) Organic Polyvalent Metal Compound

The organic polyvalent metal compound of component (S) serves to assist a chemical reaction and interaction between component (R) and component (P) or (Q). As a result, appropriate hardness is imparted to the pressure-sensitive adhesive, and the problem of knocking flaw occurrence can be solved. In addition, the organic polyvalent metal compound of component (S) exhibits specific high compatibility with component (R), and can retain adhesive strength and transparency even in an environment of high temperature and high humidity.

Examples of the organic polyvalent metal compound of component (S) include a compound in which a polyvalent metal such as aluminum, zirconium, and titanium is bonded covalently or coordinatedly to an organic compound such as an alkyl ester, an alcohol compound, a carboxylic acid compound, an ether compound, and a ketone compound.

Examples of an organic aluminum compound that can be used as the organic polyvalent metal compound of component (S) include aluminum trisacetylacetonate, aluminum ethylacetoacetate-diisopropylate, aluminum bisethylacetoacetate-monoacetylacetonate, aluminum trisethylacetoacetate, aluminum ethylate, aluminum isopropylate, aluminum diisopropylate monosecondary butylate, and aluminum secondary butylate.

Examples of an organic zirconium compound that can be used as the organic polyvalent metal compound of component (S) include n-propyl zirconate, n-butyl zirconate, zirconium tetraacetyl acetonate, zirconium monoacetyl acetonate, and zirconium ethyl acetoacetate.

Examples of an organic titanium compound that can be used as the organic polyvalent metal compound of component (S) include tetra-i-propoxytitanium, tetra-n-butoxytitanium, tetrakis(2-ethylhexyloxy) titanium, titanium-i-propoxy octylene glycolate, di-i-propoxy-bis (acetylacetonato) titanium, propane dioxytitanium bis(ethyl acetate), propane dioxytitanium bis(ethyl acetoacetate), tri-n-butoxy titanium monostearate, di-i-propoxytitanium distearate, titanium stearate, di-i-propoxytitanium diisostearate, (2-n-butoxycarbonylbenzoyloxy) tributoxytitanium, and di-n-butoxy-bis(triethanolaminato) titanium.

These compounds can be used singly or in a mixture of two or more kinds thereof as he organic polyvalent metal compound of component (S).

The blending amount of the organic polyvalent metal compound of component (S) may be usually 0.01 part by mass or more and preferably 0.03 parts by mass or more relative to 100 parts by mass of component (P) from a viewpoint of obtaining an effect of component (S). At the same time, the blending amount of the organic polyvalent metal compound of component (S) may be usually 0.5 parts by mass or less and preferably 0.3 parts by mass or less from a viewpoint of improving adhesiveness under heat. The blending amount of the organic polyvalent metal compound of component (S) may be usually 0.01 part by mass or more and 0.5 parts by mass or less, and preferably 0.01 part by mass or more and 0.3 parts by mass or less, 0.03 parts by mass or more and 0.5 parts by mass or less, or 0.03 parts by mass or more and 0.3 parts by mass or less relative to 100 parts by mass of component (P).

The pressure-sensitive adhesive including predetermined amounts of components (P) to (S) may further include an optional component(s) other than components (P) to (S), if desired, within a range not contradicting an object of the various embodiments. Examples of the optional component include an additive such as a photopolymerization initiator, a compound having two and more isocyanate groups in one molecule, an epoxy resin curing accelerator, an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, a pigment, and a filler. The blending amount of the optional component is usually about 0.01 to 10 parts by mass relative to 100 parts by mass of component (P).

Preferable examples of the optional component include an epoxy resin curing accelerator. By using the epoxy resin curing accelerator in an amount of usually about 1 to 200 parts by mass, preferably about 10 to 100 parts by mass relative to 100 parts by mass of component (R), reactivity of component (R) can be controlled. Examples of the epoxy resin curing accelerator include an imidazole compound such as 2-methylimidazole, 2-ethylimidazole, 2-ethyl-4-methylimidazole, 2-phenylimidazole, 2-phenyl-4-methylimidazole, 2-phenyl-4-methyl-5-hydroxymethylimidazole, and 2-phenyl-4,5-dihydroxymethylimidazole, and derivatives thereof; 1,8-diazabicyclo [5,4,0]-7-undecene, 1,5-diazabicyclo [4,3,0]-5-nonene, and derivatives thereof (for example, carboxylates, sulfonates, phenolates, and phenol novolac resin salts thereof); a triorganophosphine compound such as triphenylphosphine, tributylphosphine, tris(p-methylphenyl) phosphine, tris(p-methoxyphenyl) phosphine, and tris(p-ethoxyphenyl) phosphine; a quaternary phosphonium salt, triphenylphosphine-triphenyl borate, tetraphenyl phosphine-tetraphenyl borate, and triethylene ammonium-triphenyl borate. These compounds can be used singly or in a mixture of two or more kinds thereof as the epoxy resin curing accelerator.

Decorative Sheet

The decorative sheet will be described. The decorative sheet imparts high designability to the door body according to an embodiment. The decorative sheet is not particularly limited, but any decorative sheet can be used. As the decorative sheet, for example, any colored resin sheet can be used.

Examples of the colored resin sheet include colored resin sheets formed of a polyester-based resin such as aromatic polyester and aliphatic polyester; an acrylic resin; a polycarbonate-based resin; a poly(meth)acrylimide-based resin; a polyolefin-based resin such as polyethylene, polypropylene, and polymethylpentene; a cellulose-based resin such as cellophane, triacetylcellulose, diacetylcellulose, and acetylcellulose butyrate; a styrene-based resin such as polystyrene, an acrylonitrile-butadiene-styrene copolymer resin (ABS resin), a styrene-ethylene-butadiene-styrene copolymer, a styrene-ethylene-propylene-styrene copolymer, and a styrene-ethylene-ethylene-propylene-styrene copolymer; a polyvinyl chloride-based resin; a polyvinylidene chloride-based resin; a fluorine-containing resin such as polyvinylidene fluoride; polyvinyl alcohol, ethylene vinyl alcohol, polyether ether ketone, nylon, polyamide, polyimide, polyurethane, polyetherimide, polysulfone, and polyethersulfone. These sheets include an unstretched sheet, a uniaxially stretched sheet, and a biaxially stretched sheet. These sheets also include a laminated sheet obtained by laminating two or more layers of one or more of these sheets.

The thickness of the colored resin sheet is not particularly limited, but may be usually 20 μm or more, preferably 50 μm or more, and more preferably 80 μm or more. At the same time, the thickness of the colored resin sheet may be usually 1500 μm or less, preferably 800 μm or less, and more preferably 400 μm or less from a viewpoint of meeting a demand for thickness reduction of an article.

A printed layer may be provided on a front side surface of the colored resin sheet, as desired, in order to enhance the sense of design. The printed layer is provided for imparting high designability, and can be formed by printing any pattern using an any ink and an any printing machine.

Printing can be performed directly or via an anchor coat entirely or partially on a surface of the transparent resin sheet, opposite to a hard coat forming surface thereof and/or on a front side surface of the colored resin sheet. Examples of the pattern include a metal-like pattern such as hair lines, a grain pattern, a stone mesh pattern imitating a surface of a rock such as marble, a fabric pattern imitating texture or a cloth-like pattern, a tile stitch pattern, a brickwork pattern, a parquet pattern, and a patchwork. As the printing ink, an ink obtained by appropriately mixing a pigment, a solvent, a stabilizer, a plasticizer, a catalyst, a curing agent, and the like with a binder can be used. Examples of the binder include a resin such as a polyurethane resin, a vinyl chloride-vinyl acetate copolymer resin, a vinyl chloride-vinyl acetate-acrylic copolymer resin, a chlorinated polypropylene resin, an acrylic resin, a polyester resin, a polyamide resin, a butyral resin, a polystyrene resin, a nitrocellulose resin, and a cellulose acetate resin, and a resin composition thereof. In addition, in order to provide a metal-like design, aluminum, tin, titanium, indium, an oxide thereof, or the like may be vapor-deposited directly or via an anchor coat entirely or partially on a surface of the transparent resin sheet, opposite to a hard coat forming surface thereof and/or on a front side surface of the colored resin sheet by a known method.

Lamination of the hard coat laminated sheet and the decorative sheet is not particularly limited, but can be performed by any method. Examples of the method include a dry lamination method using a known adhesive and a method for forming a layer of a known pressure-sensitive adhesive and then superimposing and pressing the layer between the above two sheets.

Figure 11:
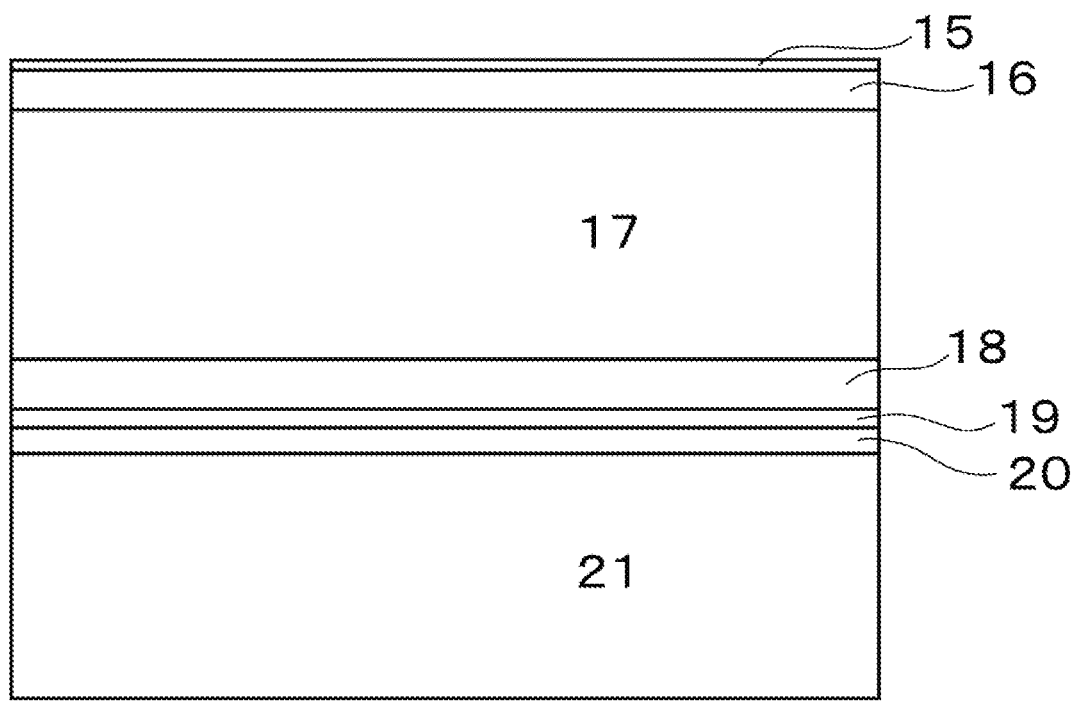
FIG. 11 is a conceptual diagram of a cross section illustrating an example of a front panel.

FIG. 11 is a conceptual diagram of a cross section illustrating an example of the hard coat laminated sheet. A first hard coat 15, a second hard coat 16, a transparent resin sheet layer 17, a third hard coat 18, a transparent pressure-sensitive adhesive layer 19, a printed layer 20, and a colored resin sheet layer 21 are arranged in order from a surface layer on a front side. Here, the hard coat laminated sheet is formed from the first hard coat 15, the second hard coat 16, the transparent resin sheet layer 17, and the third hard coat 18, and the decorative sheet is formed from the printed layer 20 and the colored resin sheet layer 21.

EXAMPLES

Hereinafter, the hard coat laminated sheet and the transparent pressure-sensitive adhesive used for the door body according to an embodiment will be further described with reference to Examples, but the various embodiments are not limited thereto. First, the hard coat laminated sheet will be described.

Methods for Measuring and Evaluating Physical Properties

Methods for measuring and evaluating physical properties of the hard coat laminated sheet will be described.

(i) Total Light Transmittance

In accordance with JIS K7361-1:1997, the total light transmittance was measured using a turbidimeter "NDH 2000" (trade name) available from Nippon Denshoku Industries Co.

(ii) Haze

In accordance with JIS K7136:2000, the haze was measured using a turbidimeter "NDH 2000" (trade name) available from Nippon Denshoku Industries Co.

(iii) Yellowness Index (YI)

In accordance with JIS K7105:1981, the yellowness index was measured using a colorimeter "SolidSpec-3700" (trade name) available from Shimadzu Corporation.

(iv) Water Contact Angle (Initial Water Contact Angle)

The water contact angle of a first hard coat surface of a hard coat laminated sheet was measured by a method for calculating the water contact angle from the width and the height of a water droplet (refer to JIS R3257:1999) using an automatic contact angle meter "DSA20" (trade name) available from KRUSS GmbH.

(v) Abrasion Resistance (Water Contact Angle after Wipes with Cotton)

A test piece was taken such that the size thereof was 150 mm in length and 50 mm in width and the machine direction of a hard coat laminated sheet was in the longitudinal direction of the test piece. This test piece was placed on a Gakushin tester according to JIS L0849:2013 such that the first hard coat of the hard coat laminated sheet was a surface. A stainless steel plate (10 mm in length, 10 mm in width, 1 mm in thickness) covered with a four-stacked-sheet gauze (medical type 1 gauze available from Kawamoto Corp.) was attached to a friction terminal of the Gakushin tester such that the length and width surface of the stainless steel plate was brought into contact with the test piece. A load of 350 g was placed on the stainless steel plate covered with the gauze, and the first hard coat surface of the test piece was rubbed 10,000 times reciprocatingly under conditions of a moving distance of the friction terminal of 60 mm and a speed of one reciprocation/sec. Thereafter, the water contact angle at the cotton-wiped portion was measured according to the method of the (iv). When the water contact angle was 100° or more, an operation of additionally performing 5,000 reciprocating rubs and then measuring the water contact angle at the cotton-wiped portion according to the method of the (iv) was repeated, and abrasion resistance was evaluated according to the following criteria.

A: The water contact angle was 1000 or more even after 25,000 reciprocating rubs.

B: After 20,000 reciprocating rubs, the water contact angle was 100° or more, but after 25,000 reciprocating rubs, the water contact angle was less than 100°.

C: After 15,000 reciprocating rubs, the water contact angle was 100° or more, but after 20,000 reciprocating rubs, the water contact angle was less than 100°.

D: After 10,000 reciprocating rubs, the water contact angle was 100° or more, but after 15,000 reciprocating rubs, the water contact angle was less than 100°.

E: The water contact angle was less than 100° after 10,000 reciprocating rubs.

(vi) Pencil Hardness

The pencil hardness of a first hard coat surface of a hard coat laminated sheet was measured according to JIS K5600-5-4 using a pencil "UNI" (trade name) available from Mitsubishi Pencil Co., Ltd. under a condition of a load of 750 g.

(vii) Scratch Resistance

The hard coat laminated sheet was placed on a Gakushin tester according to JIS L0849: 2013 such that the first hard coat of the hard coat laminated sheet was a surface. Subsequently, a steel wool of #0000 was attached to a friction terminal of the Gakushin tester, and a load of 500 g was then placed. An operation of visually observing the rubbed portion after 100 reciprocating rubs of a surface of the test piece was repeated, and scratch resistance was evaluated according to the following criteria.

A: No scratch was observed even after 500 reciprocating rubs.

B: No scratch was observed after 400 reciprocating rubs, but a scratch could be observed after 500 reciprocating rubs.

C: No scratch was observed after 300 reciprocating rubs, but a scratch could be observed after 400 reciprocating rubs.

D: No scratch was observed after 200 reciprocating rubs, but a scratch could be observed after 300 reciprocating rubs.

E: No scratch was observed after 100 reciprocating rubs, but a scratch could be observed after 200 reciprocating rubs.

F: A scratch could be observed after 100 reciprocating rubs.

(viii) Surface Smoothness (Surface Appearance)

While a first hard coat surface of a hard coat laminated sheet was irradiated with light of a fluorescent lamp by changing an incident angle in various directions, the surface was visually observed, and surface smoothness (surface appearance) thereof was evaluated according to the following criteria.

◎ (very good): The surface had no undulation nor scratch. Even if being looked through closely to the light, the surface gave no impression of cloudiness.

○ (good): When being looked through closely to the light, the surface had a portion giving an impression of slight cloudiness.

Δ (slightly poor): When being looked closely, the surface had slightly recognized undulations and scratches. The surface also gave an impression of cloudiness.

x (poor): The surface had a large number of recognized undulations and scratches. The surface also gave a definite impression of cloudiness.

(ix) Square Lattice Pattern Test (Adhesiveness)

In accordance with JIS 5600-5-6:1999, a square lattice pattern cut consisting of 100 cells (1 cell=1 mm×1 mm) was provided on a hard coat laminated sheet from a first hard coat surface side. Thereafter, a tape for an adhesion test was attached to the square lattice pattern, was rubbed with fingers, and was then peeled off. The criteria for evaluation were in accordance with Table 1 in the above standard of JIS.

Classification 0: Edges of the cuts were completely smooth, and none of the squares of the lattice was peeled off.

Classification 1: Small peeling of a coat was observed at the intersections of the cuts. A cross-cut area of clearly not more than 5% was affected.

Classification 2: A coat was peeled off along edges and/or at intersections of the cuts. A cross-cut area of clearly more than 5% but not more than 15% was affected.

Classification 3: A coat was largely peeled off along edges of cuts partially or entirely, and/or various parts of squares were peeled off partially or entirely. A cross-cut area of clearly more than 15% but not more than 35% was affected.

Classification 4: A coat was largely peeled off along edges of cuts partially or entirely, and/or some parts of squares were peeled off partially or entirely. A cross-cut area of clearly more than 35% but not more than 65% was affected.

Classification 5: A case where the degree of peeling was more than that in Classification 4 was classified into this classification.

(x) Weather Resistance

An accelerated weather resistance test of 300 hours was performed using a sunshine carbon arc lamp type weather resistance tester prescribed in JIS B7753:2007 under conditions in Table 10 of JIS A5759:2008 (a test piece which had been taken such that the size was 125 mm in length and 50 mm in width and the machine direction of a hard coat laminated sheet was in the longitudinal direction of the test piece was used as it was, and the test piece was not pasted on glass). The N number of tests was three. A case where there was no change in appearance such as swelling, cracking, and peeling in a hard coat laminated sheet in all the tests was evaluated as an acceptable product (indicated as ◎ in Tables), and the other cases were evaluated as an unacceptable product (indicated as x in Tables).

(xi) Impact Resistance

The hard coat laminated sheet was installed and fixed on a rectangular parallelepiped metal-made jig (1.100 mm in length, 900 mm in width, 200 mm in height) formed of wall faces of a front face plate, a back face plate, and side face plates and having an opened upper part such that the first hard coat surface was an upper surface and completely covered the opened part of the jig. Subsequently, a metal ball of 100 mm in diameter and 4.11 kg in mass was dropped from a height of 3,000 mm above the hard coat laminated sheet to vertexes of a regular triangle of 130 mm in one side marked on the vicinity of the center of a part covering the opened part of the hard coat laminated sheet one time for each vertex, three times in total. The N number of tests was three. A case where the metal ball did not pass through the hard coat laminated sheet in all the tests was evaluated as an acceptable product (indicated as ◎ in Tables), and the other cases were evaluated as an unacceptable product (indicated as x in Tables).

(xii) Cutting Processability (State of Curved Cut Line)

A perfect circular cutting hole with a diameter of 2 mm was formed in a hard coat laminated sheet using a router processing machine performing automatic control with a computer. A mill used at this time was a four-bladed super-hard-alloy mill with nicks, having a cylindrically round tip, and a blade diameter was appropriately selected according to a portion to be processed. Subsequently, a cut end surface of the cutting hole was observed visually or under a microscope (100 times), and was evaluated according to the following criteria.

◎ (very good):Neither crack nor burr was observed even by observation with a microscope.

○ (good):No crack was observed even by observation with a microscope. However, a burr was observed.

Δ (slightly poor):No crack was observed visually. However, a crack was observed by observation with a microscope.

x (poor):A crack was observed even visually.

Raw Materials Used (A) Polyfunctional (meth)acrylate (A-1) Dipentaerythritol hexaacrylate (hexafunctional)

(A-2) Pentaerythritol triacrylate (trifunctional)

(B) Water repellant (B-1) An acryloyl group-containing fluoropolyether water repellant "KY-1203" (trade name) available from Shin-Etsu Chemical Co., Ltd.: solid content 20% by mass (B-2) A methacryloyl group-containing fluoropolyether water repellant "FOMBLIN MT70" (trade name) available from Solvay S. A.: solid content 70% by mass (C) Silane coupling agent (C-1) N-2-(aminoethyl)-3-aminopropylmethyldimethoxysilane "KBM-602" (trade name) available from Shin-Etsu Chemical Co., Ltd.

(C-2) N-2-(aminoethyl)-3-aminopropyltrimethoxysilane "KBM-603" (trade name) available from Shin-Etsu Chemical Co., Ltd.

(C-3) 3-aminopropyltrimethoxysilane "KBM-903" (trade name) available from Shin-Etsu Chemical Co., Ltd.

(C-4) 3-mercaptopropylmethyldimethoxysilane "KBM-802" (trade name) available from Shin-Etsu Chemical Co., Ltd.

(C-5) 3-glycidoxypropyltrimethoxysilane "KBM-403" (trade name) available from Shin-Etsu Chemical Co., Ltd.

(D) Inorganic fine particles having an average particle size of 1 to 300 nm (D-1) Silica fine particles the surfaces of which have been treated with a silane coupling agent having a vinyl group and which have an average particle size of 20 nm (E) Leveling agent (E-1) A silicone-acrylate copolymer leveling agent "DISPARLON NSH-8430HF" (trade name) available from Kusumoto Chemicals, Ltd.: solid content 10% by mass (E-2) A silicone-acrylate copolymer leveling agent "BYK-3550" (trade name) available from BYK Japan KK: solid content 52% by mass (E-3) An acrylic polymer leveling agent "BYK-399" (trade name) available from BYK Japan KK: solid content 100% by mass (E-4) A silicone leveling agent "DISPARLON LS-480" (trade name) available from Kusumoto Chemicals. Ltd.: solid content 100% by mass (F) Optional component (F-1) A phenyl ketone photopolymerization initiator (1-hydroxycyclohexyl phenyl ketone) "SB-PI714" (trade name) available from Shuang Bang Industrial Corp.

(F-2) 1-methoxy-2-propanol (H1) First hard coat forming coating material (H1-1) A coating material was obtained by mixing and stirring 100 parts by mass of the (A-1), 2 parts by mass (0.40 part by mass in terms of solid content) of the (B-1), 0.06 parts by mass (0.042 parts by mass in terms of solid content) of the (B-2), 0.5 parts by mass of the (C-1), 4 parts by mass of the (F-1), and 100 parts by mass of the (F-2). Table 1 shows the components and blending amounts thereof.

(H1-2 to H1-16) Coating materials were obtained in a similar manner to the (H1-1) except that the components and blending amounts thereof were changed as illustrated in Table 1 or 2. In addition, values in terms of solid content are listed for the (B-1) and the (B-2) in Tables.

TABLE 1

| Component (part by mass) | First hard coat forming coating material | | | | | | | |
|---|---|---|---|---|---|---|---|---|
| | (H1-1) | (H1-2) | (H1-3) | (H1-4) | (H1-5) | (H1-6) | (H1-7) | (H1-8) |
| (A-1) | 100 | 100 | 100 | 100 | 100 | 100 | 100 | 100 |
| (B-1) | 0.40 | 0.080 | 0.80 | 2.0 | — | 8.0 | 0.40 | 0.40 |
| (B-2) | 0.042 | 0.0084 | 0.084 | 0.21 | — | 0.84 | 0.042 | 0.042 |
| (C-1) | 0.5 | 0.5 | 0.5 | 0.5 | 0.5 | 0.5 | 0.5 | — |
| (C-2) | — | — | — | — | — | — | — | — |
| (C-3) | — | — | — | — | — | — | — | — |
| (C-4) | — | — | — | — | — | — | — | — |
| (C-5) | — | — | — | — | — | — | — | — |
| (D-1) | — | — | — | — | — | — | 20 | — |
| (F-1) | 4 | 4 | 4 | 4 | 4 | 4 | 4 | 4 |
| (F-2) | 100 | 100 | 100 | 100 | 100 | 80 | 130 | 100 |

TABLE 2

| Component (part by mass) | First hard coat forming coating material | | | | | | | |
|---|---|---|---|---|---|---|---|---|
| | (H1-9) | (H1-10) | (H1-11) | (H1-12) | (H1-13) | (H1-14) | (H1-15) | (H1-16) |
| (A-1) | 100 | 100 | 100 | 100 | 100 | 100 | 100 | 100 |
| (B-1) | 0.40 | 0.40 | 0.40 | 0.40 | 0.40 | 0.40 | 0.40 | 0.40 |
| (B-2) | 0.042 | 0.042 | 0.042 | 0.042 | 0.042 | 0.042 | 0.042 | 0.042 |
| (C-1) | 0.01 | 0.1 | 1 | 5 | — | — | — | — |
| (C-2) | — | — | — | — | 0.5 | — | — | — |
| (C-3) | — | — | — | — | — | 0.5 | — | — |
| (C-4) | — | — | — | — | — | — | 0.5 | — |
| (C-5) | — | — | — | — | — | — | — | 0.5 |
| (D-1) | — | — | — | — | — | — | — | — |
| (F-1) | 4 | 4 | 4 | 4 | 4 | 4 | 4 | 4 |
| (F-2) | 100 | 100 | 100 | 105 | 100 | 100 | 100 | 100 |

(H2) Second hard coat forming coating material (H2-1) A coating material was obtained by mixing and stirring 100 parts by mass of the (A-2), 140 parts by mass of the (D-1), 2 parts by mass (0.2 parts by mass in terms of solid content) of the (E-1), 17 parts by mass of the (F-1), and 200 parts by mass of the (F-2). Table 3 shows the components and blending amounts thereof. In addition, values in terms of solid content are listed for the (E-1) in Tables.

(H2-2 to H2-15) Coating materials were obtained in a similar manner to the (H2-1) except that the components and blending amounts thereof were changed as illustrated in Table 3 or 4. It should be noted that values in terms of solid content are listed for the (E-1) and the (E-2) in Tables.

TABLE 3

| Component (part by mass) | Second hard coat forming coating material | | | | | | |
|---|---|---|---|---|---|---|---|
| | (H2-1) | (H2-2) | (H2-3) | (H2-4) | (H2-5) | (H2-6) | (H2-7) |
| (A-2) | 100 | 100 | 100 | 100 | 100 | 100 | 100 |
| (D-1) | 140 | 140 | 140 | 140 | 140 | 140 | 140 |

TABLE 3-continued

| | Second hard coat forming coating material | | | | | | |
|---|---|---|---|---|---|---|---|
| Component (part by mass) | (H2-1) | (H2-2) | (H2-3) | (H2-4) | (H2-5) | (H2-6) | (H2-7) |
| (E-1) | 0.2 | — | 0.1 | 0.4 | 0.6 | 1.5 | — |
| (E-2) | — | — | — | — | — | — | 0.2 |
| (E-3) | — | — | — | — | — | — | — |
| (E-4) | — | — | — | — | — | — | — |
| (F-1) | 17 | 17 | 17 | 17 | 17 | 17 | 17 |
| (F-2) | 200 | 200 | 200 | 200 | 200 | 200 | 200 |

TABLE 4

| | Second hard coat forming coating material | | | | | | | |
|---|---|---|---|---|---|---|---|---|
| Component (part by mass) | (H2-8) | (H2-9) | (H2-10) | (H2-11) | (H2-12) | (H2-13) | (H2-14) | (H2-15) |
| (A-2) | 100 | 100 | 100 | 100 | 100 | 100 | 100 | 100 |
| (D-1) | 140 | 140 | 140 | 80 | 200 | 30 | 400 | — |
| (E-1) | — | — | — | 0.2 | 0.2 | 0.2 | 0.2 | 0.2 |
| (E-2) | 0.4 | — | — | — | — | — | — | — |
| (E-3) | — | 0.3 | — | — | — | — | — | — |
| (E-4) | — | — | 0.3 | — | — | — | — | — |
| (F-1) | 17 | 17 | 17 | 17 | 17 | 17 | 17 | 17 |
| (F-2) | 200 | 200 | 200 | 155 | 250 | 120 | 420 | 200 |

(a) Transparent Resin Sheet (a1-1) Acrylic Resin Sheet 1

Figure 12:
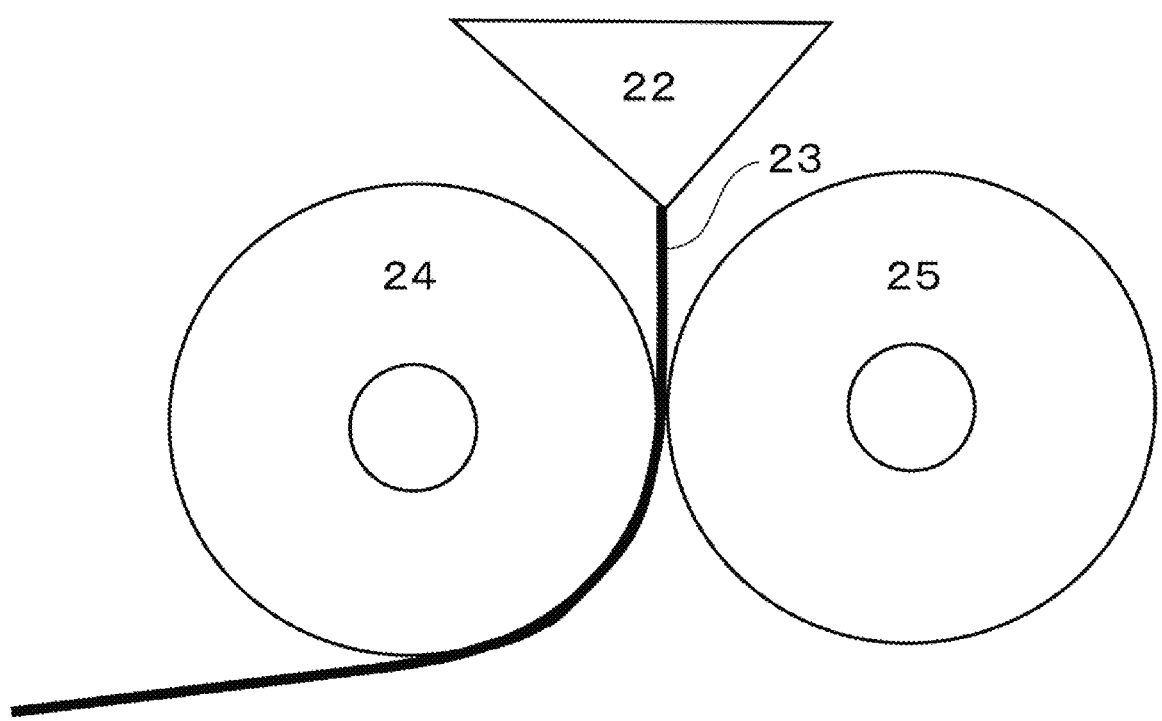
FIG. 12 is a conceptual diagram of a film-forming apparatus used for forming a transparent resin sheet in Examples.

Using an acrylic resin "Optimas 6000" (trade name) (glass transition temperature 119° C.) available from Mitsubishi Gas Chemical Company and using an apparatus equipped with a T-die 22 as illustrated in FIG. 12 and an extruder (not illustrated), a melted sheet 23 of the above resin was continuously extruded from the T-die, and the melted sheet was supplied and introduced between a rotating first mirror-finished roll 24 (a roll to hold the melted sheet and send the melted sheet to a subsequent transfer roll, this applies to the following) and a rotating second mirror-finished roll 25, and was pressed to obtain a transparent resin sheet having a thickness of 1 mm. As setting conditions at this time, a set temperature of the first mirror-finished roll was 120° C., a set temperature of the second mirror-finished roll was 110° C., and a resin temperature at an outlet of the T-die was 300° C. The resulting transparent resin sheet had a total light transmittance of 92%, a haze of 0.5%, a yellowness index of 0.3, and a tensile elastic modulus of 3400 MPa. The tensile elastic modulus here was measured according to JIS K7127:1999 under conditions of a test piece type 1B and a tensile speed of 50 mm/min. (These conditions also were employed for the following production examples).

(a1-2) Acrylic Resin Sheet 2

Using a poly(meth)acrylimide-based resin "PLEXIMID TT 50" (trade name) (glass transition temperature 154° C.) available from Evonik Industries AG and using an apparatus equipped with a T-die 22 as illustrated in FIG. 12 and an extruder (not illustrated), the melted sheet 23 of the above resin was continuously extruded from the T-die, and the melted sheet was supplied and introduced between the rotating first mirror-finished roll 24 and the rotating second mirror-finished roll 25, and was pressed to obtain a transparent resin sheet having a thickness of 1 mm. As setting conditions at this time, a set temperature of the first mirror-finished roll was 140° C., a set temperature of the second mirror-finished roll was 120° C., and a resin temperature at an outlet of the T-die was 300° C. The resulting transparent resin sheet had a total light transmittance of 92%, a haze of 0.5%, a yellowness index of 0.3, and a tensile elastic modulus of 4300 MPa.

(a2-1) Aromatic Polycarbonate-Based Resin Sheet

Using an aromatic polycarbonate "CALIBRE 301-4" (trade name) (glass transition temperature 151° C.) available from Sumika Stylon Polycarbonate Limited and using an apparatus equipped with a T-die 22 as illustrated in FIG. 12 and an extruder (not illustrated), the melted sheet 23 of the above resin was continuously extruded from the T-die, and the melted sheet was supplied and introduced between the rotating first mirror-finished roll 24 and the rotating second mirror-finished roll 25, and was pressed to obtain a transparent resin sheet having a thickness of 1 mm. As setting conditions at this time, a set temperature of the first mirror-finished roll was 140° C., a set temperature of the second mirror-finished roll was 120° C., and a resin temperature at an outlet of the T-die was 300° C. The resulting transparent resin sheet had a total light transmittance of 90%, a haze of 0.6%, a yellowness index of 0.5, and a tensile elastic modulus of 2300 MPa.

(a3-1) Polyester-Based Resin Sheet 1

Using a PETG resin "Cadence GS1" (trade name) (glass transition temperature 81° C.) which is a non-crystalline polyester-based resin available from Eastman Chemical Company and using an apparatus equipped with a T-die 22 as illustrated in FIG. 12 and an extruder (not illustrated), the melted sheet 23 of the above resin was continuously extruded from the T-die, and the melted sheet was supplied and introduced between the rotating first mirror-finished roll 24 and the rotating second mirror-finished roll 25, and was pressed to obtain a transparent resin sheet having a thickness of 1 mm. As setting conditions at this time, a set temperature of the first mirror-finished roll was 80° C., a set temperature of the second mirror-finished roll was 40° C., and a resin temperature at an outlet of the T-die was 200° C. The resulting transparent resin sheet had a total light transmittance of 89%, a haze of 1.3%, a yellowness index of 0.4, and a tensile elastic modulus of 1500 MPa.

(a3-2) Polyester-Based Resin Sheet 2

Using a non-crystalline polyester resin "Tritan FX200" (trade name) (glass transition temperature 119° C.) available from Eastman Chemical Company and using an apparatus equipped with a T-die 22 as illustrated in FIG. 12 and an extruder (not illustrated), the melted sheet 23 of the above resin was continuously extruded from the T-die, and the melted sheet was supplied and introduced between the rotating first mirror-finished roll 24 and the rotating second mirror-finished roll 25, and was pressed to obtain a transparent resin sheet having a thickness of 1 mm. As setting conditions at this time, a set temperature of the first mirror-finished roll was 80° C., a set temperature of the second mirror-finished roll was 40° C., and a resin temperature at an outlet of the T-die was 230° C. The resulting transparent resin sheet had a total light transmittance of 90%, a haze of 1.2%, a yellowness index of 0.4, and a tensile elastic modulus of 1500 MPa.

(a4-1) Laminated Sheet 1

Using a two-kind/three-layer multi-manifold type co-extrusion film-forming apparatus equipped with an extruder and a T-die, a melted laminated sheet having both outer layers of an acrylic resin "Optimas 7500" (trade name) (glass transition temperature 119° C.) available from Mitsubishi Gas Chemical Company and having an intermediate layer of an aromatic polycarbonate "CALIBRE 301-4" (trade name) (glass transition temperature:151° C.) available from Sumika Stylon Polycarbonate Limited was continuously extruded from the T-die. The melted laminated sheet was supplied and introduced between a rotating first mirror-finished roll and a rotating second mirror-finished roll, and was pressed to obtain a transparent resin sheet having a total thickness of 1 mm, a thickness of each of both the outer layers of 0.1 mm, and a thickness of an intermediate layer of 0.8 mm. As setting conditions at this time, a set temperature of the first mirror-finished roll was 120° C., a set temperature of the second mirror-finished roll was 110° C., and a resin temperature at an outlet of the T-die was 300° C. The resulting transparent resin sheet had a total light transmittance of 91%, a haze of 0.6%, a yellowness index of 0.5, and a tensile elastic modulus of 2600 MPa.

Example 1

Both surfaces of the acrylic resin sheet 1 of the (a1-1) were subjected to a corona discharge treatment. Both the surfaces had a wetting index of 64 mN/m. Subsequently, the second hard coat forming coating material of the (H2-1) was applied onto one surface of the acrylic resin sheet 1 of the (a1-1) such that the wet thickness was 40 μm (thickness after curing 22 μm) using a die type applicator. Subsequently, the resulting product was caused to pass through a drying furnace set at an inner temperature of 90° C. at a line speed such that time required for passing from the inlet to the outlet was one minute. Thereafter, the resulting product was treated using a curing apparatus having a high-pressure mercury lamp type ultraviolet irradiator 11 and a mirror-finished metal roll 12 having a diameter of 25.4 cm disposed opposite to each other (see FIG. 10) under conditions of a temperature of the mirror-finished metal roll 12 of 90° C. and an integrated amount of light of 80 mJ/cm$^2$. In FIG. 10, the reference sign 13 represents a web, and the reference sign 14 represents a holding angle. The wet coat of the second hard coat forming coating material of the (H2-1) became a coat in a set-to-touch state. Subsequently, the first hard coat forming coating material of the (H1-1) was applied onto the coat of the second hard coat forming coating material of the (H2-1) in a set-to-touch state such that the wet thickness was 4 μm (thickness after curing 2 μm) using a die type applicator. Subsequently, the resulting product was caused to pass through a drying furnace set at an inner temperature of 80° C. at a line speed such that time required for passing from the inlet to the outlet was one minute. Thereafter, the resulting product was treated using a curing apparatus having a high-pressure mercury lamp type ultraviolet irradiator 11 and a mirror-finished metal roll 12 having a diameter of 25.4 cm disposed opposite to each other (see FIG. 10) under conditions of a temperature of the mirror-finished metal roll 12 of 60° C. and an integrated amount of light of 480 mJ/cm$^2$ to form the first hard coat and the second hard coat Subsequently, a third hard coat was formed on the other surface of the acrylic resin sheet 1 of the (a1-1) with the same coating material as that in forming the second hard coat (the (H2-1) in Example 1) using a die type applicator such that the thickness after curing was 22 μm, and a hard coat laminated sheet was obtained. This hard coat laminated sheet was subjected to the tests (i) to (xii) for measuring and evaluating physical properties thereof. The results are illustrated in Table 5.

Examples 2 to 16

Production of a hard coat laminated sheet and measurement and evaluation of physical properties thereof were performed in a similar manner to Example 1 except that the coating material illustrated in one of Tables 5 to 7 was used in place of the (H1-1). The results are illustrated in one of Tables 5 to 7.

Examples 17 to 30

Production of a hard coat laminated sheet and measurement and evaluation of physical properties thereof were performed in a similar manner to Example 1 except that the coating material illustrated in one of Tables 7 to 9 was used in place of the (H2-1). The results are illustrated in one of Tables 7 to 9.

Examples 31 to 35

Production of a hard coat laminated sheet and measurement and evaluation of physical properties thereof were performed in a similar manner to Example 1 except that the transparent resin sheet illustrated in Table 9 was used in place of the (a1-1). The results are illustrated in Table 9.

Examples 36 to 39

Production of a hard coat laminated sheet and measurement and evaluation of physical properties thereof were performed in a similar manner to Example 1 except that the thickness of the first hard coat after curing was changed as illustrated in Table 10. The results are illustrated in Table 10. It should be noted that the hard coat is abbreviated as "HC" in Table 10.

Examples 40 to 43

Production of a hard coat laminated sheet and measurement and evaluation of physical properties thereof were performed in a similar manner to Example 1 except that the thickness of the second hard coat after curing was changed as illustrated in Table 10 and that the thickness of the third hard coat after curing was changed to the same thickness as the thickness of the second hard coat after curing. The results are illustrated in Table 10.

TABLE 5

|   |   | Ex. 1 | Ex. 2 | Ex. 3 | Ex. 4 | Ex. 5 | Ex. 6 | Ex. 7 |
|---|---|---|---|---|---|---|---|---|
| Composition | First hard coat coating material | H1-1 | H1-2 | H1-3 | H1-4 | H1-5 | H1-6 | H1-7 |
|  | Second hard coat coating material | H2-1 | H2-1 | H2-1 | H2-1 | H2-1 | H2-1 | H2-1 |
|  | Transparent resin sheet | a1-1 | a1-1 | a1-1 | a1-1 | a1-1 | a1-1 | a1-1 |
| Evaluation result | Total light transmittance % | 90.4 | 90.4 | 90.3 | 89.9 | 90.4 | 89.3 | 89.6 |
|  | Haze % | 0.7 | 0.6 | 0.8 | 1.8 | 0.6 | 4.0 | 0.8 |
|  | Yellowness index | 0.6 | 0.6 | 0.6 | 0.6 | 0.6 | 0.6 | 0.6 |
|  | Water contact angle deg | 116 | 115 | 116 | 118 | 72.1 | 119 | 116 |
|  | Abrasion resistance | A | B | A | A | E | A | E |
|  | Pencil hardness | 7H | 7H | 7H | 7H | 5H | 7H | 7H |
|  | Scratch resistance | A | A | A | A | D | A | F |
|  | Surface smoothness | ◎ | ◎ | ◎ | ◎ | ◎ | ◎ | ◎ |
|  | Square lattice pattern test | Classification 0 | Classification 0 | Classification 0 | Classification 0 | Classification 0 | Classification 0 | Classification 0 |
|  | Weather resistance | ◎ | ◎ | ◎ | ◎ | ◎ | ◎ | ◎ |
|  | Impact resistance | ◎ | ◎ | ◎ | ◎ | ◎ | ◎ | ◎ |
|  | Cutting processability | ◎ | ◎ | ◎ | ◎ | ◎ | ◎ | ◎ |

TABLE 6

|   |   | Ex. 8 | Ex. 9 | Ex. 10 | Ex. 11 | Ex. 12 | Ex. 13 | Ex. 14 |
|---|---|---|---|---|---|---|---|---|
| Composition | First hard coat coating material | H1-8 | H1-9 | H1-10 | H1-11 | H1-12 | H1-13 | H1-14 |
|  | Second hard coat coating material | H2-1 | H2-1 | H2-1 | H2-1 | H2-1 | H2-1 | H2-1 |
|  | Transparent resin sheet | a1-1 | a1-1 | a1-1 | a1-1 | a1-1 | a1-1 | a1-1 |
| Evaluation result | Total light transmittance % | 90.4 | 90.4 | 90.4 | 90.4 | 90.4 | 90.4 | 90.4 |
|  | Haze % | 0.7 | 0.7 | 0.7 | 0.7 | 0.7 | 0.7 | 0.7 |
|  | Yellowness index | 0.6 | 0.6 | 0.6 | 0.6 | 0.6 | 0.6 | 0.6 |
|  | Water contact angle deg | 116 | 116 | 116 | 116 | 116 | 116 | 116 |
|  | Abrasion resistance | A | A | A | A | A | A | A |
|  | Pencil hardness | 7H | 7H | 7H | 7H | 7H | 7H | 7H |
|  | Scratch resistance | A | A | A | A | A | A | A |
|  | Surface smoothness | ◎ | ◎ | ◎ | ◎ | ◎ | ◎ | ◎ |
|  | Square lattice pattern test | Classification 4 | Classification 1 | Classification 0 | Classification 0 | Classification 0 | Classification 0 | Classification 0 |
|  | Weather resistance | ◎ | ◎ | ◎ | ◎ | ◎ | ◎ | ◎ |
|  | Impact resistance | ◎ | ◎ | ◎ | ◎ | ◎ | ◎ | ◎ |
|  | Cutting processability | ◎ | ◎ | ◎ | ◎ | ◎ | ◎ | ◎ |

TABLE 7

|   |   | Ex. 15 | Ex. 16 | Ex. 17 | Ex. 18 | Ex. 19 | Ex. 20 | Ex. 21 |
|---|---|---|---|---|---|---|---|---|
| Composition | First hard coat coating material | H1-15 | H1-16 | H1-1 | H1-1 | H1-1 | H1-1 | H1-1 |
|  | Second hard coat coating material | H2-1 | H2-1 | H2-2 | H2-3 | H2-4 | H2-5 | H2-6 |
|  | Transparent resin sheet | a1-1 | a1-1 | a1-1 | a1-1 | a1-1 | a1-1 | a1-1 |
| Evaluation result | Total light transmittance % | 90.4 | 90.4 | 90.4 | 90.4 | 90.4 | 90.4 | 90.4 |
|  | Haze % | 0.7 | 0.7 | 0.8 | 0.7 | 0.7 | 0.7 | 1.0 |
|  | Yellowness index | 0.6 | 0.6 | 0.6 | 0,6 | 0.6 | 0.6 | 0.6 |
|  | Water contact angle deg | 116 | 116 | 116 | 116 | 116 | 116 | 116 |
|  | Abrasion resistance | A | A | B | A | A | A | A |
|  | Pencil hardness | 7H | 7H | 7H | 7H | 7H | 7H | 7H |
|  | Scratch resistance | A | A | B | A | A | A | A |
|  | Surface smoothness | ◎ | ◎ | ○ | ○ | ◎ | ◎ | ◎ |
|  | Square lattice pattern test | Classification 0 | Classification 3 | Classification 0 | Classification 0 | Classification 0 | Classification 0 | Classification 2 |
|  | Weather resistance | ◎ | ◎ | ◎ | ◎ | ◎ | ◎ | ◎ |
|  | Impact resistance | ◎ | ◎ | ◎ | ◎ | ◎ | ◎ | ◎ |
|  | Cutting processability | ◎ | ◎ | ◎ | ◎ | ◎ | ◎ | ◎ |

TABLE 8

|  |  | Ex. 22 | Ex. 23 | Ex. 24 | Ex. 25 | Ex. 26 | Ex. 27 | Ex. 28 |
|---|---|---|---|---|---|---|---|---|
| Composition | First hard coat coating material | H1-1 | H1-1 | H1-1 | H1-1 | H1-1 | H1-1 | H1-1 |
|  | Second hard coat coating material | H2-7 | H2-8 | H2-9 | H2-10 | H2-11 | H2-12 | H2-13 |
|  | Transparent resin sheet | a1-1 | a1-1 | a1-1 | a1-1 | a1-1 | a1-1 | a1-1 |
| Evaluation result | Total light transmittance % | 90.4 | 90.4 | 90.4 | 90.4 | 90.6 | 89.5 | 90.6 |
|  | Haze % | 0.7 | 0.7 | 1.0 | 1.0 | 0.7 | 1.1 | 0.6 |
|  | Yellowness index | 0.6 | 0.6 | 0.6 | 0.6 | 0.6 | 0.6 | 0.6 |
|  | Water contact angle deg | 116 | 116 | 116 | 116 | 116 | 116 | 116 |
|  | Abrasion resistance | A | A | A | A | A | A | A |
|  | Pencil hardness | 7H | 7H | 7H | 7H | 6H | 8H | 3H |
|  | Scratch resistance | A | A | A | A | A | A | A |
|  | Surface smoothness | ◎ | ◎ | ○ | ◎ | ◎ | ◎ | ◎ |
|  | Square lattice pattern test | Classification 0 | Classification 0 | Classification 0 | Classification 2 | Classification 0 | Classification 0 | Classification 0 |
|  | Weather resistance | ◎ | ◎ | ◎ | ◎ | ◎ | ◎ | ◎ |
|  | Impact resistance | ◎ | ◎ | ◎ | ◎ | ◎ | ◎ | ◎ |
|  | Cutting processability | ◎ | ◎ | ◎ | ◎ | ◎ | ◎ | ◎ |

TABLE 9

|  |  | Ex. 29 | Ex. 30 | Ex. 31 | Ex. 32 | Ex. 33 | Ex. 34 | Ex. 35 |
|---|---|---|---|---|---|---|---|---|
| Composition | First hard coat coating material | H1-1 | H1-1 | H1-1 | H1-1 | H1-1 | H1-1 | H1-1 |
|  | Second hard coat coating material | H2-14 | H2-15 | H2-1 | H2-1 | H2-1 | H2-1 | H2-1 |
|  | Transparent resin sheet | a1-1 | a1-1 | a1-2 | a2-1 | a3-1 | a3-2 | a4-1 |
| Evaluation result | Total light transmittance % | 87.5 | 90.5 | 90.4 | 90.1 | 89.2 | 89.3 | 90.4 |
|  | Haze % | 4.0 | 0.1 | 0.7 | 0.8 | 1.2 | 1.1 | 0.7 |
|  | Yellowness index | 0.6 | 0.3 | 0.6 | 0.7 | 0.7 | 0.7 | 0.6 |
|  | Water contact angle deg | 116 | 116 | 116 | 116 | 116 | 116 | 116 |
|  | Abrasion resistance | A | A | A | A | A | A | A |
|  | Pencil hardness | 9H | H | 7H | 2H | H | H | 7H |
|  | Scratch resistance | A | A | A | A | A | A | A |
|  | Surface smoothness | ◎ | ◎ | ◎ | ◎ | ◎ | ◎ | ◎ |
|  | Square lattice pattern test | Classification 0 | Classification 0 | Classification 0 | Classification 0 | Classification 0 | Classification 0 | Classification 0 |
|  | Weather resistance | ◎ | ◎ | ◎ | ◎ | ◎ | ◎ | ◎ |
|  | Impact resistance | ◎ | ◎ | ◎ | ◎ | ◎ | ◎ | ◎ |
|  | Cutting processability | ◎ | ◎ | ◎ | ◎ | ◎ | ◎ | ◎ |

TABLE 10

|  |  | Ex. 36 | Ex. 37 | Ex. 38 | Ex. 39 | Ex. 40 | Ex. 41 | Ex. 42 | Ex. 43 |
|---|---|---|---|---|---|---|---|---|---|
| Composition | First hard coat coating material | H1-1 | H1-1 | H1-1 | H1-1 | H1-1 | H1-1 | H1-1 | H1-1 |
|  | Thickness μm | 0.5 | 1 | 3 | 5 | 2 | 2 | 2 | 2 |
|  | Second hard coat coating material | H2-1 | H2-1 | H2-1 | H2-1 | H2-1 | H2-1 | H2-1 | H2-1 |
|  | Thickness μm | 22 | 22 | 22 | 22 | 15 | 18 | 25 | 35 |
|  | Transparent resin sheet | a1-1 | a1-1 | a1-1 | a1-1 | a1-1 | a1-1 | a1-1 | a1-1 |
| Evaluation result | Total light transmittance % | 90.4 | 90.4 | 90.4 | 90.4 | 90.6 | 90.3 | 90.0 | 89.5 |
|  | Haze % | 0.7 | 0.7 | 0.9 | 1.4 | 0.7 | 0.7 | 0.7 | 0.7 |
|  | Yellowness index | 0.6 | 0.6 | 0.6 | 0.6 | 0.6 | 0.6 | 0.6 | 0.6 |
|  | Water contact angle deg | 116 | 116 | 116 | 116 | 116 | 116 | 116 | 116 |
|  | Abrasion resistance | B | A | A | A | A | A | A | A |
|  | Pencil hardness | 5H | 7H | 7H | 7H | 5H | 7H | 7H | 9H |
|  | Scratch resistance | B | A | A | A | A | A | A | A |
|  | Surface smoothness | ◎ | ◎ | ◎ | ◎ | ◎ | ◎ | ◎ | ◎ |
|  | Square lattice pattern test | Classification 0 | Classification 0 | Classification 0 | Classification 2 | Classification 0 | Classification 0 | Classification 0 | Classification 0 |
|  | Weather resistance | ◎ | ◎ | ◎ | ◎ | ◎ | ◎ | ◎ | ◎ |
|  | Impact resistance | ◎ | ◎ | ◎ | ◎ | ◎ | ◎ | ◎ | ◎ |
|  | Cutting processability | ◎ | ◎ | ◎ | ◎ | ◎ | ◎ | ◎ | ◎ |

It has been found that the preferable hard coat laminated sheets described in these Examples are excellent in transparency, rigidity, scratch resistance, weather resistance, impact resistance, and processability, and can maintain initial properties even when being repeatedly squeezed with a wiper or the like or repeatedly wiped with a cloth or the like. Therefore, the preferable hard coat laminated sheets can be suitably used as a material of the door body according to an embodiment. In addition, a door body including of any one of the hard coat laminated sheets described in these Examples has the above-described preferable properties, and therefore can be used for various articles such as a home appliance including a refrigerator (for example, a door of a system kitchen, a door of a wine cellar, a lid of a washing machine, and a lid of a dishwasher). The refrigerator here may be any known one.

Next, a transparent pressure-sensitive adhesive used for the door body according to various embodiments will be further described with reference to Examples, but the various embodiments are not limited thereto.

Methods for Measuring and Evaluating Physical Properties

Methods for measuring and evaluating physical properties relating to a transparent pressure-sensitive adhesive will be described.

(I) Initial Adhesion Strength

180° peeling adhesive strength to a test plate was measured at a speed of 300 mm/min at a temperature of 23° C. in accordance with JIS A5759: 2008 except that a test piece (width 50 mm, length 125 mm) which had been taken from the hard coat laminated sheet of Example 1 such that a machine direction of the hard coat laminated sheet was the same as a longitudinal direction of the test piece was used as a test plate and a surface of the test piece on a third hard coat side was used as a bonding surface to a decorative sheet. Initial adhesion strength is preferably 15 N/25 mm or more, more preferably 20 N/25 mm or more, and still more preferably 25 N/25 mm or more. Initial adhesion strength may be preferably 50 N/25 mm or less and more preferably 45 N/25 mm or less in consideration of reworkability.

(II) Adhesiveness Under Heat

Adhesive strength of a decorative sheet after heat treatment was measured in a similar manner to the test (I) except that a test piece was subjected to heat treatment at a temperature of 60° C. for 10 minutes and then the adhesive strength was measured. Adhesiveness under heat (i.e. adhesive strength after heat treatment) is preferably 5 N/25 mm or more, more preferably 10 N/25 mm or more, and still more preferably 15 N/25 mm or more.

(III) Heat Cycle Resistance

Adhesive strength of a decorative sheet after heat cycle was measured in a similar manner to the test (I) except that a Lest piece was subjected to three cycles in which one cycle was defined as the following two steps of exposing the test piece to an environment of a temperature of −30° C. and a relative humidity of 90% for 6 hours and then exposing the test piece to an environment of a temperature of 60° C. and a relative humidity of 90% for 6 hours, and then adhesive strength was measured. Subsequently, a ratio (residual ratio) of the adhesive strength after heat cycle to a value of the test (I) was calculated. Heat cycle resistance (i.e. residual ratio of adhesive strength after heat cycle) is preferably 70% or more, more preferably 80% or more, and still more preferably 90% or more. There is no particular upper limit on the residual ratio.

(IV) Alkali Resistance

Adhesive strength of a decorative sheet after immersion treatment was measured in a similar manner to the test (I) except that a test piece was immersed in an aqueous solution of sodium hydroxide having a concentration of 5% by mass and a temperature of 25° C. for 24 hours and then adhesive strength was measured. Subsequently, a ratio (residual ratio) of adhesive strength after the immersion treatment to a value of the test (I) was calculated. Alkali resistance (i.e. residual ratio of adhesive strength after immersion treatment) is preferably 70% or more, more preferably 80% or more, and still more preferably 90% or more. There is no particular upper limit on the residual ratio.

(V) Resistance to Knocking Flaw Occurrence

A decorative sheet was visually observed from the hard coat laminated sheet side while a stainless steel ball having a diameter of 1 mm was pressed with a force of 1 N from the decorative sheet side of a test piece prepared in a similar manner to the test (I), and the decorative sheet was evaluated according to the following criteria.

○ (good): A pressing point of the ball cannot be visually recognized.

x (poor): A pressing point of the ball can be visually recognized clearly.

(VI) Resistance to Peeling Under Moisture and Heat

Adhesive strength of a decorative sheet after moisture and heat treatment was measured in a similar manner to the test (I) except that a test piece was exposed to an environment of a temperature of 60° C. and a relative humidity of 98% for 400 hours and then the adhesive strength was measured. Subsequently, a ratio (residual ratio) of adhesive strength after the moisture and heat treatment to a value of the test (I) was calculated. Resistance to peeling under moisture and heat (i.e. residual ratio of adhesive strength after moisture and heat treatment) is preferably 70% or more, more preferably 80% or more, and still more preferably 90% or more. There is no particular upper limit on the residual ratio.

(VII) Resistance to Whitening Under Moisture and Heat

In the test (VI), before adhesive strength after the moisture and heat treatment was measured, a pressure-sensitive adhesive layer was visually observed and was evaluated according to the following criteria.

○ (good): No change is observed in transparency of a pressure-sensitive adhesive layer as compared with the pressure-sensitive adhesive layer before exposure.

Δ (slightly poor): It is recognized that whitening has occurred as compared with the pressure-sensitive adhesive layer before exposure, but the degree of whitening is not large.

x (poor): It is recognized that whitening has occurred to a considerable degree.

(VIII) Warm Water Resistance

Adhesive strength of a decorative sheet after warm water treatment was measured in a similar manner to the test (I) except that a test piece was immersed in water at a temperature of 50° C. for 240 hours and then the adhesive strength was measured. Subsequently, a ratio (residual ratio) of adhesive strength after the warm water treatment to a value of the test (I) was calculated. The warm water resistance (residual ratio of adhesive strength after warm water treatment) is preferably 70% or more, more preferably 80% or more, and still more preferably 90% or more. There is no particular upper limit on the residual ratio.

(IX) Resistance to Whitening in Warm Water

In the test (VIII), before adhesive strength after the warm water treatment was measured, a pressure-sensitive adhesive layer was visually observed and was evaluated according to the following criteria.

○ (good): No change is observed in transparency of a pressure-sensitive adhesive layer as compared with the pressure-sensitive adhesive layer before immersion treatment.

Δ (slightly poor): It is recognized that whitening has occurred as compared with the pressure-sensitive adhesive layer before immersion treatment, but the degree of whitening is not large.

x (poor): It is recognized that whitening has occurred to a considerable degree.

Raw Materials Used (P) Acrylic polymer having a glass transition temperature of −50 to −25° C.

(P-1) "Acrybase LKG-1010" (trade name) available from Fujikura Kasei Co., Ltd.: glass transition temperature −34° C., acid value 1.9 mg KOH/g, weight average molecular weight 850,000

(P-2) "Acrybase LKG-1007" (trade name) available from Fujikura Kasei Co., Ltd.: glass transition temperature −44° C., acid value 2.1 mg KOH/g, weight average molecular weight 1,000,000

(P-3) "Acrybase LKG-1001" (trade name) available from Fujikura Kasei Co., Ltd.: glass transition temperature −40° C., acid value 7 mg KOH/g, weight average molecular weight 1,000,000

(P') Acrylic polymer for reference (P'-1) "Acrybase LKG-1011" (trade name) available from Fujikura Kasei Co., Ltd.: glass transition temperature −53° C. acid value 1.9 mg KOH/g, weight average molecular weight 1,000,000

(P'-2) "Acrybase LKG-1101" (trade name) available from Fujikura Kasei Co., Ltd.: glass transition temperature −22° C., acid value 0.3 mg KOH/g, weight average molecular weight 430,000

(Q) Silane coupling agent having an epoxy group (Q-1) 3-glycidoxypropyltrimethoxysilane "KBM-403" (trade name) available from Shin-Etsu Chemical Co., Ltd.

(Q-2) 3-glycidoxypropyltriethoxysilane "KBE-403" (trade name) available from Shin-Etsu Chemical Co., Ltd.

(Q') Silane coupling agent for reference (Q'-1) 3-methacryloxypropyltrimethoxysilane "Z-6030" (trade name) available from Dow Corning Toray Co.

(R) Compound having two or more epoxy groups in one molecule (R-1) 1,3-bis(N,N'-diglycidylaminomethyl) cyclohexane (S) Organic polyvalent metal compound (S-1) Aluminum trisacetylacetonate Example 44

100 parts by mass of the (P-1), 0.057 parts by mass of the (Q-1), 0.077 parts by mass of the (R-1), and 0.023 parts by mass of the (S-1) in terms of solid content were mixed and stirred to obtain a transparent pressure-sensitive adhesive. Next, a layer including of the transparent pressure-sensitive adhesive obtained above was formed on one side of a colored polyvinyl chloride-based resin composition sheet having a thickness of 80 μm such that the layer thickness after drying was 50 μm, and a decorative sheet with the pressure-sensitive adhesive layer was obtained. The tests (I) to (IX) were performed on this decorative sheet. Table 11 illustrates a blending composition of the transparent pressure-sensitive adhesive and measurement and evaluation results of physical properties thereof.

Examples 45 to 64

Preparation of a transparent pressure-sensitive adhesive and measurement and evaluation of physical properties thereof were performed in a similar manner to Example 44 except that blending of the pressure-sensitive adhesive was changed as illustrated in one of Tables 11 to 13. Tables 11 to 13 each illustrate a blending composition of the transparent pressure-sensitive adhesive and measurement and evaluation results of physical properties thereof.

TABLE 11

| | | Ex. 44 | Ex. 45 | Ex. 46 | Ex. 47 | Ex. 48 | Ex. 49 | Ex. 50 |
|---|---|---|---|---|---|---|---|---|
| Blending of pressure-sensitive adhesive (part by mass) | P-1 | 100 | — | — | — | — | 100 | 100 |
| | P-2 | — | 100 | — | — | — | — | — |
| | P-3 | — | — | 100 | — | — | — | — |
| | P'-1 | — | — | — | 100 | — | — | — |
| | P'-2 | — | — | — | — | 100 | — | — |
| | Q-1 | 0.057 | 0.057 | 0.057 | 0.057 | 0.057 | — | 0.5 |
| | Q-2 | — | — | — | — | — | — | — |
| | Q'-1 | — | — | — | — | — | — | — |
| | R-1 | 0.077 | 0.077 | 0.077 | 0.077 | 0.077 | 0.077 | 0.077 |
| | S-1 | 0.023 | 0.023 | 0.023 | 0.023 | 0.023 | 0.023 | 0.023 |
| Evaluation result | Initial adhesion strength N/25 mm | 24.7 | 19.1 | 19.7 | 20.2 | 4.7 | 20.1 | 16.4 |
| | Heat resistance on adhesiveness N/25 mm | 17.3 | 12.6 | 131 | 9.0 | 3.1 | 8.5 | 11.8 |
| | Heat cycle resistance % | 107 | 116 | 113 | 112 | 88 | 55 | 107 |
| | Alkali resistance % | 106 | 119 | 122 | 121 | 121 | 63 | 104 |
| | Resistance to knocking flaw occurrence | ○ | ○ | ○ | X | ○ | ○ | ○ |
| | Resistance to peeling under moisture and heat % | 109 | 155 | 150 | 151 | 137 | 56 | 107 |
| | Resistance to whitening under moisture and heat | ○ | ○ | ○ | ○ | ○ | ○ | ○ |
| | Warm water resistance % | 105 | 195 | 191 | 242 | 215 | 56 | 104 |
| | Resistance to whitening in warm water | ○ | ○ | ○ | ○ | ○ | ○ | ○ |

TABLE 12

| | | Ex. 51 | Ex. 52 | Ex. 53 | Ex. 54 | Ex. 55 | Ex. 56 | Ex. 57 |
|---|---|---|---|---|---|---|---|---|
| Blending of pressure-sensitive adhesive (part by mass) | P-1 | 100 | 100 | 100 | 100 | 100 | 100 | 100 |
| | P-2 | — | — | — | — | — | — | — |
| | P-3 | — | — | — | — | — | — | — |
| | P'-1 | — | — | — | — | — | — | — |
| | P'-2 | — | — | — | — | — | — | — |
| | Q-1 | 1.0 | 5.0 | 0.057 | 0.057 | 0.057 | 0.057 | 0.057 |
| | Q-2 | — | — | — | — | — | — | — |
| | Q'-1 | — | — | — | — | — | — | — |
| | R-1 | 0.077 | 0.077 | — | 0.30 | 0.46 | 0.60 | 1.0 |
| | S-1 | 0.023 | 0.023 | 0.06 | 0.06 | 0.023 | 0.023 | 0.023 |
| Evaluation result | Initial adhesion strength N/25 mm | 26.8 | 11.7 | 11.4 | 28.9 | 36.1 | 39.0 | 7.1 |
| | Heat resistance on adhesiveness N/25 mm | 12.4 | 8.2 | 4.7 | 18.5 | 20.1 | 21.5 | 2.6 |
| | Heat cycle resistance % | 85 | 41 | 89 | 107 | 107 | 113 | 294 |
| | Alkali resistance % | 93 | 14 | 99 | 106 | 106 | 105 | 215 |
| | Resistance to knocking flaw occurrence | ○ | ○ | ○ | ○ | ○ | ○ | ○ |
| | Resistance to peeling under moisture and heat % | 95 | 105 | 91 | 110 | 111 | 109 | 105 |

TABLE 12-continued

|  | Ex. 51 | Ex. 52 | Ex. 53 | Ex. 54 | Ex. 55 | Ex. 56 | Ex. 57 |
|---|---|---|---|---|---|---|---|
| Resistance to whitening under moisture and heat | ○ | ○ | ○ | ○ | ○ | ○ | ○ |
| Warm water resistance % | 96 | 102 | 89 | 105 | 106 | 110 | 106 |
| Resistance to whitening in warm water | ○ | ○ | ○ | ○ | ○ | ○ | ○ |

TABLE 13

| | | Ex. 58 | Ex. 59 | Ex. 60 | Ex. 61 | Ex. 62 | Ex. 63 | Ex. 64 |
|---|---|---|---|---|---|---|---|---|
| Blending of pressure-sensitive adhesive (part by mass) | P-1 | 100 | 100 | 100 | 100 | 100 | 100 | 100 |
| | P-2 | — | — | — | — | — | — | — |
| | P-3 | — | — | — | — | — | — | — |
| | P'-1 | — | — | — | — | — | — | — |
| | P'-2 | — | — | — | — | — | — | — |
| | Q-1 | 0.057 | 0.057 | 0.057 | 0.057 | 0.057 | — | — |
| | Q-2 | — | — | — | — | — | 0.057 | — |
| | Q'-1 | — | — | — | — | — | — | 0.057 |
| | R-1 | 0.090 | 0.090 | 0.090 | 0.040 | 0.090 | 0.077 | 0.077 |
| | S-1 | | 0.30 | 1.0 | 0.060 | 0.010 | 0.023 | 0.023 |
| Evaluation result | Initial adhesion strength N/25 mm | 14.1 | 13.9 | 14.6 | 23.7 | 23.9 | 21.9 | 16.5 |
| | Heat resistance on adhesiveness N/25 mm | 4.5 | 10.0 | 6.5 | 18.1 | 18.3 | 11.2 | 4.7 |
| | Heat cycle resistance % | 66 | 74 | 46 | 110 | 74 | 101 | 96 |
| | Alkali resistance % | 88 | 84 | 62 | 105 | 97 | 99 | 87 |
| | Resistance to knocking flaw occurrence | ○ | ○ | ○ | ○ | ○ | ○ | ○ |
| | Resistance to peeling under moisture and heat % | 92 | 92 | 78 | 108 | 100 | 107 | 98 |
| | Resistance to whitening under moisture and heat | ○ | ○ | ○ | ○ | ○ | ○ | ○ |
| | Warm water resistance % | 90 | 91 | 76 | 106 | 100 | 104 | 95 |
| | Resistance to whitening in warm water | ○ | ○ | ○ | ○ | ○ | ○ | ○ |

It has been found that the preferable transparent pressure-sensitive adhesives described in these Examples are excellent in adhesive strength, resistance to moistures and heat, heat resistance, transparency, and hardness when being used for bonding between a colored polyvinyl chloride-based resin composition sheet and the hard coat laminated sheet (third hard coat) described in Example 1. Therefore, by using the preferable transparent pressure-sensitive adhesives described in these Examples as a material of the door body according to an embodiment, it is possible to solve problems such as peeling in a foam insulation material filling step, peeling due to outgas in an environment of high temperature and high humidity, and knocking flaw occurrence. Moreover, a door body including of any one of the transparent pressure-sensitive adhesives described in these Examples has the above-described preferable characteristics, and therefore can be used for various articles such as a home appliance including a refrigerator (for example, a door of a system kitchen, a door of a wine cellar, a lid of a washing machine, or a lid of a dishwasher). The refrigerator here may be any known one.

The configuration of the various embodiments have been specifically described by way of Examples, but the various embodiments have been thereby described merely illustratively. A person having ordinary skill in the technical field of the subject application can make various modifications within a scope not deviating from the spirit or essential features of the various embodiments. The technical idea and the protection scope of the various embodiments are not limited in any way by Examples disclosed here. The protection scope of the various embodiments should be determined based on recitation of claims. It should be understood that all techniques within a scope equivalent thereto are within the protection scope of the various embodiments.

For example, an embodiment can be modified in the following manner as an alternative embodiment.

(1). A door body that opens and closes a front part of an article body, including:
a front panel constituting a front of the door body; a frame supporting at least a part of an outside edge of the front panel; and a back panel constituting a back of the door body, in which
the front panel includes a transparent resin sheet layer, a transparent pressure-sensitive adhesive layer, and a decorative sheet in order from a surface layer on a front side,
the frame includes a support plate extending to an inside of the article in a substantially vertical direction,
the front panel is bonded to the support plate with a double-sided pressure-sensitive adhesive film,
the extension length of the support plate into an inside of the door body is 10 mm or more,
the thickness of the support plate is 1 mm or more,
a radius of curvature of a front side corner of a leading edge of the support plate is 0.1 to 10 mm,
the double-sided pressure-sensitive adhesive film extends from the leading edge of the support plate to an inside of the door body, and
the thickness of the double-sided pressure-sensitive adhesive film is 200 μm or more.

(2). The door body according to (1), including a display in at least a part of the front of the door body.

(3). The door body according to (1) or (2), in which an insulation material is filled in the door body formed by the front panel, the frame, and the back panel (4). A refrigerator including the door body according to any one of (1) to (3).

For example, an embodiment can be modified in the following manner as another alternative embodiment.

(1). A door body that opens and closes a front part of an article body, including:
a front panel constituting a front of the door body, a frame supporting at least a part of an outside edge of the front panel; and a back panel constituting a back of the door body, in which the front panel includes a transparent pressure-sensitive adhesive, and the transparent pressure-sensitive adhesive includes:

(P) 100 parts by mass of an acrylic polymer having a glass transition temperature of −50 to −25° C.;

(Q) 0.01 to 3 parts by mass of a silane coupling agent having an epoxy group;

(R) 0.01 to 0.9 parts by mass of a compound having two or more epoxy groups in one molecule; and (S) 0.01 to 0.5 parts by mass of an organic polyvalent metal compound.

(2). The door body according to (1), including a display in at least a part of the front of the door body.

(3). The door body according to (1) or (2), in which an insulation material is filled in the door body formed by the front panel, the frame, and the back panel.

(4). A refrigerator including the door body according to any one of (1) to (3).

REFERENCE SIGNS LIST

1 Frame
1a Outer peripheral plate of frame
1b Support plate of frame
1c Front side corner of leading edge of support plate
1d Length of support plate
1e Thickness of support plate
1f Part integrally molded with back panel of frame
2 Hard coat laminated sheet
3 Transparent pressure-sensitive adhesive layer
4 Decorative sheet
5 Back panel
5a Suspension base of display unit
5b Part of back panel divided and integrally molded with a part of frame
5c Part of back panel divided
6 Double-sided pressure-sensitive adhesive film
6a Length of double-sided pressure-sensitive adhesive film extending from leading edge of support plate
7 Insulation material
8 Display unit
9 Double-sided pressure-sensitive adhesive film
10 Cable
11 Ultraviolet irradiator
12 Mirror-finished metal roll
13 Web
14 Holding angle
15 First hard coat
16 Second hard coat
17 Transparent resin sheet layer
18 Third hard coat
19 Transparent pressure-sensitive adhesive layer
20 Printed layer
21 Colored resin sheet layer
22 T-die
23 Melted sheet
24 First mirror-finished roll
25 Second mirror-finished roll

The invention claimed is:

1. A door body for opening and closing a front part of an article body, the door body comprising:

a front panel constituting a front of the door body;

a frame supporting at least a part of an outside edge of the front panel; and a back panel constituting a back of the door body, wherein the frame comprises a support plate extending to an inside of the article body in a substantially vertical direction, wherein the front panel is bonded to the support plate with a double-sided pressure-sensitive adhesive film, wherein the double-sided pressure-sensitive adhesive film extends from a leading edge of the support plate to an inside of the door body, wherein a radius of curvature of a front side corner of the leading edge of the support plate is 0.1 to 10 mm, wherein the front panel comprises a hard coat laminated sheet, wherein the hard coat laminated sheet comprises: a first hard coat, a second hard coat; and a transparent resin sheet layer in order from a surface layer side on a front side, wherein the first hard coat is formed of a coating material comprising:

(A) 100 parts by mass of a polyfunctional (meth) acrylate;

(B) 0.01 to 7 parts by mass of a water repellant; and (C) 0.01 to 10 parts by mass of a silane coupling agent, and containing no inorganic particles, and wherein the second hard coat is formed of a coating material comprising:

(A) 100 parts by mass of a polyfunctional (meth) acrylate; and (D) 50 to 300 parts by mass of inorganic fine particles having an average particle size of 1 to 300 nm.

2. The door body according to claim 1, further comprising:

a display in at least a part of the front of the door body.

3. The door body according to claim 1, wherein the (C) silane coupling agent comprises one or more selected from the group consisting of a silane coupling agent having an amino group and a silane coupling agent having a mercapto group.

4. The door body according to claim 1, wherein the (B) water repellant comprises a (meth)acryloyl group-containing fluoropolyether water repellant.

5. The door body according to claim 1, wherein the second hard coat forming coating material further comprises (E) 0.01 to 1 part by mass of a leveling agent.

6. A door body that opens and closes a front part of an article body, the door body comprising:

a front panel constituting a front of the door body;

a frame supporting at least a part of an outside edge of the front panel; and a back panel constituting a back of the door body, wherein the frame comprises a support plate extending to an inside of the article body in a substantially vertical direction, wherein the front panel is bonded to the support plate with a double-sided pressure-sensitive adhesive film, wherein the double-sided pressure-sensitive adhesive film extends from a leading edge of the support plate to an inside of the door body, wherein a radius of curvature of a front side corner of the leading edge of the support plate is 0.1 to 10 mm, wherein the front panel comprises a hard coat laminated sheet, wherein the hard coat laminated sheet comprises:

a first hard coat, a second hard coat, and a transparent resin sheet layer in order from a surface layer side on a front side, wherein the first hard coat is formed of a coating material containing no inorganic particles, wherein the second hard coat is formed of a coating material containing inorganic particles, and wherein the hard coat laminated sheet satisfies that:
(i) total light transmittance is 80% or more;
(ii) haze is 5% or less; and
(iii) yellowness index is 3 or less.

7. The door body according to claim 6, wherein the hard coat laminated sheet further satisfies that:
(iv) a water contact angle of a surface of the first hard coat is 100° or more; and
(v) a water contact angle of the surface of the first hard coat after 20,000 reciprocating wipes with a cotton is 100° or more.

8. The door body according to claim 1, wherein the front panel comprises a transparent pressure-sensitive adhesive layer and a decorative sheet layer in this order in at least a part of a back side of the transparent resin sheet layer, and
wherein the transparent pressure-sensitive adhesive comprises:
(P) 100 parts by mass of an acrylic polymer having a glass transition temperature of −50 to −25° C.;
(Q) 0.01 to 3 parts by mass of a silane coupling agent having an epoxy group;
(R) 0.01 to 0.9 parts by mass of a compound having two or more epoxy groups in one molecule; and
(S) 0.01 to 0.5 parts by mass of an organic polyvalent metal compound.

9. The door body according to claim 1, wherein an insulation material is filled in the door body formed by the front panel, the frame, and the back panel.

10. A refrigerator comprising the door body according to claim 1.

11. The door body according to claim 6,
wherein the front panel comprises: the hard coat laminated sheet comprising the first hard coat, the second hard coat, and the transparent resin sheet layer; a transparent pressure-sensitive adhesive layer; and a decorative sheet in order from a surface layer on a front side,
wherein the frame comprises a support plate extending to an inside of the article in a substantially vertical direction,
wherein the front panel is bonded to the support plate with a double-sided pressure-sensitive adhesive film,
wherein the extension length of the support plate into an inside of the door body is 10 mm or more,
wherein the thickness of the support plate is 1 mm or more,
wherein a radius of curvature of a front side corner of a leading edge of the support plate is 0.1 to 10 mm,
wherein the double-sided pressure-sensitive adhesive film extends from the leading edge of the support plate to an inside of the door body, and
wherein the thickness of the double-sided pressure-sensitive adhesive film is 200 μm or more.

12. The door body according to claim 6, wherein the hard coat laminated sheet further satisfies that:
(vi) a pencil hardness of the first hard coat surface, measured under a condition of a load of 750 g in accordance with JIS K5600-5-4, is 5H or more.

13. The door body according to claim 1, wherein the frame comprises a hard plastic material.

14. The door body according to claim 6, wherein the frame comprises a hard plastic material.

15. The door body according to claim 1,
wherein the front panel comprises: the hard coat laminated sheet comprising the first hard coat, the second hard coat, and the transparent resin sheet layer; a transparent pressure-sensitive adhesive layer; and a decorative sheet in order from a surface layer on a front side,
wherein the frame comprises a support plate extending to an inside of the article in a substantially vertical direction,
wherein the front panel is bonded to the support plate with a double-sided pressure-sensitive adhesive film,
wherein the extension length of the support plate into an inside of the door body is 10 mm or more,
wherein the thickness of the support plate is 1 mm or more,
wherein a radius of curvature of a front side corner of a leading edge of the support plate is 0.1 to 10 mm,
wherein the double-sided pressure-sensitive adhesive film extends from the leading edge of the support plate to an inside of the door body, and
wherein the thickness of the double-sided pressure-sensitive adhesive film is 200 μm or more.

16. The door body according to claim 6, wherein the front panel comprises a transparent pressure-sensitive adhesive layer and a decorative sheet layer in this order in at least a part of a back side of the transparent resin sheet layer, and
wherein the transparent pressure-sensitive adhesive comprises:
(P) 100 parts by mass of an acrylic polymer having a glass transition temperature of −50 to −25° C.;
(Q) 0.01 to 3 parts by mass of a silane coupling agent having an epoxy group;
(R) 0.01 to 0.9 parts by mass of a compound having two or more epoxy groups in one molecule; and
(S) 0.01 to 0.5 parts by mass of an organic polyvalent metal compound.

17. A refrigerator comprising the door body according to claim 6.

* * * * *